US011790376B2

(12) United States Patent
Sehrawat et al.

(10) Patent No.: US 11,790,376 B2
(45) Date of Patent: Oct. 17, 2023

(54) PREDICTING CUSTOMER SUPPORT REQUESTS

(71) Applicant: ASAPP, INC., New York, NY (US)

(72) Inventors: Vicky Sehrawat, New York, NY (US); Jason Shaev, New York, NY (US); Punyashloka Biswal, Norwalk, CT (US); Brian Dillmann, Brooklyn, NY (US); Joseph Hackman, New York, NY (US); Shawn Henry, Longmont, CO (US); Gustavo Sapoznik, Miami, FL (US)

(73) Assignee: ASAPP, INC., New York, NY (US)

( * ) Notice: Subject to any disclaimer, the term of this patent is extended or adjusted under 35 U.S.C. 154(b) by 383 days.

(21) Appl. No.: 16/706,141

(22) Filed: Dec. 6, 2019

(65) Prior Publication Data

US 2020/0118143 A1 Apr. 16, 2020

Related U.S. Application Data

(63) Continuation of application No. 16/110,742, filed on Aug. 23, 2018, now Pat. No. 10,535,071, which is a (Continued)

(51) Int. Cl.

*G06F 21/31* (2013.01)
*G06Q 30/016* (2023.01)

(Continued)

(52) U.S. Cl.

CPC ........... *G06Q 30/016* (2013.01); *G06F 21/31* (2013.01); *G06F 40/30* (2020.01); *G06F 40/35* (2020.01);

(Continued)

(58) Field of Classification Search

CPC .... G06Q 30/016; G06F 17/2785; G06F 21/31

See application file for complete search history.

(56) References Cited

U.S. PATENT DOCUMENTS

| | | | |
|---|---|---|---|
| 5,195,034 | A | 3/1993 | Garneau et al. |
| 5,227,971 | A | 7/1993 | Nakajima et al. |

(Continued)

FOREIGN PATENT DOCUMENTS

| | | | |
|---|---|---|---|
| CN | 1633817 | A | 6/2005 |
| CN | 1853180 | A | 10/2006 |

(Continued)

OTHER PUBLICATIONS

"Scikit-learn: Machine Learning in Python", scikit-learn 0.17.1 documentation, http://scikit-learn.org/stable/ (accessed on Sep. 20, 2016), 3 pages.

(Continued)

*Primary Examiner* — Loc Tran

(74) *Attorney, Agent, or Firm* — GTC Law Group PC & Affiliates

(57) ABSTRACT

The third-party company may provide a user interface to a customer to submit a customer support request regarding a first company. The third-party company may receive a customer identifier from the first device and may request prediction data from the first company using the customer identifier. The third-party company may process the prediction data to predict a customer support request of the customer and generate user interface data corresponding to the predicted customer support request. The user interface data may be transmitted to the user interface before a customer support request from the customer is received.

27 Claims, 29 Drawing Sheets

Related U.S. Application Data continuation of application No. 15/638,543, filed on Jun. 30, 2017, now Pat. No. 10,083,451, which is a continuation-in-part of application No. 15/254,008, filed on Sep. 1, 2016, now Pat. No. 9,715,496.

(60) Provisional application No. 62/359,841, filed on Jul. 8, 2016.

(51) Int. Cl.

| | |
|---|---|
| ***H04L 51/02*** | (2022.01) |
| ***H04M 3/42*** | (2006.01) |
| ***H04M 3/51*** | (2006.01) |
| ***H04L 51/18*** | (2022.01) |
| ***G06F 40/30*** | (2020.01) |
| ***G06F 40/35*** | (2020.01) |
| ***H04L 51/52*** | (2022.01) |
| ***G06N 5/01*** | (2023.01) |
| ***G06N 3/04*** | (2023.01) |
| ***G06N 3/08*** | (2023.01) |
| *H04L 67/306* | (2022.01) |
| *G06Q 10/1053* | (2023.01) |
| *G06Q 10/107* | (2023.01) |
| *G06Q 30/01* | (2023.01) |
| *H04L 67/02* | (2022.01) |
| *G06N 3/042* | (2023.01) |

(52) U.S. Cl.

CPC ................. *G06N 3/04* (2013.01); *G06N 3/08* (2013.01); *G06N 5/01* (2023.01); *H04L 51/02* (2013.01); *H04L 51/18* (2013.01); *H04L 51/52* (2022.05); *H04M 3/42382* (2013.01); *H04M 3/5141* (2013.01); *G06N 3/042* (2023.01); *G06Q 10/107* (2013.01); *G06Q 10/1053* (2013.01); *G06Q 30/01* (2013.01); *H04L 67/02* (2013.01); *H04L 67/306* (2013.01); *H04M 3/5183* (2013.01)

(56) References Cited

U.S. PATENT DOCUMENTS

| | | | |
|---|---|---|---|
| 5,369,575 | A | 11/1994 | Lamberti et al. |
| 6,173,279 | B1 | 1/2001 | Levin et al. |
| 6,177,932 | B1 | 1/2001 | Galdes et al. |
| 6,327,363 | B1 | 12/2001 | Henderson et al. |
| 6,381,645 | B1 | 4/2002 | Sassin et al. |
| 6,453,292 | B2 | 9/2002 | Ramaswamy et al. |
| 6,915,254 | B1 | 7/2005 | Heinze et al. |
| 6,981,040 | B1 | 12/2005 | Konig et al. |
| 7,257,564 | B2 | 8/2007 | Loughmiller et al. |
| 7,603,330 | B2 | 10/2009 | Gupta et al. |
| 7,644,057 | B2 | 1/2010 | Nelken et al. |
| 7,664,644 | B1 | 2/2010 | Tur |
| 8,024,196 | B1 | 9/2011 | Wodtke et al. |
| 8,054,951 | B1 | 11/2011 | Winslow et al. |
| 8,156,138 | B2 | 4/2012 | Kohn et al. |
| 8,271,403 | B2 | 9/2012 | Rieck et al. |
| 8,494,152 | B1 | 7/2013 | Roberts et al. |
| 8,577,671 | B1 | 11/2013 | Barve et al. |
| 8,626,509 | B2 | 1/2014 | Roy et al. |
| 8,812,292 | B2 | 8/2014 | Ceusters et al. |
| 8,972,240 | B2 | 3/2015 | Brockett et al. |
| 9,043,197 | B1 | 5/2015 | Pasca et al. |
| 9,336,206 | B1 | 5/2016 | Orsini et al. |
| 9,336,269 | B1 | 5/2016 | Smith et al. |
| 9,591,136 | B1 | 3/2017 | Garcia et al. |
| 9,602,987 | B1 | 3/2017 | Wittig |
| 9,715,496 | B1 | 7/2017 | Sapoznik et al. |
| 9,723,151 | B2 | 8/2017 | McGann et al. |
| 9,727,925 | B2 | 8/2017 | Subramanian et al. |
| 9,742,916 | B1 | 8/2017 | Christopher |
| 9,761,222 | B1 | 9/2017 | Scarasso et al. |
| 9,762,733 | B1 | 9/2017 | Ramanujaiaha et al. |
| 9,805,371 | B1 | 10/2017 | Sapoznik et al. |
| 9,807,037 | B1 | 10/2017 | Sapoznik et al. |
| 9,875,440 | B1 | 1/2018 | Commons |
| 9,892,414 | B1 | 2/2018 | Henry |
| 10,049,663 | B2 | 8/2018 | Orr et al. |
| 10,067,938 | B2 | 9/2018 | Bellegarda |
| 10,083,451 | B2 | 9/2018 | Sehrawat et al. |
| 10,083,690 | B2 | 9/2018 | Giuli et al. |
| 10,089,072 | B2 | 10/2018 | Piersol et al. |
| 10,097,690 | B1 | 10/2018 | Henry |
| 10,109,275 | B2 | 10/2018 | Henry |
| 10,127,908 | B1 | 11/2018 | Deller et al. |
| 10,169,315 | B1 | 1/2019 | Heckel et al. |
| 10,210,244 | B1 | 2/2019 | Branavan et al. |
| 10,387,888 | B2 | 8/2019 | Sapoznik et al. |
| 10,453,074 | B2 | 10/2019 | Sapoznik et al. |
| 10,482,875 | B2 | 11/2019 | Henry |
| 10,515,104 | B2 | 12/2019 | Branavan et al. |
| 10,535,071 | B2 | 1/2020 | Sehrawat et al. |
| 10,650,311 | B2 | 5/2020 | Henry |
| 10,733,614 | B2 | 8/2020 | Sapoznik et al. |
| 11,615,422 | B2 | 3/2023 | Sapoznik et al. |
| 2003/0033288 | A1 | 2/2003 | Shanahan et al. |
| 2003/0033347 | A1 | 2/2003 | Bolle et al. |
| 2003/0103621 | A1 | 6/2003 | Brown et al. |
| 2004/0003283 | A1 | 1/2004 | Goodman et al. |
| 2004/0254904 | A1 | 12/2004 | Nelken et al. |
| 2005/0076084 | A1 | 4/2005 | Loughmiller et al. |
| 2005/0105712 | A1 | 5/2005 | Williams et al. |
| 2005/0228790 | A1 | 10/2005 | Ronnewinkel et al. |
| 2006/0112127 | A1 | 5/2006 | Krause et al. |
| 2006/0129397 | A1 | 6/2006 | Li et al. |
| 2006/0173776 | A1 | 8/2006 | Shalley |
| 2007/0094217 | A1 | 4/2007 | Ronnewinkel et al. |
| 2007/0100618 | A1 | 5/2007 | Lee et al. |
| 2007/0121899 | A1 | 5/2007 | Galvin |
| 2007/0168448 | A1 | 7/2007 | Garbow et al. |
| 2008/0052071 | A1 | 2/2008 | Doulton |
| 2008/0091435 | A1 | 4/2008 | Strope et al. |
| 2008/0112620 | A1 | 5/2008 | Jiang |
| 2008/0168070 | A1 | 7/2008 | Naphade et al. |
| 2008/0168135 | A1 | 7/2008 | Redlich et al. |
| 2010/0191856 | A1* | 7/2010 | Gupta ................ H04L 61/4511 709/228 |
| 2011/0066634 | A1 | 3/2011 | Phillips et al. |
| 2011/0082825 | A1 | 4/2011 | Sathish et al. |
| 2011/0093414 | A1 | 4/2011 | Xu et al. |
| 2011/0173346 | A1 | 7/2011 | Neben |
| 2011/0270771 | A1 | 11/2011 | Coursimault et al. |
| 2011/0286596 | A1 | 11/2011 | Gressel et al. |
| 2011/0314012 | A1 | 12/2011 | Kenthapadi et al. |
| 2012/0005515 | A1 | 1/2012 | Reddi et al. |
| 2012/0053945 | A1 | 3/2012 | Gupta et al. |
| 2012/0102130 | A1 | 4/2012 | Guyot et al. |
| 2012/0266258 | A1 | 10/2012 | Tuchman et al. |
| 2013/0104198 | A1 | 4/2013 | Grim |
| 2013/0143587 | A1 | 6/2013 | Williams et al. |
| 2013/0144605 | A1 | 6/2013 | Brager et al. |
| 2013/0166485 | A1 | 6/2013 | Hoffmann et al. |
| 2013/0173604 | A1 | 7/2013 | Li et al. |
| 2013/0311997 | A1 | 11/2013 | Gruber et al. |
| 2013/0317808 | A1 | 11/2013 | Kruel et al. |
| 2014/0075004 | A1 | 3/2014 | Van Dusen et al. |
| 2014/0079195 | A1 | 3/2014 | Srivastava et al. |
| 2014/0180788 | A1 | 6/2014 | George et al. |
| 2014/0278379 | A1* | 9/2014 | Coccaro .............. G10L 15/1822 704/202 |
| 2014/0282138 | A1 | 9/2014 | Hopton et al. |
| 2014/0297268 | A1 | 10/2014 | Govrin et al. |
| 2014/0297281 | A1 | 10/2014 | Togawa et al. |
| 2014/0317030 | A1 | 10/2014 | Shen et al. |
| 2014/0330818 | A1 | 11/2014 | Raina et al. |
| 2014/0365209 | A1 | 12/2014 | Evermann |
| 2015/0006143 | A1 | 1/2015 | Skiba et al. |
| 2015/0032724 | A1 | 1/2015 | Thirugnanasundaram et al. |
| 2015/0033106 | A1 | 1/2015 | Stetson et al. |
| 2015/0052002 | A1 | 2/2015 | Welch et al. |

(56) References Cited

U.S. PATENT DOCUMENTS

| | | | |
|---|---|---|---|
| 2015/0073798 A1 | 3/2015 | Karov et al. | |
| 2015/0142704 A1 | 5/2015 | London | |
| 2015/0149177 A1 | 5/2015 | Kalns et al. | |
| 2015/0154285 A1 | 6/2015 | Saarinen et al. | |
| 2015/0178390 A1 | 6/2015 | Torras | |
| 2015/0215624 A1 | 7/2015 | Wei | |
| 2015/0220833 A1 | 8/2015 | Le | |
| 2015/0220995 A1 | 8/2015 | Guyot et al. | |
| 2015/0228275 A1 | 8/2015 | Watanabe et al. | |
| 2015/0242385 A1 | 8/2015 | Bao et al. | |
| 2015/0254969 A1* | 9/2015 | Bishop | H04L 41/0618 340/506 |
| 2015/0310377 A1 | 10/2015 | Duval et al. | |
| 2015/0340032 A1 | 11/2015 | Gruenstein | |
| 2015/0363393 A1 | 12/2015 | Williams et al. | |
| 2015/0365387 A1 | 12/2015 | Good | |
| 2015/0371236 A1* | 12/2015 | Wen | G06Q 30/016 705/304 |
| 2016/0019816 A1 | 1/2016 | Parry et al. | |
| 2016/0063067 A1 | 3/2016 | Maitra et al. | |
| 2016/0078456 A1 | 3/2016 | Chakraborty et al. | |
| 2016/0092688 A1 | 3/2016 | Wolrich et al. | |
| 2016/0105386 A1 | 4/2016 | Anders et al. | |
| 2016/0163311 A1 | 6/2016 | Crook et al. | |
| 2016/0163314 A1 | 6/2016 | Fujii et al. | |
| 2016/0180151 A1 | 6/2016 | Philbin et al. | |
| 2016/0180838 A1 | 6/2016 | Parada San Martin et al. | |
| 2016/0182672 A1 | 6/2016 | Kuperman et al. | |
| 2016/0239846 A1 | 8/2016 | Arvapally et al. | |
| 2016/0247068 A1 | 8/2016 | Lin | |
| 2016/0255034 A1 | 9/2016 | Yuan | |
| 2016/0286083 A1 | 9/2016 | Su et al. | |
| 2016/0323217 A1 | 11/2016 | Subramani et al. | |
| 2016/0323398 A1 | 11/2016 | Guo et al. | |
| 2016/0328388 A1 | 11/2016 | Cao et al. | |
| 2016/0364522 A1 | 12/2016 | Frey et al. | |
| 2017/0011279 A1 | 1/2017 | Soldevila et al. | |
| 2017/0013073 A1 | 1/2017 | Mendez et al. | |
| 2017/0017973 A1* | 1/2017 | Cochrane | G06Q 30/0203 |
| 2017/0091320 A1 | 3/2017 | Psota et al. | |
| 2017/0103324 A1 | 4/2017 | Weston et al. | |
| 2017/0116982 A1 | 4/2017 | Gelfenbeyn et al. | |
| 2017/0147682 A1 | 5/2017 | Alaqeeli et al. | |
| 2017/0148073 A1 | 5/2017 | Nomula et al. | |
| 2017/0200077 A1 | 7/2017 | Weston et al. | |
| 2017/0213138 A1 | 7/2017 | Bojja et al. | |
| 2017/0308523 A1 | 10/2017 | Wang et al. | |
| 2017/0323016 A1 | 11/2017 | Feng et al. | |
| 2017/0336969 A1 | 11/2017 | Bi | |
| 2018/0005112 A1 | 1/2018 | Iso-Sipila et al. | |
| 2018/0012231 A1 | 1/2018 | Sapoznik et al. | |
| 2018/0012232 A1 | 1/2018 | Sehrawat et al. | |
| 2018/0013699 A1 | 1/2018 | Sapoznik et al. | |
| 2018/0018562 A1 | 1/2018 | Jung | |
| 2018/0032755 A1 | 2/2018 | Odinak | |
| 2018/0052664 A1 | 2/2018 | Zhang et al. | |
| 2018/0068233 A1 | 3/2018 | Miranda et al. | |
| 2018/0121738 A1 | 5/2018 | Womack et al. | |
| 2018/0122506 A1* | 5/2018 | Grantcharov | G16H 50/50 |
| 2018/0131645 A1 | 5/2018 | Magliozzi et al. | |
| 2018/0143965 A1 | 5/2018 | Willson et al. | |
| 2018/0174037 A1 | 6/2018 | Henry | |
| 2018/0174579 A1 | 6/2018 | Henry | |
| 2018/0181807 A1 | 6/2018 | Yankov | |
| 2018/0203848 A1 | 7/2018 | Perez et al. | |
| 2018/0232434 A1 | 8/2018 | Geyik et al. | |
| 2018/0239830 A1 | 8/2018 | Dialani et al. | |
| 2018/0253734 A1 | 9/2018 | Henry | |
| 2018/0329882 A1 | 11/2018 | Bennett et al. | |
| 2018/0329886 A1 | 11/2018 | Li et al. | |
| 2018/0365702 A1 | 12/2018 | Sehrawat et al. | |
| 2018/0376002 A1 | 12/2018 | Abraham | |
| 2019/0019197 A1 | 1/2019 | Roberts et al. | |
| 2019/0019503 A1 | 1/2019 | Henry | |
| 2019/0034780 A1 | 1/2019 | Marin et al. | |
| 2019/0122101 A1 | 4/2019 | Lei | |
| 2019/0180288 A1 | 6/2019 | Shaev et al. | |
| 2019/0182383 A1 | 6/2019 | Shaev et al. | |
| 2019/0213601 A1 | 7/2019 | Hackman et al. | |
| 2019/0251104 A1 | 8/2019 | Branavan et al. | |
| 2019/0311375 A1 | 10/2019 | Sapoznik et al. | |
| 2020/0081907 A1 | 3/2020 | Branavan et al. | |
| 2020/0327555 A1 | 10/2020 | Sapoznik et al. | |

FOREIGN PATENT DOCUMENTS

| | | | |
|---|---|---|---|
| CN | 101384999 | A | 3/2009 |
| CN | 104598445 | A | 5/2015 |
| CN | 105009556 | A | 10/2015 |
| WO | 2018009231 | A1 | 1/2018 |
| WO | 2018009432 | A1 | 1/2018 |
| WO | 2018160492 | A1 | 9/2018 |
| WO | 2019113409 | A1 | 6/2019 |
| WO | 2019113409 | A8 | 7/2019 |
| WO | 2019156803 | A1 | 8/2019 |

OTHER PUBLICATIONS

"Using algorithms for advanced customer care", Nokia Strategic white paper, https://resources.ext.nokia.com/asset/200614 (accessed Jul. 26, 2017), 2017, 11 pages.

16908347.4, , "European Application Serial No. 16908347.4, Extended European Search Report dated Nov. 20, 2019", ASAPP, Inc., 11 pages.

17824734.2, , "European Application Serial No. 17824734.2, Extended European Search Report dated Nov. 14, 2019", ASAPP, Inc., 8 pages.

Al-Rfou, Rami et al., "Conversational Contextual Cues: The Case of Personalization and History for Response Ranking", CoRR abs/1606.00372, http://arxiv.org/abs/1606.00372, 2016, 10 pages.

Bahdanau, Dzmitry et al., "Neural Machine Translation by Jointly Learning to Align and Translate", CoRR abs/1409.0473, http://arxiv.org/abs/1409.0473, May 19, 2016, 15 pages.

Bengio, Yoshua et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.

Berger, Mark J. , "Large Scale Multi-label Text Classification with Semantic Word Vectors", published 2015 (Year: 2015), Department of Computer Science, Stanford University, Stanford, CA 94305, mjberger@stanford.edu, 2015, pp. 1-8.

Black, William J. et al., "Facile: Description of the NE System Used for MUC-7", Proceedings of the 7th Message Understanding Conference, https://www-nlpir.nist.gov/related_projects/muc/proceedings/muc_7_proceedings/facile_muc7.pdf, 1998, 10 pages.

Blei, David M. et al., "Latent Dirichlet Allocation", Journal of Machine Learning Research, vol. 3, 2003, pp. 993-1022.

Brown, Peter F. et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).

Cai, Lijuan et al., "Hierarchical Document Categorization with Support Vector Machines", CIKM'04, Washington, DC, USA, https://info.cs.uab.edu/zhang/Spam-mining-papers/Hierarchical.Data.Classification.with.Support.Vector.Machines.pdf, Nov. 8-13, 2004, 10 pages.

Carrier, Pierre L. et al., "LSTM Networks for Sentiment Analysis", http://deeplearning.net/tutorial/lstm.html, accessed on Sep. 20, 2016, 5 pages.

Chandar, Sarath et al., "Correlational Neural Networks", CoRR abs/1504.07225, http://arxiv.org/abs/1504.07225, Oct. 12, 2015, 27 pages.

Chen, Wenlin et al., "Compressing Neural Networks with the Hashing Trick", arXiv:1504.04788v1, https://arxiv.org/pdf/1504.04788.pdf (accessed on Nov. 26, 2018), Apr. 19, 2015, 10 pages.

Chen, Yun-Nung et al., "An empirical investigation of sparse log-linear models for improved dialogue act classification", IEEE

(56) References Cited

OTHER PUBLICATIONS

International Conference on Acoustics Speech and Signal Processing, 2013, XP032507868,, 6 pages.
Chen, Yun-Nung et al., "An empirical investigation of sparse log-linear models for improved dialogue act classification", 2013 IEEE International Conference on Acoustics. Speech and Signal Processing. IEEE., 2013, 6 pages.
Chen, Yun-Nung , "An empirical investigation of sparse log-linear models for improved dialogue act classification.", 2013 IEEE International Conference on Acoustics, Speech and Signal Processing. IEEE, 2013, pp. 1-6.
Cheng, Yong et al., "Semi-Supervised Learning for Neural Machine Translation", CoRR abs/1606.04596, http://arxiv.org/abs/1606.04596, Dec. 10, 2016, 10 pages.
Collados, Jose C. , "On the contribution of neural networks and word embeddings in Natural Language Processing", published at Medium.com, Jan. 2018. (Year: 2018), http://www.josecamachocollados.com, Jan. 2018, pp. 1-7.
Courbariaux, Matthieu et al., "BinaryConnect: Training Deep Neural Networks with binary weights during propagations", CoRR, accessed at https://arxiv.org/pdf/1511.00363v3.pdf, 2015 (Jan. 3, 2017), 9 pages.
De La Briandais, Rene , "File Searching Using Variable Length Keys", Proceedings of the 1959 Western Joint Computer Conference, https://pdfs.semanticscholar.org/3ce3/f4cdc91d03850ed84ef96a08498e018d18f.pdf, 1959, pp. 295-298.
Deerwester, Scott et al., "Improving Information Retrieval with Latent Semantic Indexing", Proceedings of the 51st ASIS Annual Meeting (ASIS '88), vol. 25, Oct. 1988, pp. 36-40.
Deerwester, Scott et al., "Indexing by Latent Semantic Analysis", Journal of the Association for Information Science and Technology, vol. 41, iss. 6, Sep. 1990, pp. 391-407.
Frome, Andrea et al., "Large-scale Privacy Protection in Google Street View", 2009 IEEE 12th International Conference on Computer Vision https://pdfs.semanticscholar.org/e645/6ac0e57396f222689dc71a310c2779a31488.pdf, Sep. 29-Oct. 2, 2009, 8 pages.
Gong, Yunchao et al., "Iterative Quantization: A Procrustean Approach to Learning Binary Codes", CVPR 2011, accessed at http://www.cs.unc.edu/~lazebnik/publications/cvpr11_small_code.pdf, 2011 (accessed on Jan. 3, 2017), pp. 817-824.
Goodfellow, Ian J. et al., "Generative Adversarial Nets", Advances in Neural Information Processing Systems 27 (NIPS 2014), https://papers.nips.cc/paper/5423-generative-adversarial-nets.pdf, 2014, pp. 2672-2680.
Gray, R. , "Vector quantization", IEEE ASSP Magazine, vol. 1, iss. 2 https://ieeexplore.ieee.org/document/1162229/ (abstract only), Apr. 1984, pp. 4-29.
Henderson, Matthew et al., "Efficient Natural Language Response Suggestion for Smart Reply", arXiv:1705.00652v1, https://arxiv.org/pdf/1705.00652.pdf, May 1, 2017, 15 pages.
Hochreiter, Sepp et al., "Long Short-Term Memory", Neural Computation, vol. 9, iss. 8, 1997, pp. 1735-1780.
Hochreitner, Sepp et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.
Huang, Zhiheng et al., "Bidirectional LSTM-CRF Models for Sequence Tagging", arXiv:1508.01991v1, https://arxiv.org/pdf/1508.01991.pdf, Aug. 9, 2015, 10 pages.
Iyyer, Mohit et al., "Deep Unordered Composition Rivals Syntactic Methods for Text Classification", Association for Computational Linguistics (ACL), http://cs.umd.edu/~miyyer/pubs/2015_acl_dan.pdf, 2015, 11 pages.
Ji, Zongcheng et al., "An Information Retrieval Approach to Short Text Conversation", CoRR, accessed at https://arxiv.org/pdf/1408.6988v1.pdf, Aug. 29, 2014 (accessed on Jan. 3, 2017), 21 pages.
Karpathy, Andrej , "The Unreasonable Effectiveness of Recurrent Neural Networks", http://karpathy.github.io/2015/05/21/rnn-effectiveness/, (accessed on Sep. 20, 2016), May 21, 2015, 42 pages.
Kim, Yoon et al., "Character-Aware Neural Language Models", CoRR abs/1508.06615, http://arxiv.org/abs/1508.06615, 2015, 9 pages.
Kim, Yoon , "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.
Kiros, Ryan et al., "Skip-Thought Vectors", Proceedings of the 28th International Conference on Neural Information Processing Systems, vol. 2., 2015, pp. 3294-3302.
Lafferty, John et al., "Conditional Random Fields: Probabilistic Models for Segmenting and Labeling Sequence Data", https://repository.upenn.edu/cgi/viewcontent.cgi?article=1162&context=cis_papers, The definitive version was published in Proceedings of the 18th International Conference on Machine Learning 2001 (ICML 2001), pp. 282-289, Jun. 2001, 10 pages.
Lai, Hanjiang et al., "Simultaneous Feature Learning and Hash Coding with Deep Neural Networks", CoRR, accessed at http://www.cv-foundation.org/openaccess/content_cvpr_2015/papers/Lai_Simultaneous_Feature_Learning_2015_CVPR_paper.pdf, 2015 (accessed Jan. 3, 2017), pp. 3270-3278.
Lai, Siwei et al., "Recurrent Convolutional Neural Networks for Text Classification", AAAI'15 Proceedings of the Twenty-Ninth AAAI Conference on Artificial Intelligence, 2015, pp. 2267-2273.
Lample, Guillaume et al., "Unsupervised Machine Translation Using Monolingual Corpora Only", CoRR abs/1711.00043, http://arxiv.org/abs/1711.00043, Oct. 31, 2017, 12 pages.
Larochelle, Hugo et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.
Le, Quoc et al., "Distributed Representations of Sentences and Documents", Proceedings of the 31st International Conference on Machine Learning, W&CP vol. 32, Beijing, China, 2014, 9 pages.
Lee, Cheongjae et al., "Robust Dialog Management with N-best Hypotheses Using Dialog Examples and Agenda", Proceedings of ACL-08: HLT, Columbus, Ohio, Jun. 2008, pp. 630-637.
Levy, Omer et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, pp. 2177-2185.
Li, Jiwei et al., "A Hierarchical Neural Autoencoder for Paragraphs and Documents", Proceedings of the 53rd Annual Meeting of the Association for Computational Linguistics and the 7th International Joint Conference on Natural Language Processing,Beijing, China, http://web.stanford.edu/~jurafsky/pubs/P15-1107.pdf, Jul. 26-31, 2015 (accessed on Jan. 3, 2017), pp. 1106-1115.
Lin, Hui et al., "Multi-document Summarization via Budgeted Maximization of Submodular Functions", In Proceed. of Human Language Technologies: The Conf. of the North American Chapter of the Association for Computational Linguistics (NAACL-HLT), (accessed Nov. 26, 2018 at https://pdfs.semanticscholar.org/6286/a97ae2d9cff9b69f14d6cee3c611a1a63379.pdf), 2010, pp. 912-920.
Lin, Zhouhan et al., "A Structured Self-Attentive Sentence Embedding", arXiv:1703.03130v1, https://arxiv.org/pdf/1703.03130.pdf (accessed Jul. 13, 2017), Mar. 9, 2017, 15 pages.
Logeswaran, Lajanugen et al., "An Efficient Framework for Learning Sentence Representations", International Conference on Learning Representations, https://openreview.net/pdf?id=rJvJXZb0W, 2018, 16 pages.
Logeswaran, Lajanugen et al., "An efficient framework for learning sentence representations", ICLR 2018 Conference Blind Submission, https://openreview.net/pdf?id=rJvJXZb0W (accessed Nov. 26, 2018), Feb. 15, 2018, 16 pages.
Miao, Yishu et al., "Neural Variational Inference for Text Processing", CoRR abs/1511.06038, http://arxiv.org/abs/1511.06038, 2015, 15 pages.
Mikolov, Tomas et al., "Distributed Representations of Words and Phrases and their Compositionality", CoRR abs/1310.4546, http://arxiv.org/abs/1310.4546, 2013, 9 pages.

(56) References Cited

OTHER PUBLICATIONS

Mikolov, Tomas et al., "Distributed Representations of Words and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.
Mikolov, Tomas et al., "Recurrent neural network based language model", Interspeech 2010, Sep. 26-30, 2010, Makuhari, Chiba, Japan, 2010, pp. 1045-1048.
Mikolov, Tomas et al., "Recurrent neural network based language model", Interspeech 2010, Makuhari, Chiba, Japan, accessed at http://www.fit.vutbr.cz/research/groups/speech/publi/2010/mikolov_interspeech2010_IS100722.pdf, Sep. 26-30, 2010 (accessed on Jan. 3, 2017), pp. 1045-1048.
Mühler, Vincent , "Building a Node.js WebSocket Chat App with Socket.io and React", Tutorial to Socket.io with JavaScript, Feb. 22, 2018, 12 pages.
Pagliardini, Matteo et al., "Unsupervised Learning of Sentence Embeddings using Compositional n-Gram Features", CoRR abs/1703.02507, http://arxiv.org/abs/1703.02507, Jul. 10, 2017, 11 pages.
PCT/US2016/049896, , "Application Serial No. PCT/US2016/049896, International Search Report and the Written Opinion dated May 19, 2017", 14 pages.
PCT/US2016/049896, , "International Application Serial No. PCT/US2016/049896, International Preliminary Report on Patentability dated Jan. 17, 2019", ASAPP, Inc., 9 pages.
PCT/US2017/040205, , "Application Serial No. PCT/US2017/040205, International Search Report and the Written Opinion dated Sep. 15, 2017", 11 pages.
PCT/US2017/040205, , "International Application Serial No. PCT/US2017/040205, International Preliminary Report on Patentability dated Jan. 17, 2019", ASAPP, Inc., 9 pages.
PCT/US2018/064404, , "International Application Serial No. PCT/US2018/064404, International Search Report and Written Opinion dated Feb. 25, 2019", ASAPP, Inc., 9 pages.
PCT/US2019/014569, , "International Application Serial No. PCT/US2019/014569, International Search Report and Written Opinion dated Mar. 4, 2019", ASAPP, Inc., 13 pages.
Pennington, Jeffrey et al., "GloVe: Global Vectors forWord Representation", Empirical Methods in Natural Language Processing (EMNLP), http://www.aclweb.org/anthology/D14-1162, (accessed on Nov. 26, 2018 from https://nlp.stanford.edu/pubs/glove.pdf), 2014, pp. 1532-1543.
Rush, Alexander M. et al., "Optimal Beam Search for Machine Translation", Proceedings of EMNLP 2013, Oct. 18-21, 2013, Seattle, Washington, USA, 2013, 12 pages.
Scott, Tyler R. et al., "Adapted Deep Embeddings: A Synthesis of Methods for k-Shot Inductive Transfer Learning", arXiv:1805.08402v4 [cs.LG], https://arxiv.org/pdf/1805.08402.pdf, Oct. 27, 2018, 12 pages.
See, Abigail et al., "Get to the Point: Summarization with Pointer-Generator Networks", CoRR abs/1704.04368, http://arxiv.org/abs/1704.04368, Apr. 25, 2017, 20 pages.
Shen, Tianxiao et al., "Style Transfer from Non-Parallel Text by Cross-Alignment", CoRR abs/1705.09655, http://arxiv.org/abs/1705.09655, Nov. 6, 2017, 12 pages.
Shi, Yangyang et al., "Contextual spoken language understanding using recurrent neural networks.", 2015 IEEE International Conference on Acoustics, Speech and Signal Processing (ICASSP). IEEE, 2015, pp. 5271-5275.
Snell, Jake et al., "Prototypical Networks for Few-shot Learning", arXiv:1703.05175v2 [cs.LG], https://arxiv.org/pdf/1703.05175.pdf, Jun. 19, 2017, 13 pages.
Sutskever, Ilya et al., "Sequence to Sequence Learning with Neural Networks", CoRR abs/1409.3215, http://arxiv.org/abs/1409.3215, 2014, 9 pages.
Tai, Kai S. et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.
Ustinova, Evgeniya et al., "Learning Deep Embeddings with Histogram Loss", arXiv:1611.00822v1 [cs.CV], https://arxiv.org/pdf/1611.00822.pdf, Nov. 2, 2016, 9 pages.
Vincent, Pascal et al., "Extracting and Composing Robust Features with Denoising Autoencoders", Proceedings of the 25th International Conference on Machine Learning, Helsinki, Finland, http://www.cs.toronto.edu/~larocheh/publications/icml-2008-denoising-autoencoders.pdf (accessed on Nov. 26, 2018), 2008, 8 pages.
Vincent, Pascal et al., "Stacked Denoising Autoencoders: Learning Useful Representations in a Deep Network with a Local Denoising Criterion", Journal of Machine Learning Research 11, http://www.jmlr.org/papers/volume11/vincent10a/vincent10a.pdf, published Dec. 2010, pp. 3371-3408.
Vinyals, Oriol et al., "A Neural Conversational Model", CoRR abs/1506.05869, http://arxiv.org/abs/1506.05869, 2015, 8 pages.
Wang, Sida et al., "Baselines and Bigrams: Simple, Good Sentiment and Topic Classification", Proceedings of the 50th Annual Meeting of the Association for Computational Linguistics, Jeju, Republic of Korea, https://www.aclweb.org/anthology/P12-2018, Jul. 8-14, 2012, pp. 90-94.
Xiao, Yijun et al., "Efficient Character-level Document Classification by Combining Convolution and Recurrent Layers", CoRR abs/1602.00367, https://arxiv.org/pdf/1602.00367.pdf, Feb. 1, 2016, 10 pages.
Yu, Mo et al., "Diverse Few-Shot Text Classification with Multiple Metrics", Proceedings of the 2018 Conference of the North American Chapter of the Association for Computational Linguistics: Human Language Technologies, vol. 1 (Long Papers), New Orleans, Louisiana, https://www.aclweb.org/anthology/N18-1109, Jun. 2018, pp. 1206-1215.
Zhang, Xiang et al., "Character-level Convolutional Networks for Text Classification", CoRR abs/1509.01626, http://arxiv.org/abs/1509.01626, 2015, 9 pages.
Zhao, Han et al., "Self-Adaptive Hierarchical Sentence Model", CoRR abs/1504.05070, http://arxiv.org/abs/1504.05070, Apr. 27, 2015, 8 pages.
19750296.6 , "European Application Serial No. 19750296.6, Extended European Search Report dated Sep. 8, 2021", ASAPP, Inc., 10 pages.
Nguyen, Hieu T, et al., "Active learning using pre-clustering", Proceedings of the 21st International Conference on Machine Learning, Banff, Alberta, Canada, 2004, 8 pages.
PCT/US2019/014569 , "International Application Serial No. PCT/US2019/014569, International Preliminary Report on Patentability dated Aug. 27, 2020", ASAPP, Inc., 13 pages.
U.S. Appl. No. 18/120,075, filed Mar. 10, 2023, Pending, Shawn Henry et al.

* cited by examiner

810 ─

| Don Miller | 05:03 |
| GENERAL BILLING ISSUE | |

Waiting for reply...

| Ray Jackson | 00:07 |
| PAYMENT | |

The strange charge on my account is still there. I tried to fix it myself... | 01:25 |

| Cathy Washington | |
| GENERAL BILLING ISSUE | |

I need to pay the bill to my account and... | 00:13 |

| Julie Cooper ⊘ | |
| INVALID PURCHASE | |

Waiting for reply... | 00:13 |

| John Allen ⊘ | |
| GENERAL BILLING ISSUE | |

GREAT! Thanks so much for helping me.

EMPTY SLOT

EMPTY SLOT

820 ─

[ TIME OUT ]  [ TRANSFER ]  [ END ]

──── OPENED SERVICE CHAT: 10:06AM ────

How can we help you?

I need to pay the bill to my account and cancel the movie that was billed to me

Before a representative joins the chat, please provide your pin and account number so we can view your account.

✓ and 112354350 ✓

──── 10:10AM ────

You are now connected with Cathy

Hello there Cathy! I'll be more than happy to assist you today. I would love to check on that. Please give me a moment will I look through your account.

type here

830 ─

🔍 search...

RETURN TO ACCOUNT DETAILS

● 11/15/2016-12/15/2016

| $126.22 Today's Balance | $0.00 Unbilled Charges | $0.00 Past Due Amount | $0.00 Credits |

[ More Info ] [ Refund ]

| 12/11 | Movie | $5.99 |
| 12/10 | Internet: Misc Charge | $00.00 |
| 12/10 | Movie Channel Charge | $00.00 |
| 12/05 | Internet: Misc Charge | $00.00 |
| 12/01 | Internet: Misc Charge | $00.00 |
| 11/30 | Movie Channel Charge | $00.00 |
| 11/28 | Internet: Misc Charge | $00.00 |
| 11/20 | Movie Channel Charge | $00.00 |
| 11/19 | Internet: Misc Charge | $00.00 |

● 10/15/2016-11/15/2016     $138.26 Statement Paid

● 9/15/2016-10/15/2016     $112.38 Statement Paid

● 8/15/2016-9/15/2016     $121.98 Statement Paid

Knowledge Base    Customer History    ● Customer Profile

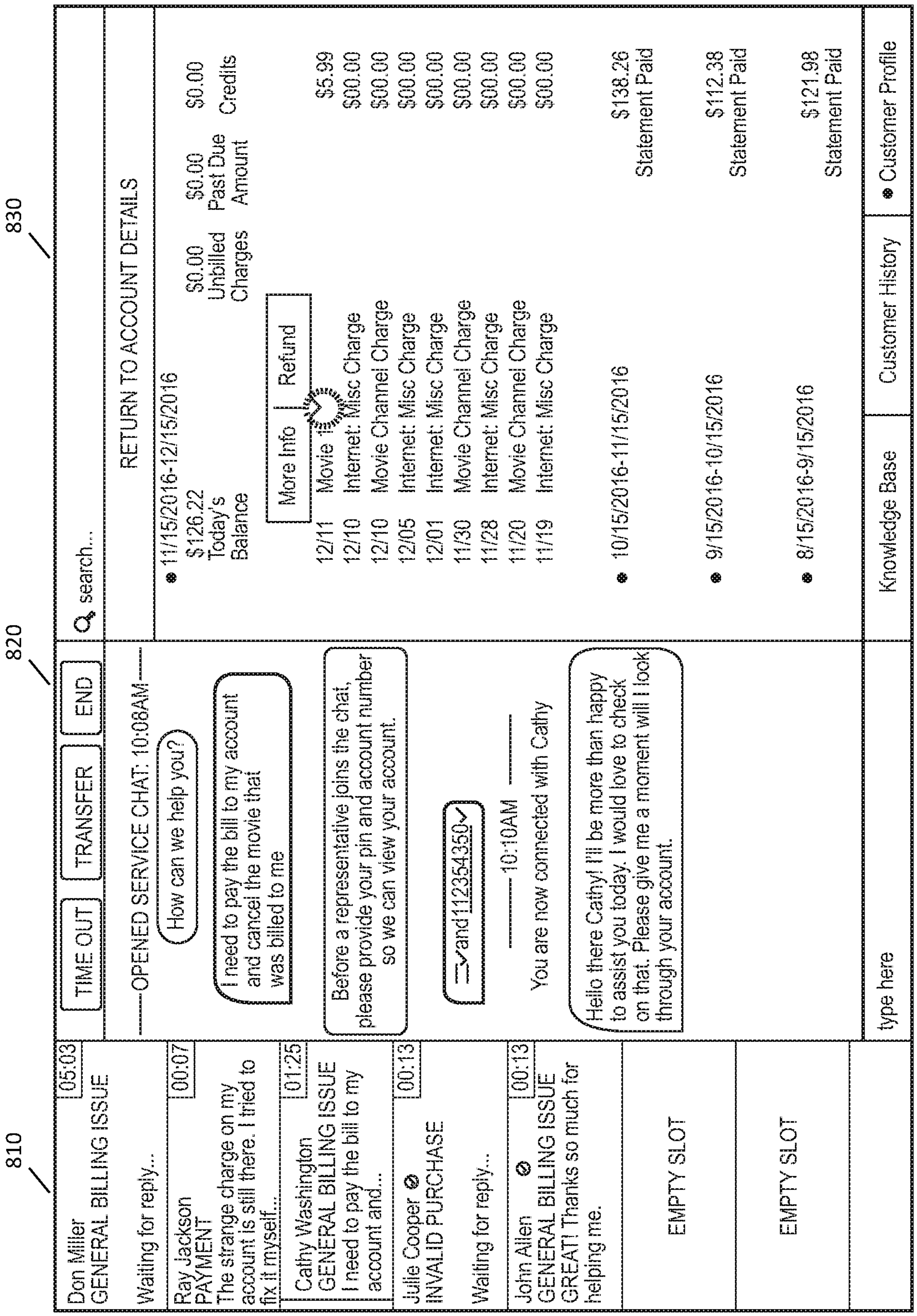

| Don Miller | 05:03 |
|---|---|
| GENERAL BILLING ISSUE | |

Waiting for reply...

| Ray Jackson | 00:07 |
|---|---|
| PAYMENT | |

The strange charge on my account is still there. I tried to fix it myself...

| Cathy Washington | 01:25 |
|---|---|
| GENERAL BILLING ISSUE | |

I need to pay the bill to my account and...

| Julie Cooper ⊙ | 00:13 |
|---|---|
| INVALID PURCHASE | |

Waiting for reply...

| John Allen ⊙ | 00:13 |
|---|---|
| GENERAL BILLING ISSUE | |

GREAT! Thanks so much for helping me.

EMPTY SLOT

EMPTY SLOT

820

[ TIME OUT ] [ TRANSFER ] [ END ]

——— OPENED SERVICE CHAT: 10:08AM ———

( How can we help you? )

( I need to pay the bill to my account and cancel the movie that was billed to me )

Before a representative joins the chat, please provide your pin and account number so we can view your account.

( ✓ and 112354350 ✓ )

——— 10:10AM ———

You are now connected with Cathy

Hello there Cathy! I'll be more than happy to assist you today. I would love to check on that. Please give me a moment will I look through your account.

Movie 2 was purchased on 10/02 at 11:21 am for $5.99. It will be refunded for the full purchasing price.

There is currently no pin setup for you account, which is why you have unwanted purchases. Would you like me to provide you the steps on how to set it up to your email on file: cathyw@aol.com?

type here

830

🔍 pin|                                                    832

Recommended Actions

ACCOUNT SETUP>SECURITY>  Instruction for pin setup ⟳

Knowledge Base

ACCOUNT SETUP>SECURITY>  Instruction for pin setup
SPECIAL CHANNELS>ACCESS>  Change email for password retrieval
ACCOUNT SETUP>SECURITY>  Email instruction for pin setup

SHOW RESULTS FOR ALL SEARCH

● Knowledge Base | Customer History | Customer Profile

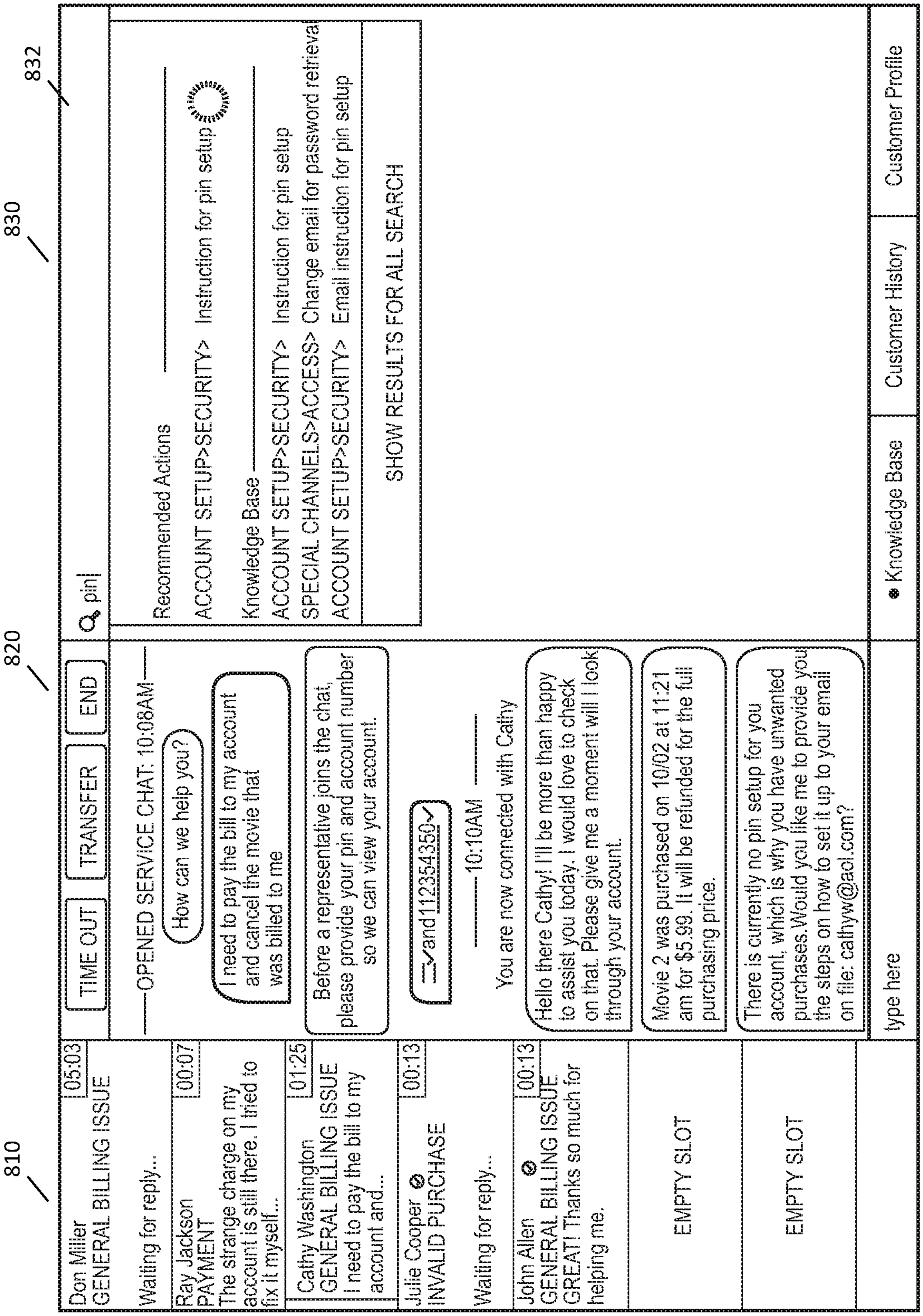

Don Miller — 05:03
GENERAL BILLING ISSUE
Waiting for reply...

Ray Jackson — 00:07
PAYMENT
The strange charge on my account is still there. I tried to fix it myself...

Cathy Washington — 01:25
GENERAL BILLING ISSUE
I need to pay the bill to my account and...

Julie Cooper ● — 00:13
INVALID PURCHASE
Waiting for reply...

John Allen ● — 00:13
GENERAL BILLING ISSUE
GREAT! Thanks so much for helping me.

EMPTY SLOT

EMPTY SLOT

820

[ TIME OUT ] [ TRANSFER ] [ END ]

———OPENED SERVICE CHAT: 10:08AM———

> How can we help you?

> I need to pay the bill to my account and cancel the movie that was billed to me Before a representative joins the chat, please provide your pin and account number so we can view your account.

> ✓ and 112354350 ✓

———10:10AM———
You are now connected with Cathy

Hello there Cathy! I'll be more than happy to assist you today. I would love to check on that. Please give me a moment will I look through your account.

Movie 2 was purchased on 10/02 at 11:21 am for $5.99. It will be refunded for the full purchasing price.

There is currently no pin setup for you account, which is why you have unwanted purchases. Would you like me to provide you the steps on how to set it up to your email on file: cathyw@aol.com?

type here

830

🔍 search

ACCOUNT SETUP > SECURITY > INSTRUCTION FOR PIN SETUP

Instructions for pin setup
Instruction# 192743740
This document includes step-by-step instructions on how to setup a personal payment pin.

CONTACT
cathyw@aol.com
+1-(123)456-7891

( SEND VIA EMAIL ) ( SEND URL IN CHAT ) ( SEND URL IN TEXT )

● Knowledge Base | Customer History | Customer Profile

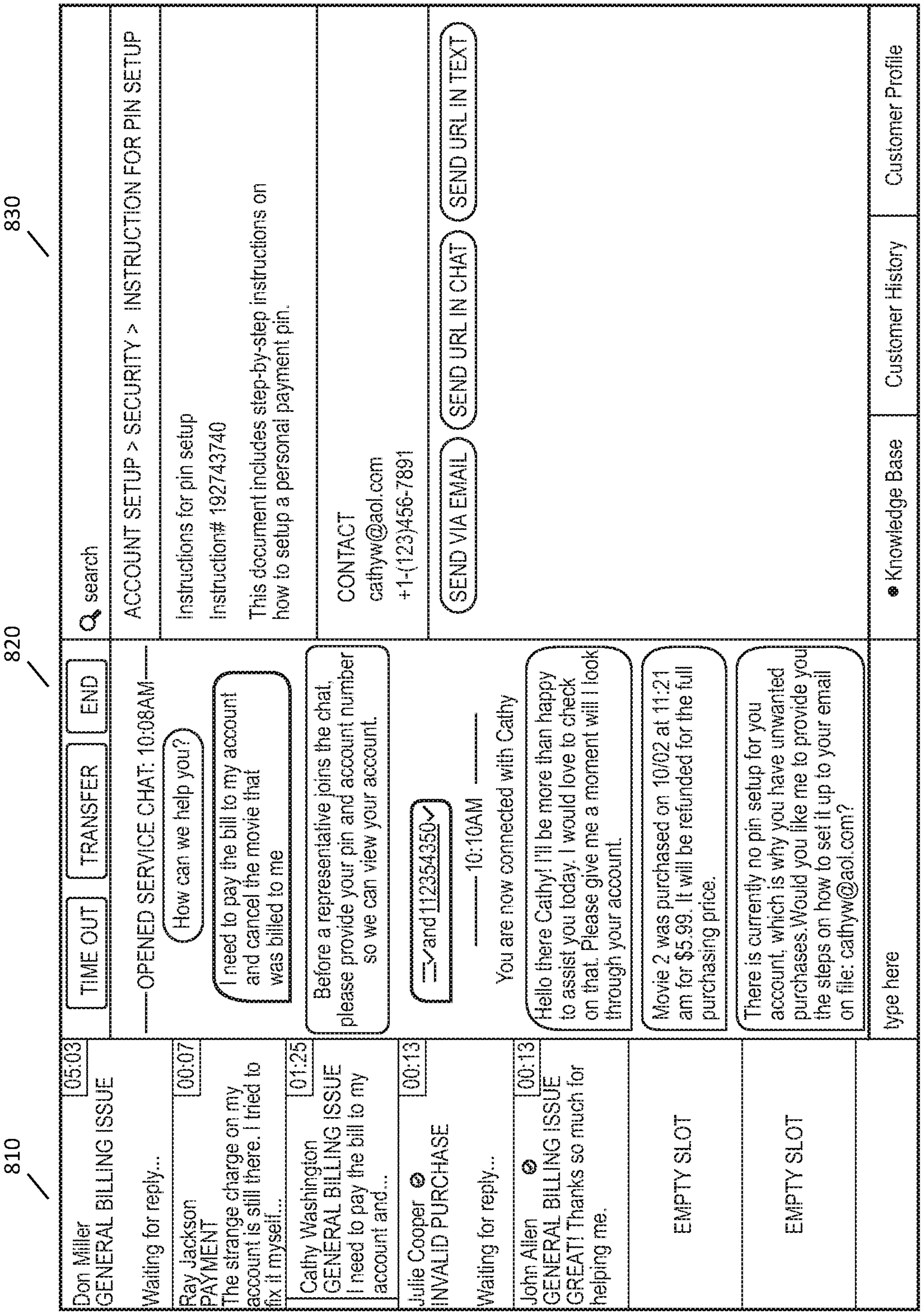

Fig. 8F

| 810 | 820 | 830 |
|---|---|---|
| Don Miller  05:03 | | 833 |
| GENERAL BILLING ISSUE | TIME OUT | TRANSFER | END | |
| Waiting for reply... | BEFORE A REPRESENTATIVE JOINS THE CHAT, PLEASE PROVIDE YOUR PIN AND ACCOUNT NUMBER SO WE CAN VIEW YOUR ACCOUNT. | Suggested Action:Request Payment | Send |
| Ray Jackson  00:07 | | Q search... |
| PAYMENT | ━━ ✓and112354350✓ | • 11/15/2016-12/15/2016 |
| The strange charge on my account is still there. I tried to fix it myself... | ━━━━ 10:10AM ━━━━ | $120.23  $0.00  $0.00  $0.00 |
| | You are now connected with Cathy | Today's  Unbilled  Past Due  Credits |
| Cathy Washington  01:25 | Hello there Cathy! I'll be more than happy to assist you today. I would love to check on that. Please give me a moment will I look through your account. | Balance  Charges  Amount |
| GENERAL BILLING ISSUE | | 12/11  Movie 1                        $5.99 |
| I need to pay the bill to my account and... | | 12/10  Internet: Misc Charge         $00.00 |
| | | 12/10  Movie Channel Charge         $00.00 |
| Julie Cooper ⊘  00:13 | Movie 2 was purchased on 10/02 at 11:21 am for $5.99. It will be refunded for the full purchasing price. | 12/05  Internet: Misc Charge         $00.00 |
| INVALID PURCHASE | | 12/01  Internet: Misc Charge         $00.00 |
| Waiting for reply... | | 11/30  Movie Channel Charge         $00.00 |
| | | 11/28  Internet: Misc Charge         $00.00 |
| John Allen ⊘  00:13 | There is currently no pin setup for you account, which is why you have unwanted purchases. Would you like me to provide you the steps on how to set it up to your email on file: cathyw@aol.com? | 11/20  Movie Channel Charge         $00.00 |
| GENERAL BILLING ISSUE | | 11/19  Internet: Misc Charge         $00.00 |
| GREAT! Thanks so much for helping me. | | |
| | | • 10/15/2016-11/15/2016            $136.26 |
| EMPTY SLOT | Yes please. | Statement Paid |
| | | |
| | Great! I have successfully sent the email on how to set it up. Also, the refund on Movie 2 has been processed. Your new balance is $120.23. | • 9/15/2016-10/15/2016             $112.38 |
| EMPTY SLOT | | Statement Paid |
| | type here | Knowledge Base | Customer History | • Customer Profile |

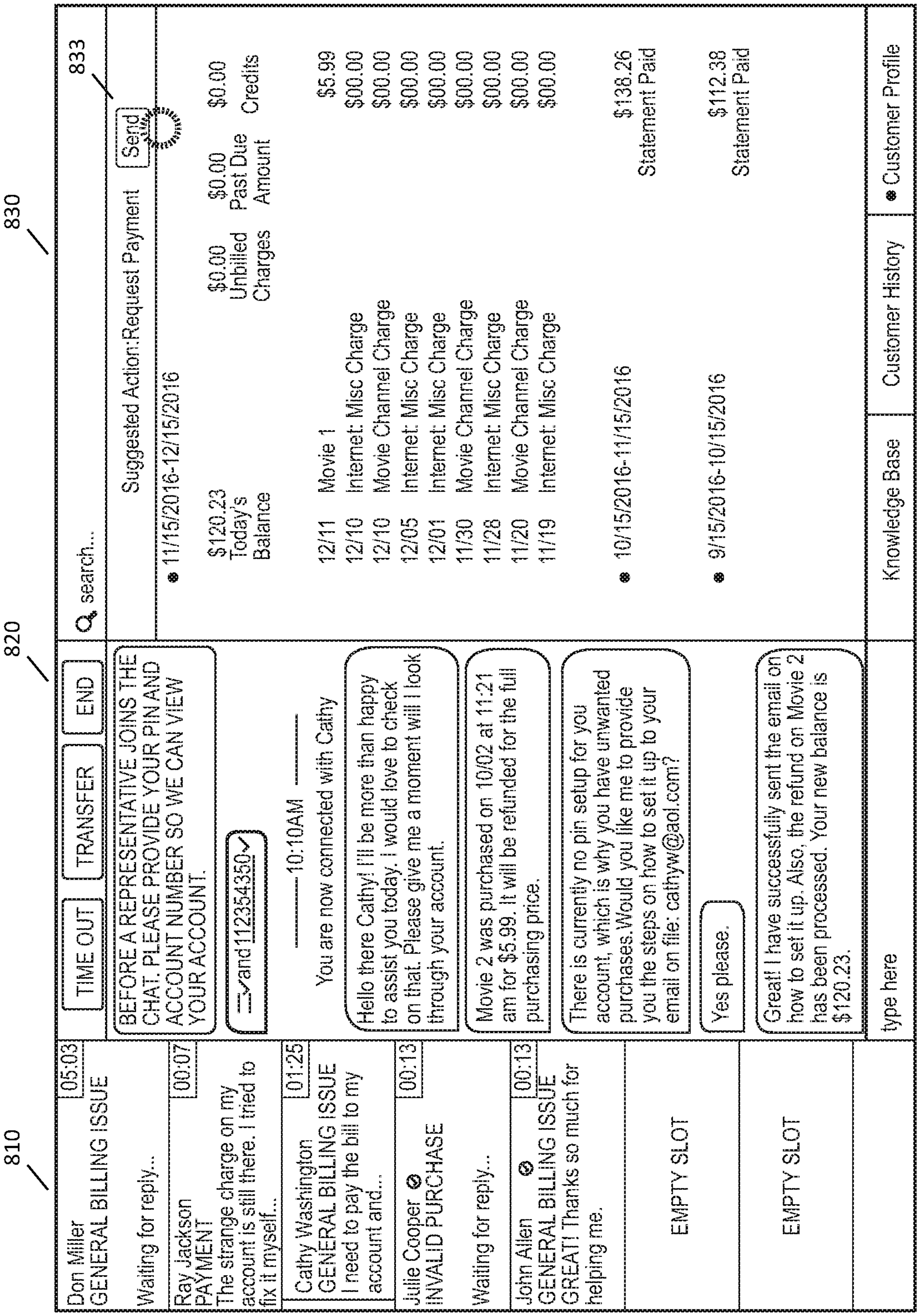

| Don Miller | 05:03 |
| GENERAL BILLING ISSUE | |

Waiting for reply...

| Ray Jackson | 00:07 |
| PAYMENT | |

The strange charge on my account is still there. I tried to fix it myself...

| Cathy Washington | 01:25 |
| GENERAL BILLING ISSUE | |

I need to pay the bill to my account and...

| Julie Cooper ⊘ | 00:13 |
| INVALID PURCHASE | |

Waiting for reply...

| John Allen ⊘ | 00:13 |
| GENERAL BILLING ISSUE | |

GREAT! Thanks so much for helping me.

EMPTY SLOT

EMPTY SLOT

820

[ TIME OUT ] [ TRANSFER ] [ END ]

Before a representative joins the chat please provide your pin and account number so we can view your account ⎯ ✓ and 112354350 ✓

———— 10:10AM ————

You are now connected with Cathy

Hello there Cathy! I'll be more than happy to assist you today...

Movie 2 was purchased on 10/02 at 11:21 am for $5.99....

There is currently no pin setup for you account, which is why you have unwanted...

Great! I have successfully sent the email on how to set it up....

———— 10:13AM ————

Customer payment has been received the current balance on the account is $0.00.

Thanks for your December payment of $120.23!

I would like to make sure everything is working fine. is there anything else I can assist you with?

Have a good day, & thank you for everything :)

822

You're welcome! It's

830

🔍 search...

$120.23-STATEMENT RECEIVED!

• 11/15/2016-12/15/2016    $120.23
                                      Statement Paid

• 10/15/2016-11/15/2016    $138.26
                                        Statement Paid

• 9/15/2016-10/15/2016    $112.38
                                        Statement Paid

| Knowledge Base | Customer History | ● Customer Profile |

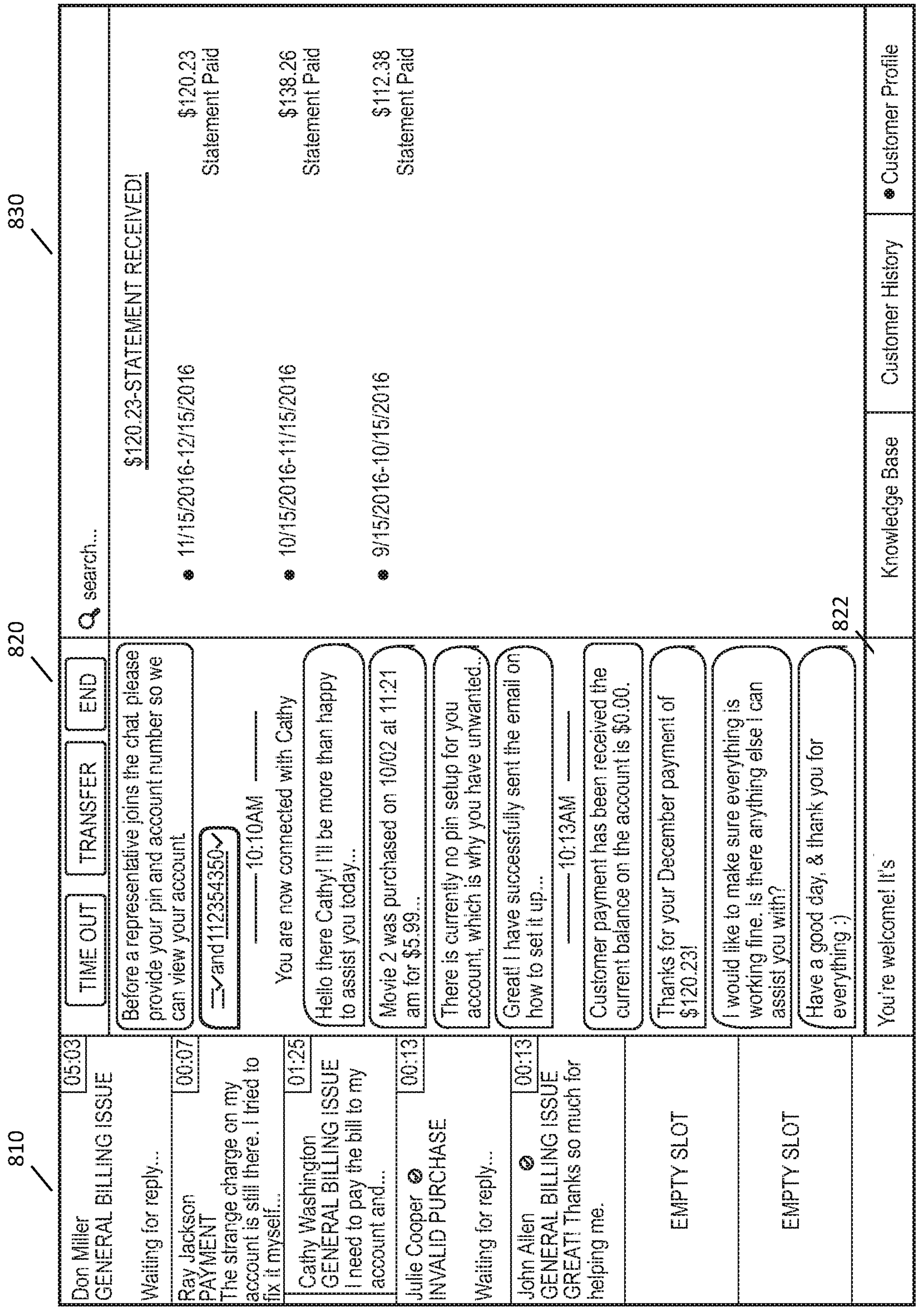

| Don Miller | 05:03 |
|---|---|
| NO CONNECTION | |
| Waiting for reply... | |

| Ray Jackson | 01:25 |
|---|---|
| SLOW CONNECTION | |
| Start 2 weeks ago my internet started being damn slow. | |

| Cathy Washington | 00:07 |
|---|---|
| Intermittent Connection | |
| The last time I logged in was about a month ago. I have... | |

| Julie Cooper ⊙ | 00:13 |
|---|---|
| SLOW CONNECTION | |
| Waiting for reply... | |

| Harry Goldstein ⊙ | 12:02 |
|---|---|
| Intermittent Connection | |
| Waiting for reply... | |

| John Allen | 00:32 |
|---|---|
| SLOW CONNECTION | |
| Okay I've connected the wires again. What do I need to do to do after that?? | |

EMPTY SLOT

820

[ TIME OUT ] [ TRANSFER ] [ END ]

up with her to see if the system has been successfully installed.

RESOLVED:
——— 06/01/15 AT 4:12PM ———

——— Opened Service Chat: 10:08am ———

How can we help you?

Starting from 2 weeks ago, my internet started being really slow for no reason

——— 10:10AM ———

You are now connected with Ray

I'm sorry to hear that your internet has been slow, let's get this issue fixed immediately.

type here

830

Q search...

Suggested Troubleshooting: Slow Connection  [ Start ] 834

✎ CLICK ON ANY ITEM TO EDIT

NAME           ADDRESS
Ray Jackson    323 Your Street
NUMBER         Your Town, ST 32345
+1-(123)456-0001
               ID Number
EMAIL          #28372830
rayj29@email.com  SERVICES
               📶 🔊 ▢

● Network Health                           + EXPAND

● Account Information                      + EXPAND

○ Open Tickets                             + EXPAND

○ Open Work Orders                         + EXPAND

○ Diagnostics                              + EXPAND

○ Internet

| Knowledge Base | Customer History | ● Customer Profile |

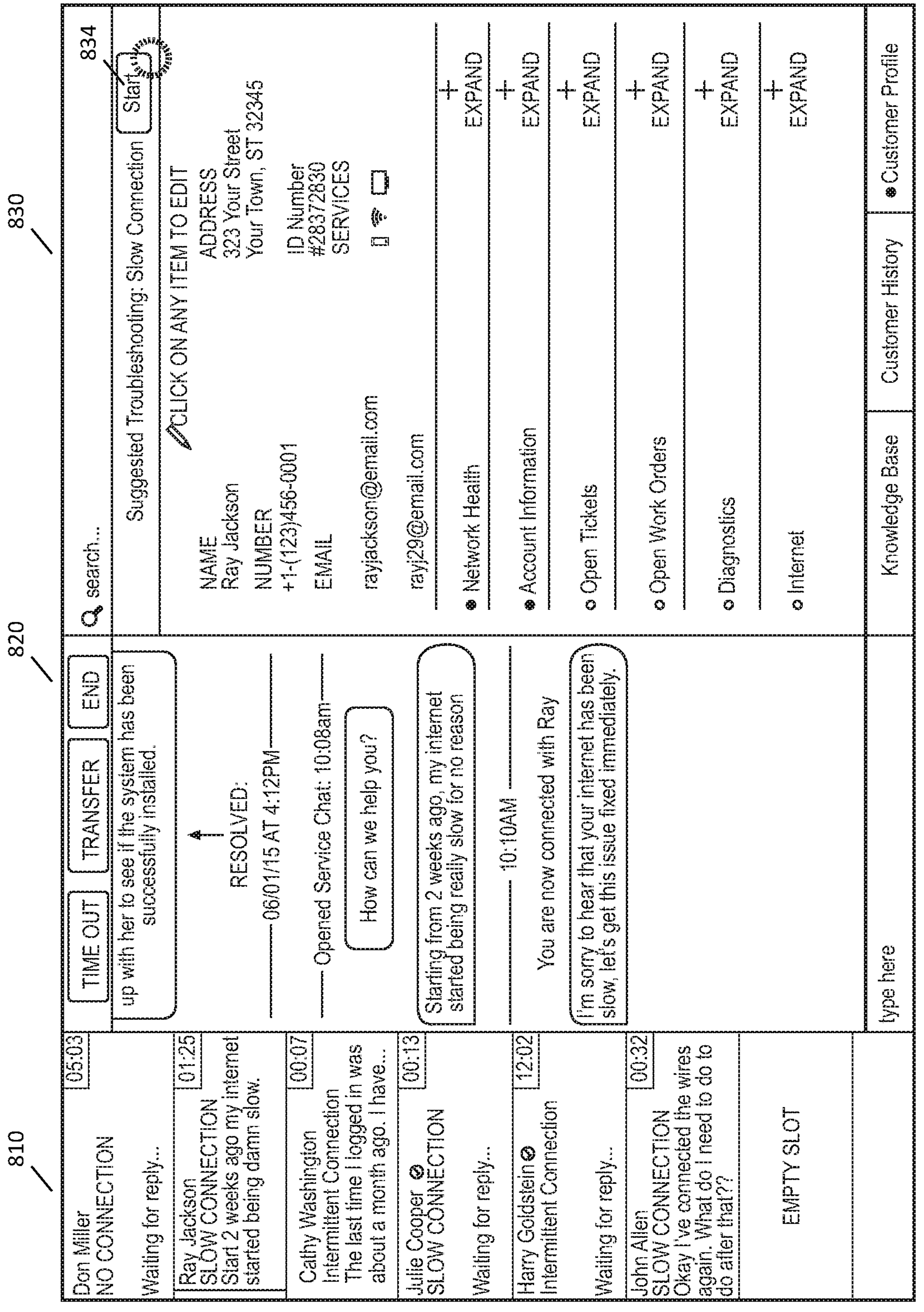

Don Miller
NO CONNECTION
05:03
Waiting for reply...

Ray Jackson 01:25
SLOW CONNECTION
Start 2 weeks ago my internet started being damn slow.

Cathy Washington 00:07
Intermittent Connection
The last time I logged in was about a month ago. I have...

Julie Cooper 00:13
SLOW CONNECTION
Waiting for reply...

Harry Goldstein 12:02
Intermittent Connection
Waiting for reply...

John Allen 00:32
SLOW CONNECTION
Okay I've connected the wires again. What do I need to do to do after that??

EMPTY SLOT

820

TIME OUT  TRANSFER  END up with her to see if the system has been successfully installed.

—————— RESOLVED: ——————
—————— 06/01/15 AT 4:12PM ——————

———— Opened Service Chat: 10:08am ————

How can we help you?

Starting from 2 weeks ago, my internet started being really slow for no reason

————————— 10:10AM —————————

You are now connected with Ray

I'm sorry to hear that your internet has been slow, let's get this issue fixed immediately.

Are you experiencing this issue with you In-Home Network or with a public Satellite WiFi Hotspot?

My In-Home Network type here

830

🔍 search...

Technical Issue  >  Slow Connectivity

STEP 1
Is the customer experiencing the issue with:

IN-HOME NETWORK | Satellite Network Hotspot

⬆
?
Send
Question

● Knowledge Base | Customer History | Customer Profile

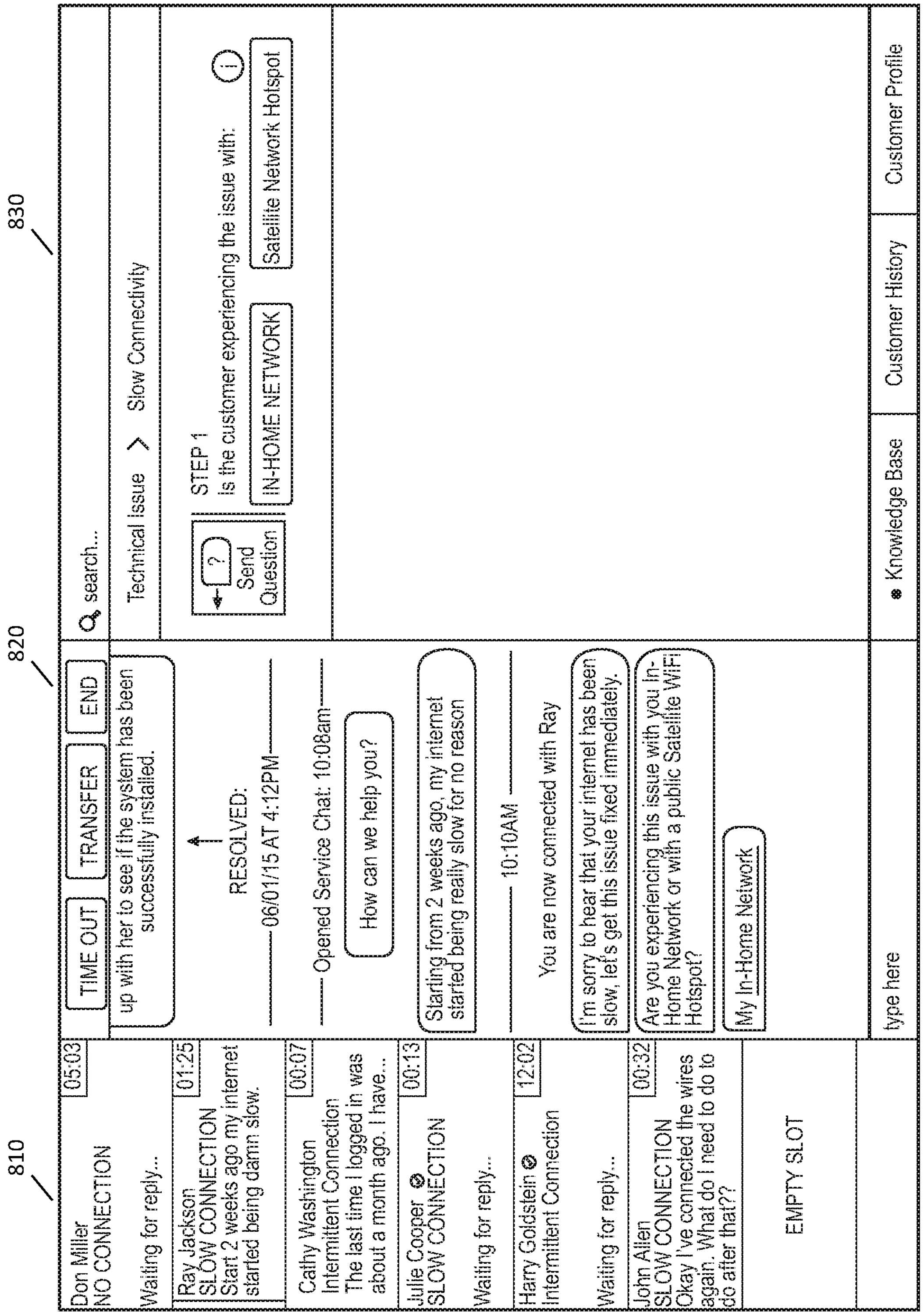

Fig. 8L

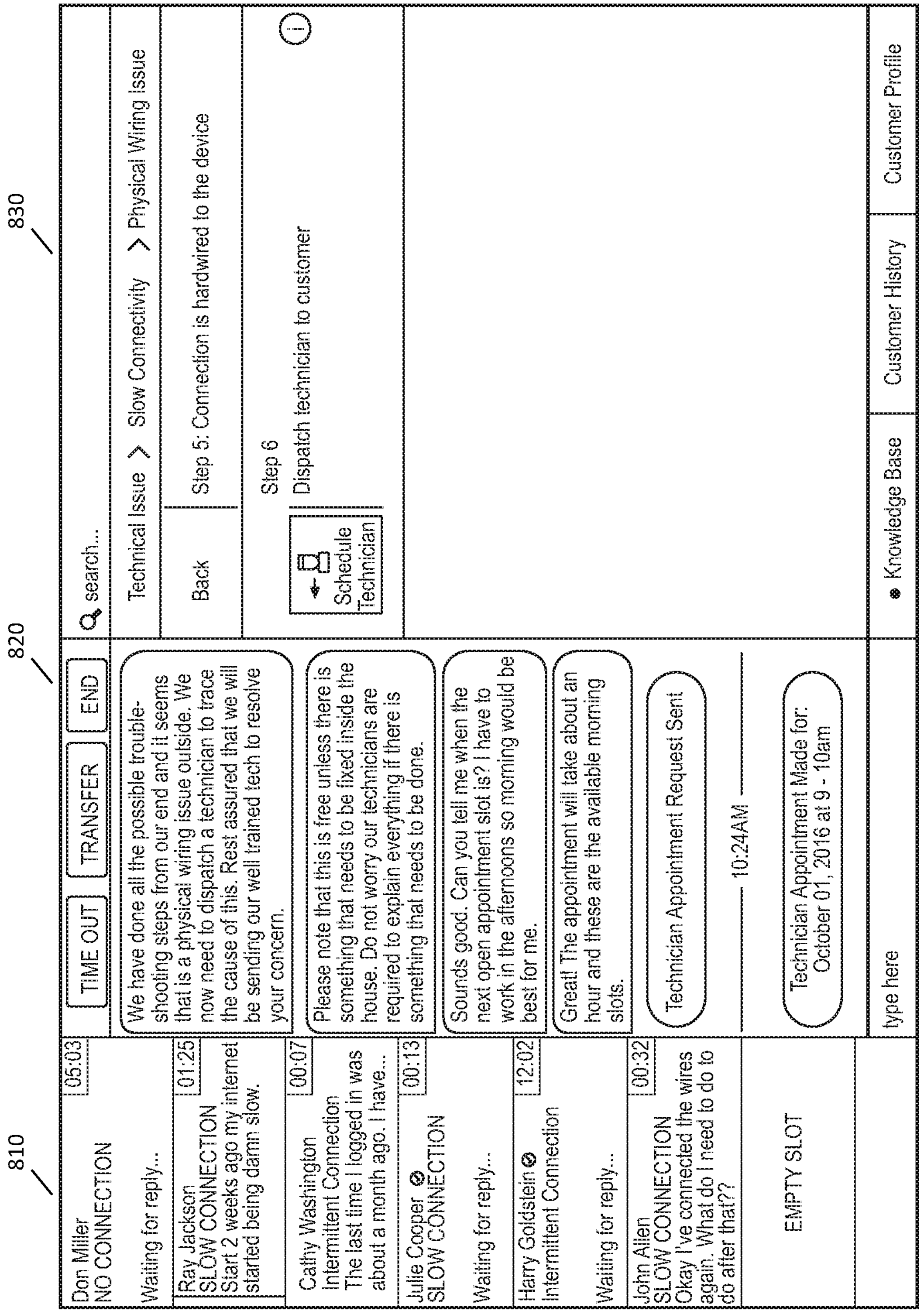

| Don Miller | 05:03 |
| NO CONNECTION | |
| Waiting for reply... | |

| Ray Jackson | 01:25 |
| SLOW CONNECTION | |
| Start 2 weeks ago my internet started being damn slow. | |

| Cathy Washington | 00:07 |
| Intermittent Connection | |
| The last time I logged in was about a month ago. I have... | |

| Julie Cooper ⊙ | 00:13 |
| SLOW CONNECTION | |
| Waiting for reply... | |

| Harry Goldstein ⊙ | 12:02 |
| Intermittent Connection | |
| Waiting for reply... | |

| John Allen | 00:32 |
| SLOW CONNECTION | |
| Okay I've connected the wires again. What do I need to do to do after that?? | |

EMPTY SLOT

820

[ TIME OUT ] [ TRANSFER ] [ END ]

We have done all the possible trouble-shooting steps from our end and it seems that is a physical wiring issue outside. We now need to dispatch a technician to trace the cause of this. Rest assured that we will be sending our well trained tech to resolve your concern.

Please note that this is free unless there is something that needs to be fixed inside the house. Do not worry our technicians are required to explain everything if there is something that needs to be done.

Sounds good. Can you tell me when the next open appointment slot is? I have to work in the afternoons so morning would be best for me.

Great! The appointment will take about an hour and these are the available morning slots.

( Technician Appointment Request Sent )

———————— 10:24AM ————————

( Technician Appointment Made for: October 01, 2016 at 9 - 10am )

type here

830

Q search...

Technical Issue > Slow Connectivity > Physical Wiring issue

| Back | Step 5: Connection is hardwired to the device |

Step 6
Dispatch technician to customer    ⓘ

[icon] Schedule Technician

● Knowledge Base   |   Customer History   |   Customer Profile

/ 810

| Don Miller | 05:03 |
| NO CONNECTION | |

Waiting for reply...

| Ray Jackson | 01:25 |
SLOW CONNECTION
Start 2 weeks ago my internet started being damn slow.

| Cathy Washington | 00:07 |
Intermittent Connection
The last time I logged in was about a month ago. I have...

| Julie Cooper ● | 00:13 |
SLOW CONNECTION

Waiting for reply...

| Harry Goldstein ● | 12:02 |
Intermittent Connection

Waiting for reply...

| John Allen | 00:32 |
SLOW CONNECTION
Okay I've connected the wires again. What do I need to do to do after that??

EMPTY SLOT

/ 820

[ TIME OUT ] [ TRANSFER ] [ END ]
                       \ 823

Sounds good. Can you tell me when the next open appointment slot is? I have to work in the afternoons so morning would be best for me.

Great! The appointment will take about an hour and these are the available morning slots.

( Technician Appointment Request Sent )

——— 10:24AM ———

Technician Appointment Made for:
October 01, 2016 at 9 - 10am

Thanks, we've received you appointment request and a technician will be in contact with you soon!

Actually yes, I have a question about my online account.... I can't access it.

No problem, I'll transfer you over to our Accounts department so they can help you.

type here

/ 830

🔍 search...

Oct 1, 2016 ● Technician
           Hardwiring Issue Visit

October ——————————————

Sept 26, 2016 ● Chat                    Current
               Connection Issue

New Events

Past Events

Sept 22, 2016 ● Customer Profile
               Email Change

Sept 22, 2016 ● Billing
               September Payment Received

Sept 22, 2016 ● Chat                    Resolved
               Billing Issues

Sept 04, 2016 ● Service Change
               Cancelled Movie Service

Sept 04, 2016 ● Chat                    Resolved
               Billing Issues

Sept 04, 2016 ● Technician
               Cable Installation Visit

September ——————————————

Aug 29, 2016 ● Chat                     Resolved
              Cable Installation

| Knowledge Base | ● Customer History | Customer Profile |

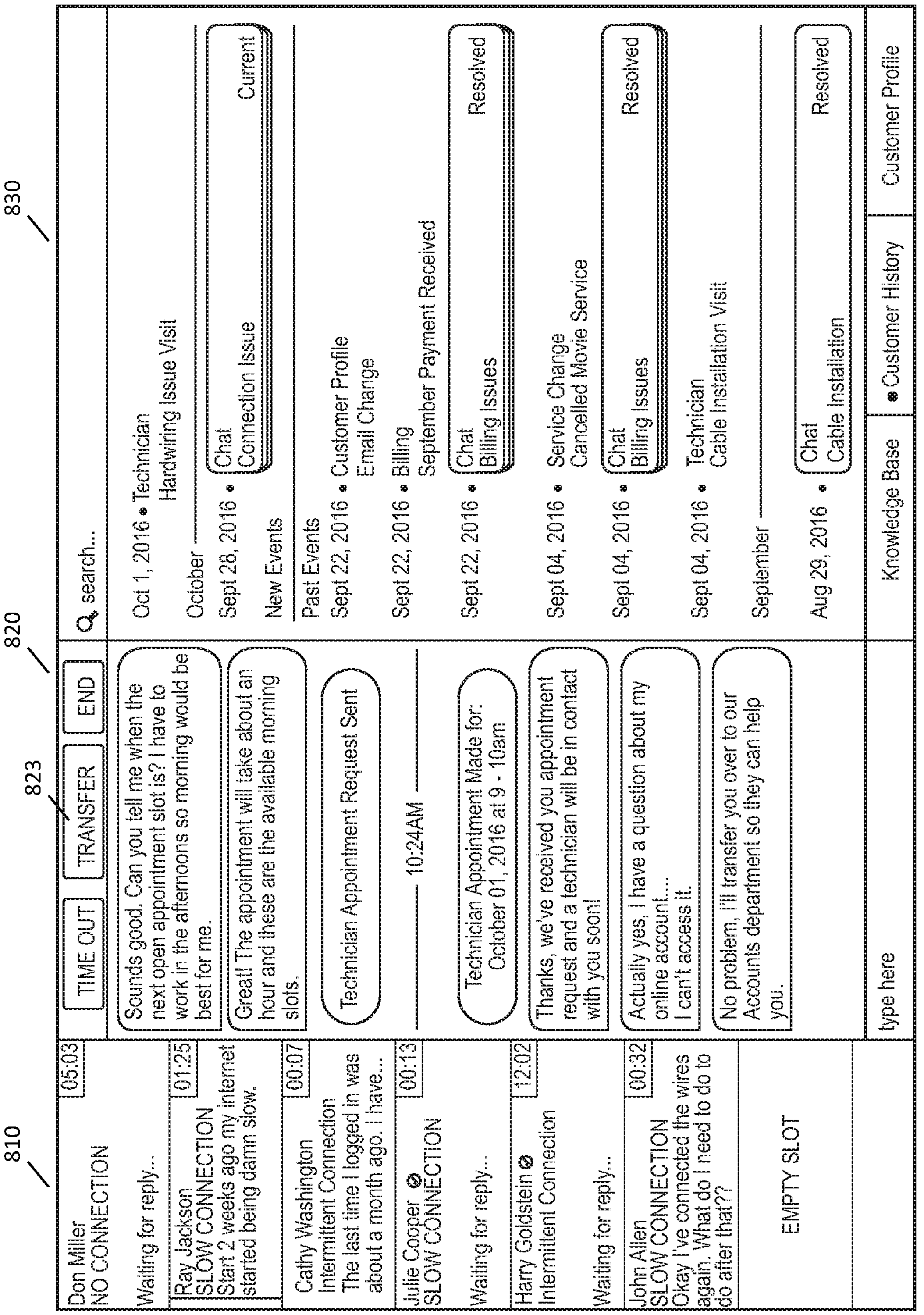

Fig. 8Q

PREDICTING CUSTOMER SUPPORT REQUESTS

CLAIM OF PRIORITY

This patent application is a continuation of U.S. patent application Ser. No. 16/110,742, filed Aug. 23, 2018.

U.S. patent application Ser. No. 16/110,742 is a continuation of U.S. patent application Ser. No. 15/638,543 filed on Jun. 30, 2017.

U.S. patent application Ser. No. 15/638,543 is a continuation-in-part of U.S. patent application Ser. No. 15/254,008 filed on Sep. 1, 2016 and issued on Jul. 25, 2017 as U.S. Pat. No. 9,715,496, which claims the benefit of U.S. Patent Application Ser. No. 62/359,841, filed on Jul. 8, 2016.

The content of each of the foregoing applications/patents is hereby incorporated by reference in the entirety for all purposes.

FIELD OF THE INVENTION

The present invention relates to using semantic processing to improve customer support.

BACKGROUND

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter.

Some existing techniques for allowing customers to interact with companies may be a nuisance to the customer. Navigating to the right page on a website or an app or navigating a voice menu on a phone call may be time consuming. Some existing techniques for allowing customers to interact with companies may be expensive for a company to implement. Hiring customer service representatives to manually respond to requests and answer phone calls may be a significant expense.

BRIEF DESCRIPTION OF THE FIGURES

The invention and the following detailed description of certain embodiments thereof may be understood by reference to the following figures.

DETAILED DESCRIPTION

Described herein are techniques for using semantic processing to respond to a request of a user. Although the techniques described herein may be used for a wide variety of users and requests, for clarity of presentation, an example of a company providing a response to a request of a customer will be used. The techniques described herein, however, are not limited to customers and companies, responses may be provided to requests from users who are not customers, and responses may be from any entity or person. Semantic processing may be used to automate responses to a request, to assist a user in making a request, and/or to assist a responding user in formulating a response to a request.

Semantic processing may be used to provide a fully automated experience for the customer. The use of semantic processing allows a customer to obtain needed information or needed support by making a request using natural language. The use of natural language for making requests, may allow the customer to receive a resolution to his request more quickly than with other methods of making requests. In some instances, the customer's request may be resolved with a single interaction. For example, where the customer asks, "When is my package arriving?," the response may be, "Your package is scheduled to arrive on Wednesday and has tracking number 1234."

Semantic processing may also be used to improve the customer support experience for the customer and to improve the efficiency of a company in providing support to a customer. Semantic processing may be used to understand the meaning of a customer's request and make it easier for a customer service representative to respond to the request. In some implementations, a user interface presented to a customer service representative may be automatically updated based on the semantic meaning of a customer request. For example, where a customer asks his Internet service provider why his Internet is not working, the user interface of a customer service representative may be automatically updated to show information about service outages.

Figure 1A:
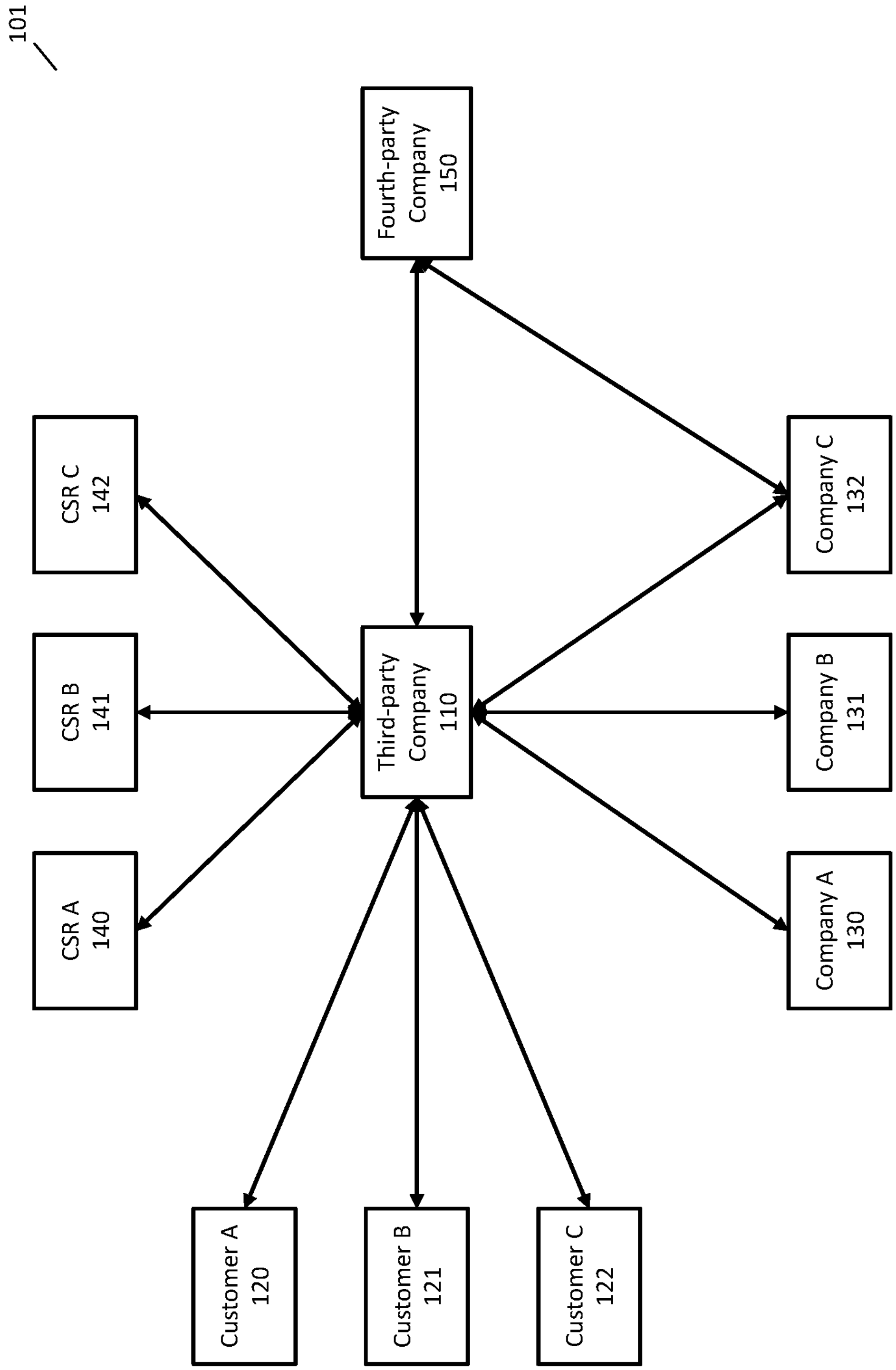
FIGS. 1A-1C are example systems by which a third-party company may provide customer support services to companies.
Figure 1B:
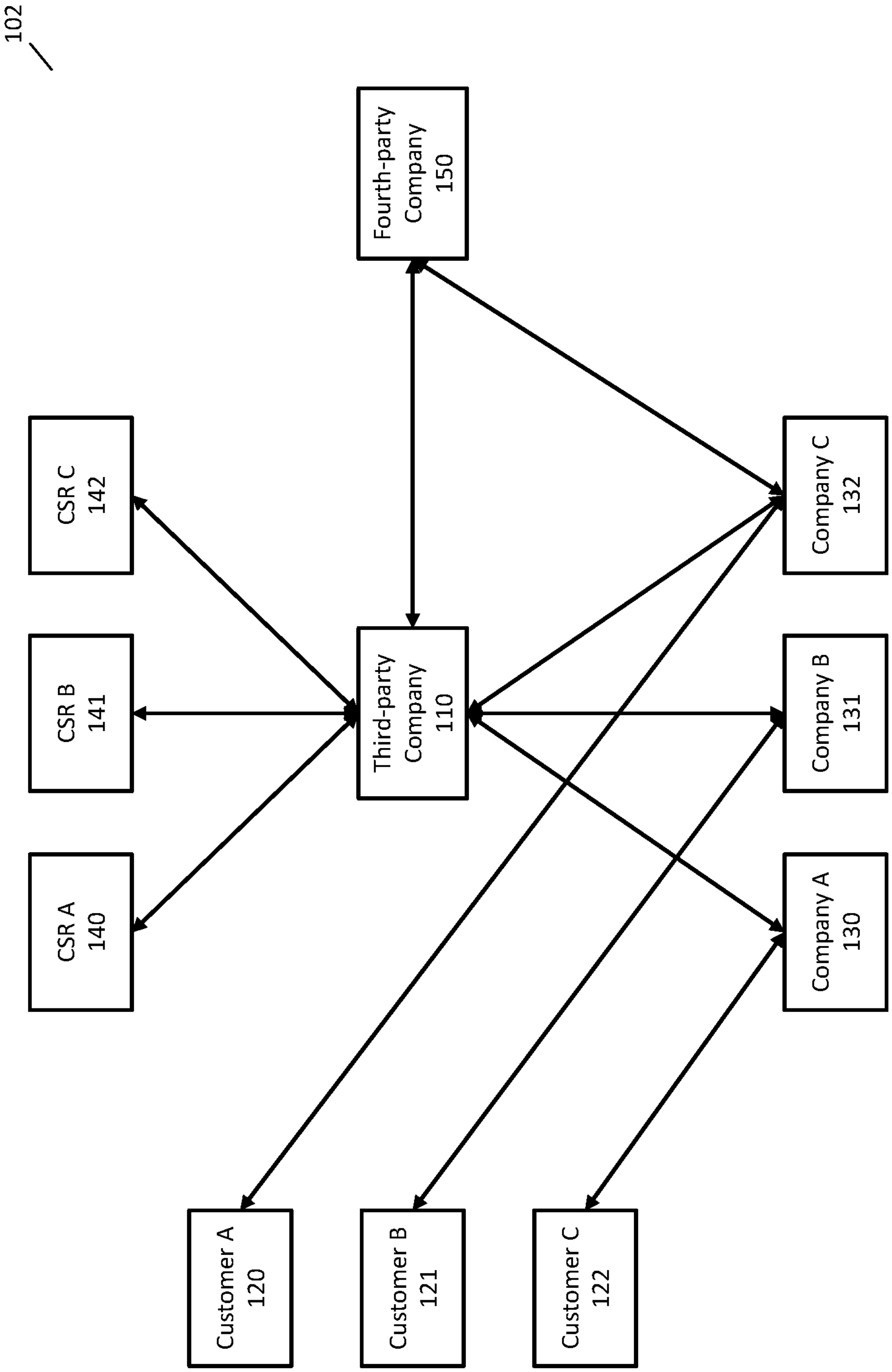
Figure 1C:
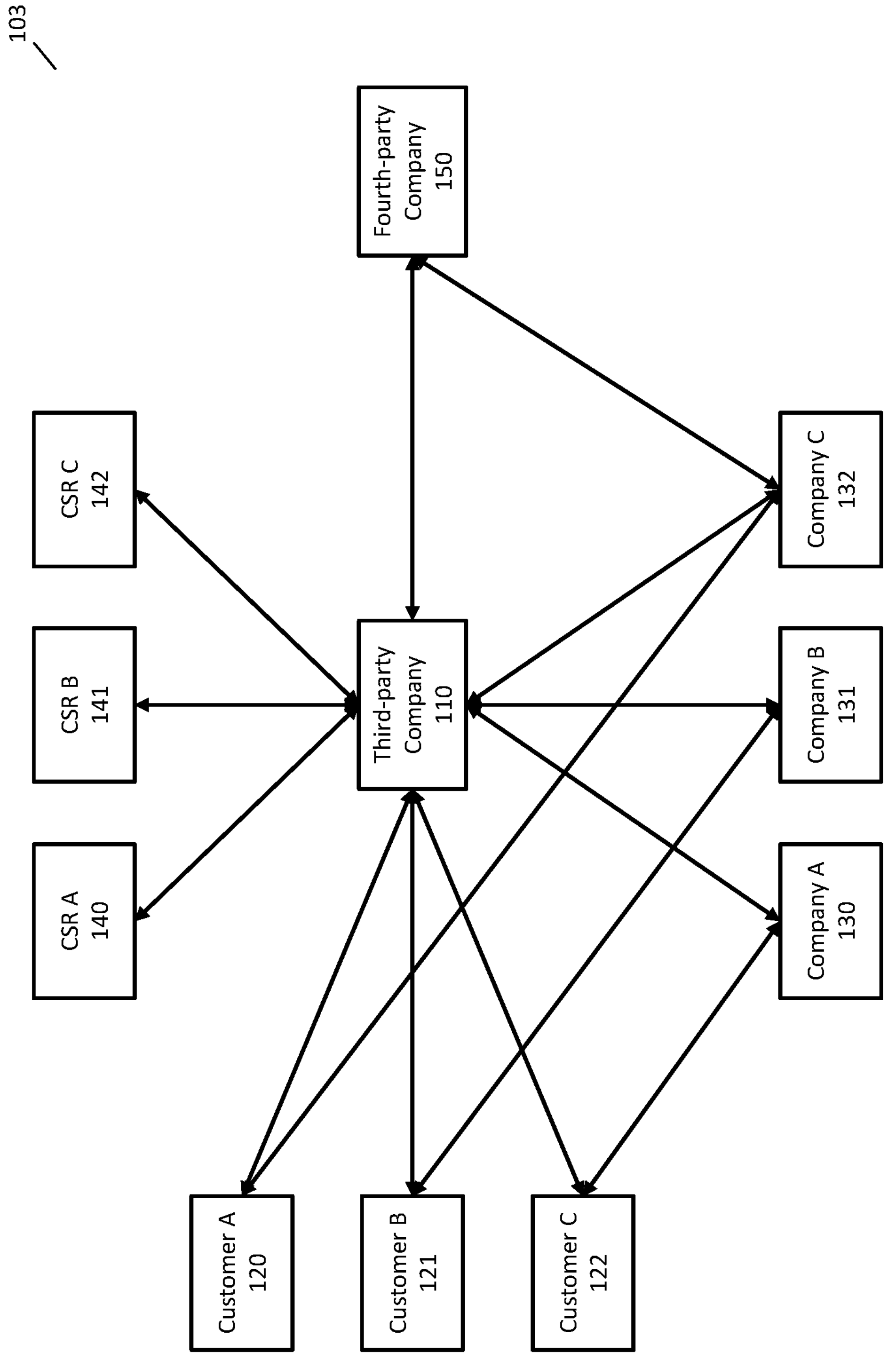

A company providing customer support to its customers may desire to use the services of a third-party company to improve the customer support experience and to reduce overall customer support costs. For example, a company may find it more cost effective to use semantic processing services of a third-party company than to implement its own semantic processing services. FIGS. 1A-C illustrate three different architectures that may be used by a company to obtain assistance from a third-party company in providing customer support to its customers.

FIG. 1A illustrates a system 101 that allows a third-party company 110 to provide customer support services to multiple companies where the third-party company 110 is an intermediary between the customer and the company for all communications between the customer and the company. In FIG. 1A, third-party company 110 is providing customer support services to company A 130, company B 131, and company C 132. Third party company 110 may provide customer support services to any number of companies.

Customers of each company may seek customer support from a company via third-party company 110, and it may or may not be apparent to the customers whether they are seeking customer support directly from the company or via third-party company 110. For example, customer A 120 may be seeking support from company A 130, customer B 121 may be seeking support from company B 131, and customer C 122 may be seeking support from company C 132.

Third-party company 110 may assist a company in providing customer support in a variety of ways. In some implementations, third-party company 110 may automatically respond to a request of a customer by using semantic processing of text of a customer request. In some implementations, third-party company 110 may assist in connecting a customer with a customer service representative (CSR) working on behalf of the company. For example, third-party company 110 may select a CSR, may provide a user interface to a customer to make it easier for a customer to request support, and may provide a user interface to a CSR to assist the CSR in responding to a request of a customer.

In FIG. 1A, third-party company 110 has connected customer A 120 with CSR A 140, has connected customer B 121 with CSR B 141, and has connected customer C 122 with CSR C 142. Each CSR may have any appropriate relationship with the company on behalf of which it is providing customer support. For example, a CSR may be an employee or contractor of a company and providing customer support to only customers of that company, or a CSR may be providing services to multiple companies and providing support to customers of the multiple companies at the same time.

In some implementations, third-party company 110 may also use services of a fourth-party company 150 in providing support services to companies. For example, third-party company 110 may use fourth-party company 150 in providing support services to company C 132. Fourth-party company 150 may provide any services relevant to providing customer support to a customer. For example, fourth party-company 150 may provide payment services or provide information to be provided to the customer or CSR, such as information associated with the weather or stock prices.

FIG. 1B illustrates a system 102 that allows third-party company 110 to provide customer support services to multiple companies where third-party company 110 communicates with the companies but does not communicate directly with customers. In FIG. 1B, the customers have network connections with the corresponding companies but not directly with third-party company 110.

To use the customer support services of third-party company 110, a company may issue requests to servers of third-party company 110. In some implementations, third-party company 110 may provide an API (e.g., a REST API) via its servers to allow the company to use the customer support services. For example, company A 130 may receive a request from customer A 120 and desire to use the services of third-party company 110. Company A 130 may have its servers issue a request to servers of third-party company 110 to determine an automatic response, to connect customer A 120 with CSR A 140, or to provide user interfaces to Customer A 120 or CSR A 140. In some implementations, the request from company A 130 to third-party company 110 may include all information needed for third-party company 110 to provide its services, such as the text of the request, previous messages between customer A 120 and company A 130, or information from a customer profile of customer A 120. In some implementations, the servers of third-party company 110 may request information from servers of company A 130 in providing customer support services.

FIG. 1C illustrates a system 103 that allows third-party company 110 to provide customer support services to multiple companies where customers may communicate directly with the corresponding company and/or third-party company 110. In FIG. 1C, third-party company 110 may provide customer support services to companies using any combination of the techniques described above. In FIG. 1C, the customers have network connections with both the corresponding companies and third-party company 110.

Where customers are connected to both a company and third-party company 110, each of the two connections may be used for different kinds of requests. For example, where the customer is interacting with the company in a way that does not require the services of third-party company 110 (e.g., navigating a web site of the company), the customer may use the network connection with the company. Where the customer is interacting with the company in a way that uses the services of third-party company 110, the connection with the third party may be used. It may not be apparent to the customer whether the customer is using a network connection with the company or with third-party company 110.

Figure 2:
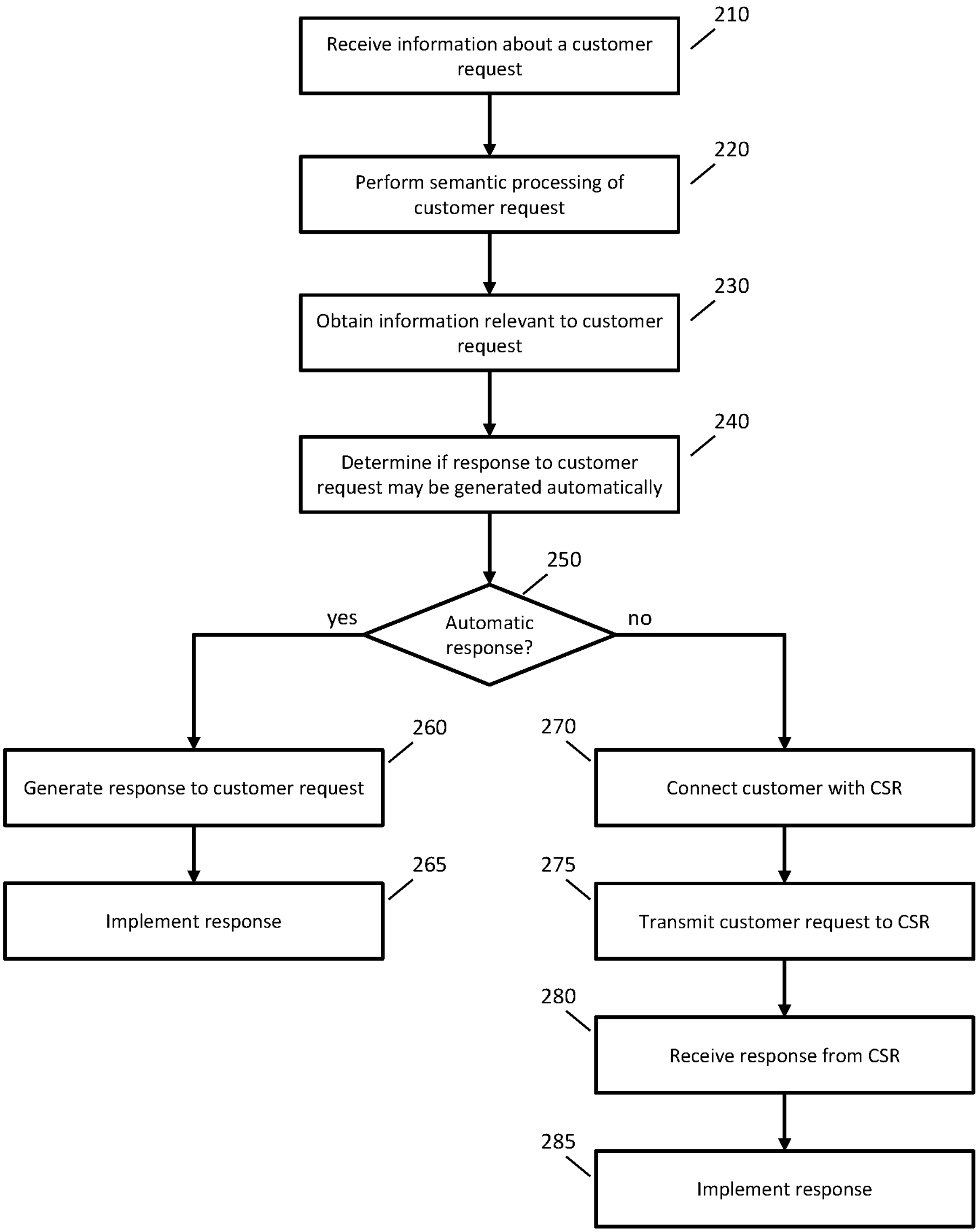
FIG. 2 is a flowchart of an example implementation of providing customer support services by generating an automatic response to a request or using a customer service representative to respond to a request.

FIG. 2 is a flowchart illustrating an example implementation of assisting a company in providing customer support to a customer using system 101 of FIG. 1A. In FIG. 2 and other flowcharts herein, the ordering of the steps is exemplary and other orders are possible, not all steps are required and, in some implementations, some steps may be omitted or other steps may be added. The process of the flowcharts may be implemented, for example, by any of the computers or systems described herein.

At step 210, information about a customer request is received at a computer of third-party company 110. The information about the customer request may include any relevant information, such as text of a message from the customer, information about a customer (e.g., an IP address, a customer ID, or authentication credentials), or information about the company from which the customer is seeking customer support (e.g., a company ID). The information about the request may be received directly from a customer device or may be received via a server of the company from whom the customer is requesting support. In some implementations, some information may be received directly from the customer device and some information may be received from a server of the company.

The customer device may be any appropriate device, such as a smart phone, tablet, wearable device, or Internet of things device. The customer may submit the request using any appropriate technique, such as typing or speaking a request to an app running on customer device (e.g., an app of the company or a third-party app created for processing customer requests), typing or speaking a request on a web page, sending a text message, or sending an email. As used herein, a text message includes any message sent as text including but not limited to a message sent using SMS (short message service) or a special-purpose application (e.g., Facebook messenger, Apple iMessage, Google Hangouts, or WhatsApp).

At step 220, semantic processing of the customer request is performed by third-party company 110 to determine a meaning of the customer request. The semantic processing may be specific to the company that that customer is requesting support from. For example, third-party company may apply a first implementation of semantic processing for customers of company A, a second implementation of semantic process for customers of company B, and so forth. The semantic processing may receive as inputs any of the information described above, such as text of a message, a customer ID, or a company ID. In some implementations, third-party company may request information from servers of a company to be used during the semantic processing, such as information about the customer or information about the state of the company's services (e.g., service outages). Semantic processing may be used to select an intent of the customer request from a specified set of intents. For example, the company may have defined a set of intents relating to services provided by the company, such as adding new services, canceling services, billing, or technical support.

In some implementations, an intent may be selected using a directed graph where nodes of the graph may be associated with one or more intents. For example, the graph may be tree that hierarchically organizes the possible intents. As the tree is traversed, the nodes may become more specific. For example, a current node may relate to technical support, and child nodes of the current node may relate to technical support for phone services, technical support for television services, and technical support for Internet services. For another example, a current node may relate to billing, and child nodes of the current node may relate to obtaining a recent bill, overdue bills, and refunds.

The graph may have a starting node, and the graph may be traversed until a stopping node is determined. An intent associated with the stopping node may then be selected. The graph may be traversed by using classifiers associated with the nodes. For example, each node of the graph may be associated with a classifier, where the classifier may output a decision to stay at the current node (e.g., the current node is a stopping node) or to proceed to a child node of the current node. The graph may be traversed using any appropriate techniques, such as a greedy search or a beam search.

In some implementations, a node of the graph may relate to seeking clarification from the customer. For example, it may be determined that a customer support request relates to technical support, and the customer may be presented with a request to clarify the subject of the technical support request. The customer may be presented, for example, with a multiple-choice list to clarify the request. After receiving the clarification, the process may continue from the current node or may restart at a start node of the graph.

The semantic processing techniques used to process a customer request may include any of the techniques described in U.S. patent application Ser. No. 15/254,101, which is hereby incorporated by reference in its entirety.

At step 230, servers of third-party company 110 may obtain information relevant to the customer request from servers of the company. Any relevant information may be obtained, such as information about the customer or information about the state of the company's services. For example, where it is determined that the customer's request relates to a service outage, information about the state of the company's services in the geographic region of the customer may be requested from the company.

At step 240, servers of third-party company 110 determine whether a response to the customer request may be determined automatically or if a CSR is needed to determine a response to the customer request. Determining whether a CSR is needed may depend on the result of the semantic processing (e.g., the selected intent) and any of the information described above (e.g., information about the customer or company). For example, a request to provide an amount of the most recent bill or the due date of a payment may be performed automatically because the information may be retrieved from a server of the company. Where a customer asks why his Internet service is not working, whether a CSR is needed may depend on other information, such as current known service outages. Where it is known that there is a current service outage currently affecting the customer's geographic location, this information may be provided automatically. Where there are no service outages affecting the customer, the customer may be connected to a CSR to help diagnose the problem.

Where it is determined at step 250 that a response may be generated automatically, then processing may proceed to step 260 where servers of third-party company 110 may determine a response to the customer request. Any appropriate techniques may be used to determine a response automatically, such as rules-based approaches or decision trees. The response may include one or more of sending a message to the customer or taking an action on behalf of the customer. For example, taking an action on behalf of the customer may include providing a refund, changing an address, making a payment, or adding or canceling a service.

At step 265, servers of third-party company 110 may implement the response. Implementing the response may include one or more of sending message to the customer directly, sending a message to the company to be sent to the customer, seeking clarification from the customer, or contacting a server of the company to cause an action to be performed on behalf of the customer.

Where it is determined at step 250 that a response may not be generated automatically, processing may proceed to step 270, where servers of third-party company 110 cause the customer to be connected with a CSR. In connecting a customer with a CSR, servers of third-party company 110 may select a CSR from a list of available CSRs. For example, a CSR may be selected based on the semantic processing (e.g., a CSR who is specialized to the customer's request) or based on an identity of the customer (e.g., selecting a CSR who speaks the same language as the customer or providing VIP support to certain customers). Third-party company may update its data stores to indicate that the selected CSR is helping a specific customer.

At step 275, servers of third-party company 110 cause information about the customer request to be transmitted to the selected CSR. The information may be sent directly to the CSR or may be sent to the company to send to the CSR. The information sent to the CSR may include any of the information described above, such as text of the customer's message or information about the customer.

At step 280, servers of third-party company 110 receive a response from the CSR. The response may be received directly from the CSR or may be received via the company. The response may include one or more of sending a message to the customer or taking an action on behalf of the customer.

At step 285, servers of third-party 110 implement the response, for example by using any of the techniques described above for step 265.

In some implementations, after step 265 or step 285, processing may proceed back to step 210 where additional information is received about a customer request. For example, another message may be received from a customer or a customer may provide additional information in other ways, such as by responding to a multiple-choice question. The additional information may relate to the previous request or may relate to a new support issue. The following are illustrative examples.

A customer may request support for a first issue and a response may be implemented automatically. The customer may then request support for a second issue that is different from the first issue.

A customer may request support for a first issue and a response may be implemented automatically. The customer may determine that the response did not fully address the first issue and may clarify the request or make another request.

A customer may request support for a first issue and a response may be generated automatically to seek clarification of the customer's request. For example, a customer may send a message that the Internet is not working, and the response may be a multiple-choice question that is generated and sent automatically to obtain more specific details (e.g., Wi-Fi not working, e-mail not working, etc.). The customer's selection of an answer to the multiple-choice question may be a second iteration of step 210.

A customer may request support for a first issue and the customer may be connected with a CSR. Each message typed by a customer may be considered receiving information at step 210. In some implementations, where a customer is connected with a CSR, then all messages received by the customer in the same session may be handled by the CSR, or a determination may be made for each message as to whether a response may be determined automatically or by a CSR. In some implementations, a CSR may determine that a response may be generated automatically and cause processing to proceed to step 260.

Figure 3A:
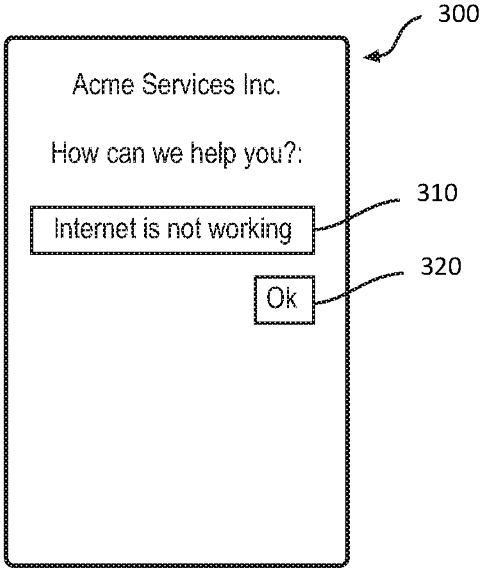
FIGS. 3A and 3B illustrate example user interfaces on a customer device for obtaining customer support.
Figure 3B:
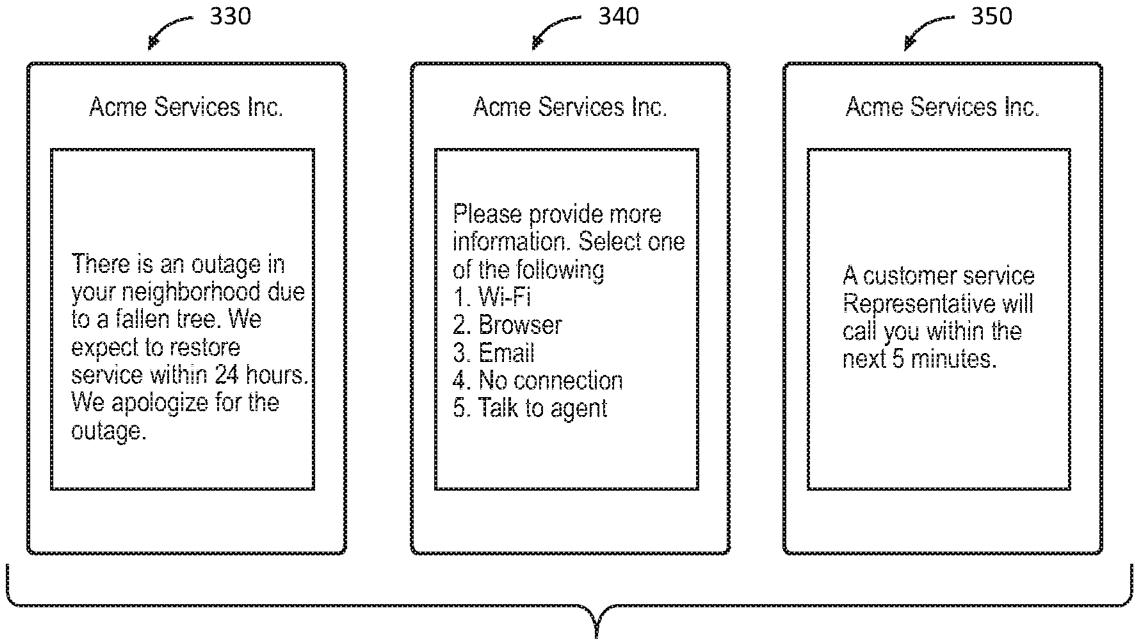

FIGS. 3A and 3B, illustrate example user interfaces on a customer device that may be used for requesting support from a company using the services of third-party company 110. FIG. 3A illustrates a user interface 300 with an example of a text box 310 presented on a customer device where a customer can send a request to a company. The customer may type the request using natural language in the same manner as if the customer was sending the message to a person. The customer may submit the request using a button, such as button 320. In some implementations, the customer may speak the request and the speech may be converted to text on any of the customer device, a server of the company, or a server of third-party company.

After the customer submits the request, the request may be processed as described above. FIG. 3B illustrates three example responses to the customer's request. In user interface 330, a response is provided that immediately answers the customer's question. In user interface 340, more information is needed from the customer and the response asks the customer to provide additional information. In user interface 340, the customer is asked to select one of several possible options but in other instances or implementations, the customer may be asked to provide additional information in other ways, such as by typing additional text. In user interface 350, the customer is connected with a CSR. The techniques described herein are not limited to the foregoing example responses, and any suitable response may be provided to a customer. For example, a customer requesting to change his or her phone number may be immediately provided with a form to allow the customer to enter a new phone number. The form may be provided, for example, by embedding the form into the same user interface used for requesting customer support, by automatically navigating an app to the appropriate screen, or by providing an appropriate web page.

In addition to providing automatic responses and connecting customers with CSRs, third-party company 110 may provide adaptive user interfaces to assist a customer in making a request or to assist a CSR in responding to a request of a customer. For example, semantic processing may be used to understand the meaning of a customer request and provide a user interface to a CSR that immediately surfaces relevant information and available actions that the CSR may use in responding to the customer.

Customer Service Representative User Interface

A CSR may be assisting multiple customers simultaneously. For example, a CSR may respond to a first customer and while waiting to hear back from the first customer, the CSR may respond to a second customer. A user interface (UI) may be presented to a CSR to make it easier for the CSR to respond to customers and to respond to multiple customers simultaneously.

A UI may be presented to a CSR using any appropriate techniques. In some implementations, a CSR may use a website provided by third-party company. For example, a CSR may sign in to the website with a user name and password. In some implementations, a CSR may use a special-purpose application, such as an application running on a desktop computer, laptop, tablet, smart phone, or other device. A CSR may communicate with a customer through the UI using any appropriate techniques, such as typing a message, speaking a message that is transcribed to text using speech recognition, or speaking with the customer through an audio connection (such as VOIP connection). For clarity of presentation, the following description will use text communication as an example, but the same techniques may also be used when communicating by speech.

Figure 8A:
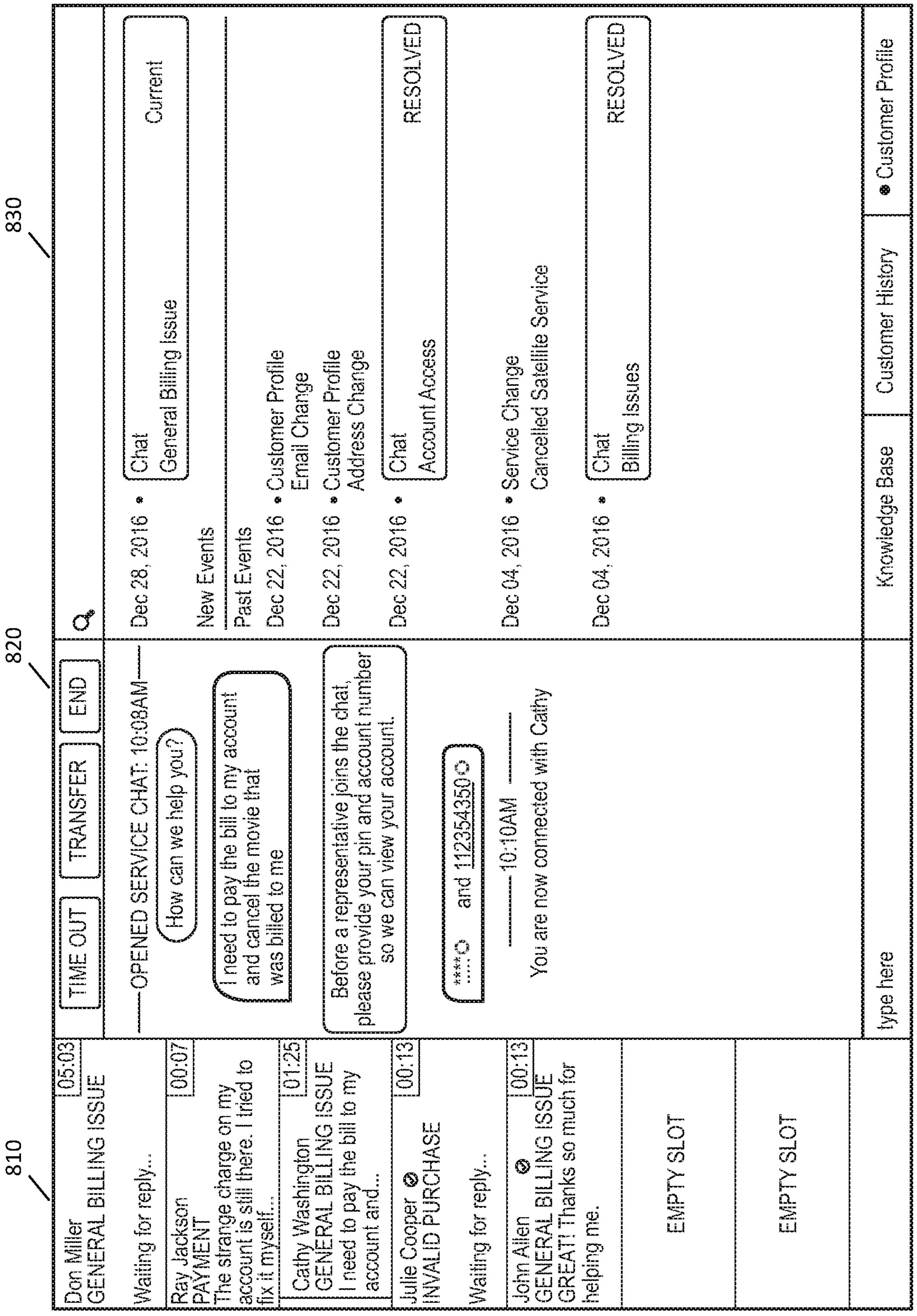
FIGS. 8A-8Q illustrate example user interfaces for a customer support session between a customer and a customer service representative.

FIGS. 8A-Q provide examples of user interfaces that may be used by a CSR and a customer in communicating with each other. For example, FIG. 8A presents a UI that may be used by a CSR. FIG. 8A includes a customer list portion 810, that may include a list of customers that the CSR is currently communicating with. FIG. 8A also includes conversation portion 820 that allows the CSR to see messages typed by a customer, type messages to the customer, and see the conversation history. FIG. 8A also includes an information portion 830 that provides additional information to assist the CSR, such as a customer profile, billing information, or the status of company services.

During a conversation between a customer and a CSR, each of the customer and the CSR may see the entire history of the conversation with messages from both the customer and the CSR. For example, each message transmitted by the customer may appear on a display of the customer device and in conversation portion 820 of the CSR UI. Each message transmitted by the CSR may also appear on the display of the customer device and in conversation portion 820 of the CSR UI. The customer may also see a history of conversations of previous support requests that were handled by the same or other CSRs.

The CSR UI may be presented to the CSR using any appropriate techniques. For example, the CSR UI may be presented by a web browser running on the CSR device or a special-purpose application running on the CSR device.

Further details of presenting a CSR UI using a web browser and a special-purpose application are now described.

When a CSR accesses a CSR UI using a web browser, the CSR may specify a web address that provides the CSR UI (e.g., by typing it in or accessing a book mark), such as a web address of a web site operated by third-party company. A web page may be provided by a server of third-party company and presented to the CSR. The CSR may authenticate or sign in by providing some form of user name and password. The CSR may sign in, for example, with authentication credentials provided by third-party company or using a single sign-on service. After signing in, the CSR may be presented with a CSR UI similar to FIG. 8A.

In presenting the CSR UI to the CSR, one or more files may be transmitted by a server of third-party company to the CSR device, such as an HTML file, a CSS file, or a JavaScript file. A browser running on the CSR device will process these files to generate the UI to present to the CSR. In processing the files, the browser may create a document object model (DOM) that represents the web page being presented to the CSR and execute JavaScript that may assist in presenting the web page and respond to actions of the CSR.

After presenting the initial web page to the CSR, the CSR device may later update portions of the web page using update data received from a server of third-party company or from another entity, such as a fourth-party company. The update data may be in any appropriate format (e.g., JSON or XML) and include information that may be used to update or modify a portion of the presented web page. Any appropriate techniques may be used to update a portion of the web page. For example, the CSR may perform an action, such as clicking on a button, that causes JavaScript running in the browser to request update data from a server of third-party company, receive the update data, and then update a portion of the web page by modifying the DOM using the update data. In some implementations, push techniques (e.g., Comet) may be used to allow the server of third-party company to push update data to the browser, and JavaScript running in the browser may receive the update data and modify the DOM to update a portion of the web page. In some implementations, JavaScript running in the browser may periodically poll the server of the third-party company to see if new update data is available, receive the update data, and update a portion of the web page using the received update data.

Accordingly, a web page presented to the CSR may be continuously updated based on actions performed by the CSR or update data received from the server. In some implementations, the CSR may only be presented with a single web page for the duration of the work day, and this single web page may be updated using the techniques described above (i.e., a "single page" web application). In some implementations, a CSR may sometimes be presented with a new web page in addition to updating an existing web page. For example, certain actions of the CSR may cause a new web page to be requested, or a new web page may be requested on a periodic basis, such as once an hour.

In some implementations, an initial web page presented to the CSR may not include any information about customers, and customer list portion 810 may not list any customers. When the CSR is assigned to assist a first customer, update data corresponding to the first customer may be received by JavaScript running in the browser, and a portion of the UI may be updated using the update data, such as by listing information about the customer in the customer list portion 810 and presenting an initial message from the customer in the conversation portion 820. As the CSR is assigned a second customer or is finished with the first customer, additional update data may be received and the UI may be further updated.

In some implementations, an initial web page presented to the CSR may include information about an initial list of one or more customers. For example, when the CSR first accesses the web page, a server may have already assigned one or more customers to the CSR, and the initial web page may include information about these customers. The web page may later be updated as indicated above.

Updating a portion of a UI presented to a CSR may provide for a better experience than loading an entirely new web page to update the UI. Loading an entirely new web page requires one or more files (e.g., HTML, CSS, JavaScript) to be downloaded from the server, creation of the DOM by browser, and rendering of the web page to the CSR. Accordingly loading a new web page may take longer than updating a portion of the UI, and cause the CSR to be less efficient in responding to customer requests.

When a CSR accesses a CSR UI using a special-purpose application, the CSR may open the application using the conventions of the operation system, such as by double-clicking or touching an icon. The CSR or someone else may have previously installed the application on the CSR device. The CSR may authenticate or sign in or authentication information may be stored on the CSR device so that the CSR does not need to sign in.

In presenting the CSR UI to the CSR, the application may use an application program interface (API) specific to the operating system of the CSR device. An operating system may provide an API that allows developers to present a UI, such as providing an API that allows for the presentation of a window and UI elements, such as buttons and text boxes.

In some implementations, the application includes executable code and UI information to allow the application to present a UI similar to the UI of FIG. 8A. The application may obtain information about customers and support requests using any appropriate techniques, such as by receiving update data pushed form a server of third-party company or polling a server of third-party company for update data.

In some implementations, when the application is launched, a UI will be presented to the CSR that looks similar to the UI of FIG. 8A but without any information about customers. The application may then obtain update data from a server, such as information about a first customer assigned to the CSR, and the application may update the UI using the update data, such as by presenting information about the customer in the customer list portion 810 and presenting an initial message from the customer in the conversation portion 820. In some implementations, the application may obtain update data from the server before presenting an initial UI. The UI may be continuously updated as the CSR continues to assist customers.

In some implementations, different CSRs may access the CSR UI using different platforms. For example, some CSRs may access the CSR UI using a web browser, some may access the CSR UI using a computer running Windows 10, and some may access the CSR using a tablet running iOS. To simplify the maintenance of server software for different platforms, the server may provide update data that is independent of the platform being used by the CSR. Accordingly, when update data is sent to a CSR device, the same update data may be sent to the CSR device regardless of the platform of the CSR device.

For example, when a new customer is assigned to a CSR, the following update data may be sent to the CSR device:

{"action": "newCustomer", "customerID": 12345, "customerName": "John Smith"}

When a CSR is finished with a customer, the following update data may be sent to the CSR device:

{"action": "removeCustomer", "customerID": 12345}

When a new message is received from the customer, the following update data may be sent to the CSR device:

{"action": "newMessage", "customerID": 12345, "message": "I need to pay my bill."}

The CSR device, regardless of the platform, may already have the information needed to process the update data and use it update a portion of the CSR UI. For example, where the CSR is using a web browser, JavaScript already running in the browser may process the received update data to modify a portion of the CSR UI by updating the DOM (e.g., using executable code and/or client side templates). Where the CSR is using a special-purpose application, the application may process the update data and use an API to modify a portion of the CSR UI shown by the application. For example, for adding a new customer, the CSR device may determine the next available slot in customer list portion 810 and add the customer name to that slot.

In some implementations, the update data may include at least some information describing the layout to be used to present the information in the update data. For example, the update data may be used to specify the content of information portion 830. This update data may include the information to be presented (e.g., a customer name) and information about how the information is to be presented (e.g., a layout in rows and/or columns). For example, the following update data may be sent to a CSR device:

```
{
  "action": "informationPortion",
  "UI": {
    "type": "rowList",
    "children": [
      {"type": "label", "value": "Customer Account"},
      {"type": "label", "value": "John Smith"}
    ]
  }
}
```

In this example, the "informationPortion" action may indicate that information portion 830 is to be updated, and the "UI" may indicate the text to be presented and also some formatting or layout information. For example, a first row to be presented may be the text "Customer Account" and a second row to be presented may be the text "John Smith."

Other presentation or layout information may be already present on the CSR device (e.g., in files processed by a web browser or part of a special-purpose application) that is specific to the platform being used by the CSR. For example, font size and line spacing may be different when the CSR UI is presented in browser and in a special-purpose application. Any combination of presentation or layout information stored on the CSR device (e.g., web application or special-purpose application) and included the update data may be used to present the CSR UI on the CSR device.

Customer User Interface

A customer may request support in a variety of ways, such as requesting support from a web page of the company, requesting support using a special-purpose application (e.g., a smartphone application), or sending a text message.

Where a customer requests support using a web page of the company, any appropriate techniques may be used to present a UI that allows the customer to request support. For example, a customer may select a control to cause a support UI to appear on top of other content on the web page.

In implementations where communications between the customer and third-party company 110 are done via the company the customer is requesting support from (e.g., as in FIG. 1B), the company may receive the support request from the customer and transmit the support request to third-party company 110. Company may then receive a response from third-party company 110 and cause that response to be presented in the support UI.

In implementations where the customer may communicate directly with both the company and the third-party company 110 (e.g., as in FIG. 1C), some actions of the customer may cause a request to be sent to the company and some actions of the customer may cause a request to be sent to third-party company 110. In some implementations, third-party company 110 may provide a support widget that the company may add to its web page. For example, the company may add information to its web page to cause the customer's browser to retrieve JavaScript from a server of third-party company 110 that causes the support UI to be presented on the web page. Some actions of the customer, such as clicking a link for information about the company's products may cause a request to be sent to a company server to retrieve a new web page. Some actions of the customer, such as requesting customer support using the support UI may cause a request to be sent directly to a server of third-party company 110.

A customer may sign in or authenticate with the company and/or the third-party company. In some implementations, the customer may sign in with the company and authentication credentials received from the company may be shared with third-party company to allow the customer to authenticate with third-party company (or vice versa). For example, a customer may sign in using a web page of the company and receive an authentication token from the company. Executable software running on the customer device (e.g., JavaScript) may cause the authentication token to be shared with other executable software that is used to allow the customer device to communicate with third-party company. Third-party may then receive the authentication token and use the authentication token to take actions on behalf of the customer.

A customer may also request support using a special-purpose application created by the company (or by third-party company) that the customer has installed on the customer device. As above, depending on the implementation, communications between the customer and third-party company 110 may be done via the company or may be done directly with third-party company 110.

Any of the techniques described above for the CSR UI may also be applied to a support UI presented to a customer. For example, an initial support UI may be presented to the customer, and polling or push techniques may cause update data to be sent to the customer device and cause a portion of the support UI to be updated or modified.

Adaptive User Interfaces

Third-party company 110 may provide adaptive user interfaces to the customer and/or CSR to improve the customer support process. In particular, third-party company may use semantic processing to determine the intent of a customer request, and adapt a UI based on the determined intent.

Figure 4:
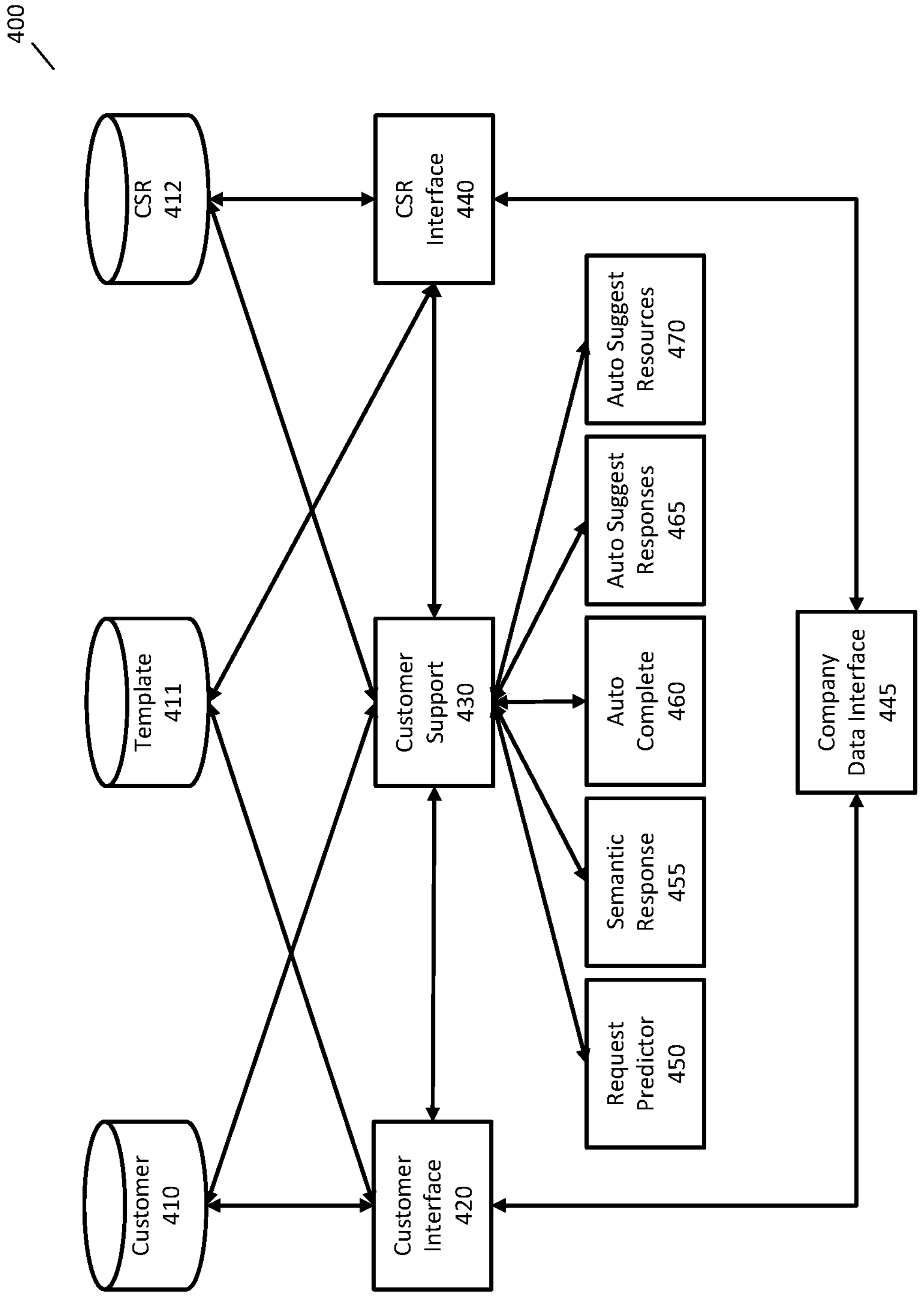
FIG. 4 is an example system by which a third-party company may provide customer support services to companies.

FIG. 4 illustrates a system 400 that may be used by third-party company 110 to provide adaptive user interfaces to a customer or CSR during a customer support session. FIG. 4 includes a customer interface component 420 that may send data to and receive data from a customer device, a CSR interface component 440 that may send data to and receive data from a CSR device, and a customer support component 430 that facilitates a customer support session between a customer and a CSR. These components may provide any of the functionality described above. FIG. 4 is an example implementation and the techniques described herein are not limited to the example of FIG. 4. For example, the components of FIG. 4 may be split into multiple components or merged together or other components may be included, such as load balancing or any other functionality that may be used with a network-based service.

A customer may request support using a customer device, such as by sending a text message or selecting a user interface control on the customer device. Information about the request may be received by customer interface component 420. Customer interface component 420 may transmit information about the request to customer support component 430 to process the customer's request. Customer support component 430 may use semantic response component 455 to determine a meaning of the customer request, such as by selecting an intent from a set of possible intents. Customer support component 430 may then determine if a response to the request may be generated automatically.

If it is determined to generate a response automatically, then customer support component 430 may determine a response to the request and transmit information about the determined response to customer interface component 420. Customer interface component 420 may then send a message to the customer, such as by constructing a message using a template and information about the determined response. Either customer support component 430 or customer interface component 420 may also perform an action, such as any of the actions described above.

If it is determined not to generate a response automatically, then customer support component 430 may select an available CSR and create a support session between the customer and the CSR. Customer support component 430 may transmit information about the request to CSR interface component 440, and CSR interface component may send information about the request to a CSR device to be presented to the CSR. The CSR may create a message to send back to the customer which may be received by CSR interface component 440. This message may be transmitted to customer support component 430 and further to customer interface component 420. Customer interface component 420 may then transmit data to the customer device to allow the customer to see the message from the CSR.

Customer support component 430 may provide any other appropriate functionality to improve the customer support experience for both the customer and the CSR. For example, customer support component 430 may use auto complete component 460 to provide suggestions of automatic completions to text typed by the customer or the CSR, may use auto suggest responses component 465 to suggest complete responses to a CSR in responding to a customer, and may use auto suggest resources component 470 to suggest resources to a CSR to assist a CSR in responding to a customer. Customer support component may use any of the techniques described in U.S. patent application Ser. No. 15/254,101, U.S. patent application Ser. No. 15/383,603, and U.S. patent application Ser. No. 15/448,824, each of which is hereby incorporated by reference in their entireties.

Further details of CSR interface component 440 are now described. Where the CSR is accessing the CSR UI using a web browser, CSR interface component 440 may handle presenting a sign in page, authentication, and the initial presentation of the CSR UI (e.g., transmitting one or more of HTML, CSS, and JavaScript). Where the CSR is accessing the CSR UI using a special-purpose app, CSR interface component 440 may handle authentication and transmit any information needed to present the CSR UI to the CSR. After the initial presentation of a CSR UI to a CSR, CSR interface component 440 may coordinate sending update data to the CSR device to cause portions of the CSR UI to be updated or modified, such as by pushing update data or sending update data in response to an action of the CSR.

In sending update data to a CSR device, CSR interface component 440 may use a template, such as a template received from templates data store 411. A template may represent any combination of static and dynamic data. The static data may be the same for each use of the template and the dynamic data may change between uses of the template. For example, the dynamic data may be specified by variables in the template. Any appropriate format and technology may be used for templates, such as Jinja, Handlebars, or Smarty templates.

In creating update data using templates, CSR interface component 440 selects a template to use and also obtains data to be used with the template. With the selected template and the obtained data to be used with the template, CSR interface component 440 can render the selected template with the obtained data to create update data to send to the CSR device. For example, CSR interface component 440 may receive a message from customer support component 430 that a particular customer is being assigned to a particular CSR. In response to receiving this message, CSR interface component 440 may retrieve a template from templates data store 411, such as the following template:

{“action”: “newCustomer”, “customerID”: {{customer: ID}}, “customerName”: “{{customer: name}}”}

In this template, the double curly braces (“{{” and “}}”) may indicate variables for dynamic data and the other information may be static information. To render the template, CSR interface component 440 may obtain the information corresponding to the variables, such as information about the customer. CSR interface component may then render the template to create update data such as the following:

{“action”: “newCustomer”, “customerID”: 12345, “customerName”: “John Smith”}

CSR interface component 440 may then transmit the update data to the CSR device to cause the CSR device to add a new customer to customer list portion 810.

A wide variety of information may be used to select a template to create update data to send to a CSR.

An identity of the company that the customer is seeking support from may be used to select a template. Third-party company 110 may provide customer support services to many companies, and accordingly the templates may be customized to fit the needs of each company. Some templates may be the same for all or many companies (such as a template to create update data to assign a new customer to a CSR) and some templates may be different for all or nearly all companies (such as a template showing the details of a customer profile of the customer for the company).

An identity of the customer may be used to select a template. For example, suppose that a customer is seeking support from an Internet service provider and customers may subscribe to one or more of cable television, phone, and high-speed Internet services. An identity of the customer may be used to determine the services received by the customer, and a template may be selected based on the services received by the customer. A first template may be used for a customer who receives only high-speed Internet, a second template may be used for a customer who receives only cable television, and so forth.

Where information about a customer is used, the information may be obtained from a data store of third-party company 110, such as customer data store 410, or may be obtained by requesting the information from another source, such as requesting the customer information from a server of the company. Depending on the company, no customer information may be stored by third-party company 110, some customer information may be stored by third-party company 110 (such as less sensitive information), or all customer information may be stored by third-party company.

Where third-party company 110 requests customer information from the company, CSR interface component 440 may use company data interface component 445. Company data interface component 445, may store or have access to information about how to request customer information from different companies. For example, company data interface component 445 may perform a lookup to obtain a server address and request format to make a REST API call to a server of the company.

An identity of the CSR may be used to select a template. For example, a CSR may have individual preferences for the appearances of the UI presented to him, and the preferences of the CSR may be used to customize a template specific to the CSR. The CSR preferences may be stored, for example in CSR data store 412 or retrieved from a server of the company, such as by using company data interface component 445.

Information about the company may also be used to select a template. For example, a state of the company's services may be used to select a template. Where the company is an Internet service provider, information about service outages may be obtained and used to select a template. The information about the company may be retrieved from a server of the company, such as by using company data interface component 445.

One or more messages transmitted between the customer and the CSR may also be used to select a template. In some implementations, one or more messages may be processed by semantic response component 455 to determine an intent of the message from a set of possible intents, such as using any of the techniques described above. For example, where the customer writes "Please help, my Internet isn't working," semantic response component may determine that this message corresponds to Internet-connection-help intent, and this intent may be used to select a template.

Any combination of the above information may be used to select a template from template data store. In some implementations, a template may be selected using only the intent of a message from the customer. In some implementations, combinations of the above information may be used. For example, a decision tree may be constructed, and the above information may be used to traverse the decision tree, and a template may be selected from a leaf node of the decision tree. For example, a customer may write "Please help, my Internet isn't working." A template may be selected using (i) the intent of internet-connection-help, (ii) information about the customer (e.g., the location of the customer, services received by the customer, etc.), and (iii) information about the company (e.g., known service outages). This information may be used to select a template to show the CSR relevant information about the customer's request, such as a map showing locations of current service outages and the location of the customer's home.

In some implementations, templates may contain operators that alter the content of the template using the data that is obtained for rendering the template. For example, the template above may be modified to add the text "(VIP)" after the customer's name if the customer is a VIP:

{"action": "newCustomer", "customerID": {{customer: ID}}, "customerName": "{{customer: name}}" {% if customer: VIP %}(VIP){% endif %}}

In this template, "{%" and "%}" indicate the beginning and end of operators, and any appropriate notation and operators may be used. Where templates use operators, fewer templates may be needed since a single template with operators may provide the functionality of multiple templates without operators.

After a template is selected, the data needed to render the template may be obtained. Any appropriate techniques may be used to obtain the data needed to render the template. In some implementations, the selected template may be processed to obtain a list of variables that are needed to render the template (or a list of variable names may be stored in association with the template). The variable names may be mapped to techniques for obtaining the data corresponding to the variable names, and the techniques for obtaining the data may be specific to the company from which the customer is seeking assistance.

Any appropriate data may be obtained to render the template, such as an identity of the company, information about the company, an identity of the customer, information about the customer, an identity of the CSR, information about the CSR, or information about messages transmitted between the customer and CSR (e.g., an intent). The data may be obtained from any appropriate location, such as data stores of third-party company 110 or servers of the company.

Any appropriate techniques may be used to map a variable name to a process for obtaining the data. For example, a table lookup may be performed using the variable name and the identity of the company to obtain a data structure indicating how to obtain the data. In some implementations, the data structure may have an entry indicating whether the data is stored by third-party company 110 (e.g., in customer data store 410) or whether the data needs to be requested from a server of the company. Where the data is stored by third-party company 110, the data structure may include information such as the name of a table storing the data and a name of a field or column corresponding to the data. Where the data is to be requested from a server of the company, the data structure may include information, such as an address for a REST API call and the format of parameters to be supplied with the REST API call.

After the process for obtaining the template data has been determined, the template data may be obtained by implementing that process. For example, third-party company 110 may retrieve template data from its own data store or may request template data from the company, such as by sending a REST API call to a server of the company.

After the template data has been obtained, CSR interface component 440 may generate update data by rendering the template using the obtained template data. For example, the generated update data may be a structured data item, such as the structured data items presented above. CSR interface component 440 may then transmit the update data to the CSR device, and software running on the CSR device may cause a portion of the CSR UI to be updated using the update data.

In some implementations, CSR interface component 440 may render the template and transmit the update data to the CSR device before obtaining some of the template data. Obtaining template data by contacting a remote server may be a relatively slow process (e.g., on the order of seconds or longer), and it may be desired to update the CSR UI before obtaining all of the template data. CSR interface component 440 may render the template using template data that has been obtained, and for template data that has not been obtained, CSR interface component 440 may insert one or more placeholders indicating that the corresponding data will be sent at a later time. In some implementations, the placeholder may include a unique identifier to facilitate inserting the data at a later time.

For example, when rendering the template described above, third-party company 110 may have the customer ID and may send a request to a company server to obtain the name of the customer. CSR interface component 440 may render the template to generate the following update data:

{"action": "newCustomer", "customerID": 12345, "customerName": [[867351]]} where "[[86735]]" indicates a placeholder with an identifier of 86735. CSR interface component 440 may transmit this update data to the CSR device, and CSR device may update a portion of the CSR UI but leave a blank for the customer name.

After third-party company 110 receives the customer name from the company, CSR interface component 440 may generate and send additional update data to instruct the CSR device to insert the customer name that was missing in the previous update data. For example, CSR interface component 440 may transmit update data similar to the following:

{"action": "placeholder", "id": 86735, "data": "John Smith"}

Software running on the CSR device may receive this update data and cause the customer's name to be inserted in the UI as if the customer name had been included in the previous update data.

Customer interface component 420 may implement all of the techniques described above for CSR interface component 440 to send a customer UI to be presented to the customer by the customer device. For example, customer interface component 420 may select a template, obtain template data, generate update data by rendering the selected template using the obtained template data, and transmit the update data to the customer device to cause the customer device to update a portion of the customer UI presented to the customer. Customer interface component 420 may also render the template before receiving all the template data and transmit update data to the customer device with placeholders for the template data that has not yet been received. After receiving the template data, customer interface component 420 may send additional update data to cause the placeholder to be replaced by the template data.

Figure 5A:
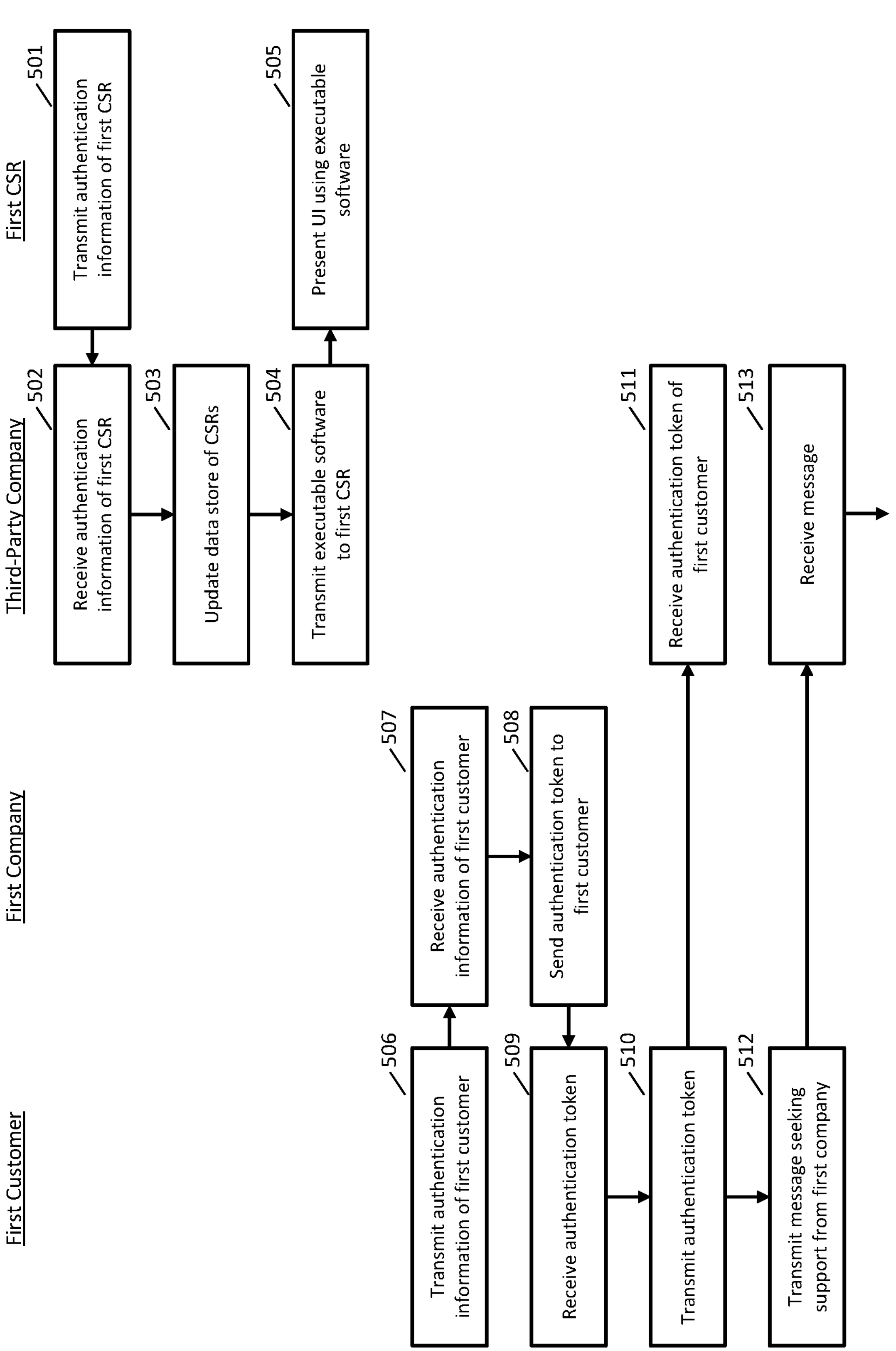
FIGS. 5A-C are flowcharts of an example implementation of updating a portion of a user interface by transmitting update data.
Figure 5B:
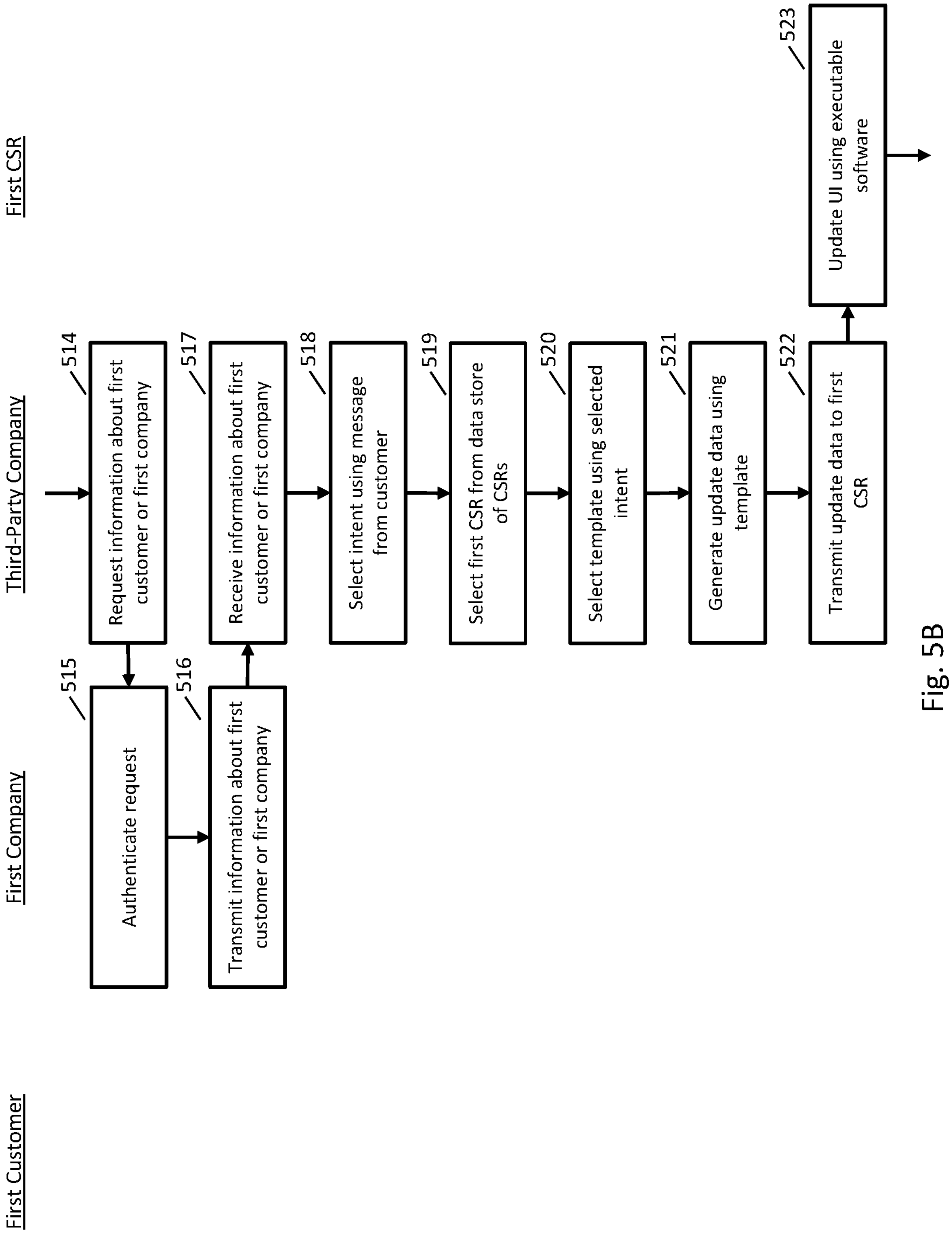
Figure 5C:
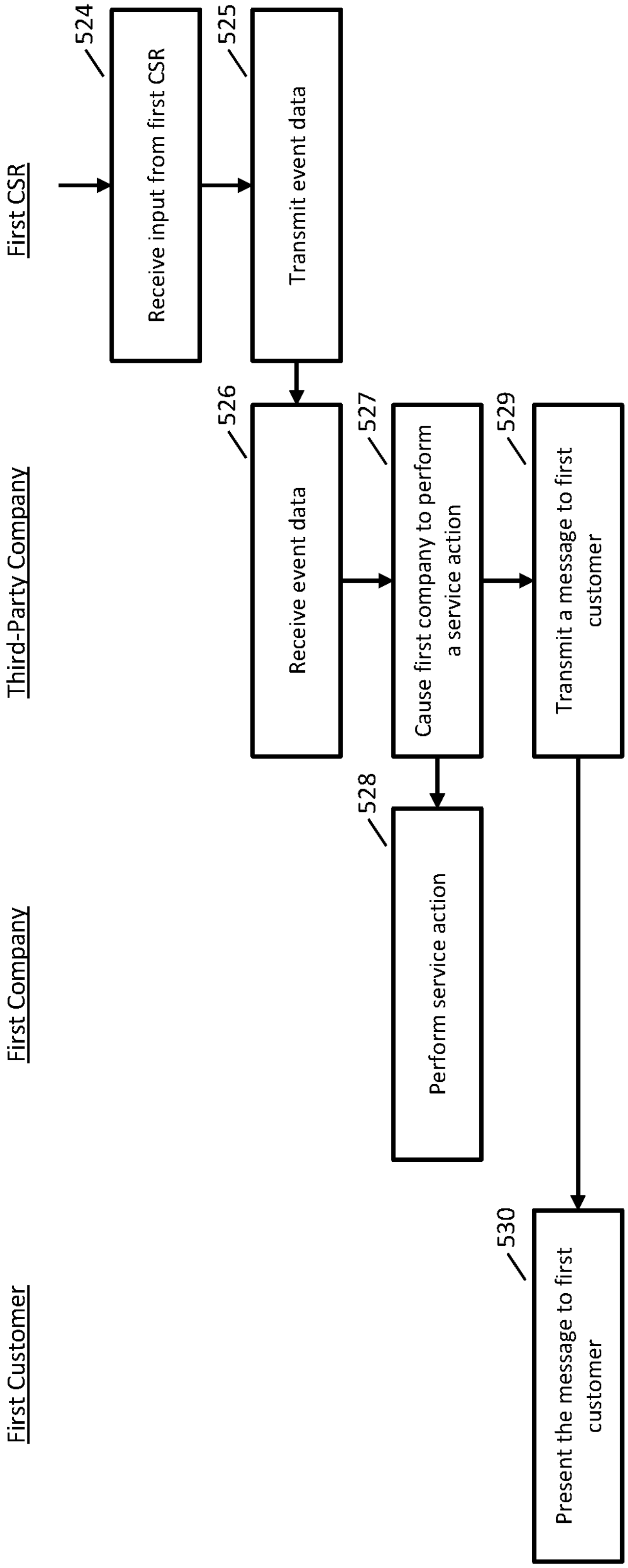

FIGS. 5A-5C are flowcharts illustrating an example implementation of assisting a company in providing customer support to a customer. FIGS. 5A-5C illustrate interactions between a device of a first customer (who is seeking support from first company), one or more servers of first company, one or more servers of third-party company, and a device of a first CSR who is providing support to the first customer. In some implementations, the connections between the entities of FIGS. 5A-5C may be modified, for example, as illustrated by the systems of FIGS. 1A-1C.

At step 501, a first CSR transmits authentication information to third-party company 110. The first CSR may, for example, sign in using a web page provided by third-party company or use a special-purpose application installed on a device used by the first CSR. The first CSR may be employed only to assist customers of a first company or may be employed to assist customers of more than one company. First CSR may provide authentication information using any appropriate techniques, such as by providing a username and password or using a single sign-on service.

At step 502, third-party company receives the authentication information, and at step 503, third-party company 110 may update a data store of CSRs, for example by modifying an entry for the first CSR to indicate that the first CSR is available to assist customers. At step 504, third-party company transmits executable software to the first CSR device, and at step 505 the first CSR device presents a UI using the executable software that allows the first CSR to provide support to customers. For example, third-party company may transmit JavaScript (e.g., with HTML and/or CSS) to cause a web browser of first CSR device to present a UI. Where first CSR is using a special-purpose application, step 504 may be omitted, and the special-purpose application may present the UI at step 505.

Any number of CSRs may similarly perform the above steps of transmitting authentication information to third-party company and access a UI for providing support to customers. Some of the CSRs may assist customers of different companies.

At step 506, a first customer transmits authentication information to a first company. For example, first customer may access a web page provided by first company and provide a username and password, or first customer may use a special-purpose application provided by first company or third-party company. At step 507, first company receives the authentication information provided by first customer, and at step 508 first company sends an authentication token back to the first customer device to indicate that the customer has signed in correctly. At step 509, the first customer device receives and stores the authentication token. In some implementations, first customer may instead transmit authentication information to third-party company and third-party company may send an authentication token back to the first customer device.

First customer may then access portions of the first company web page (or special-purpose application) that require the customer to be authenticated. For example, the customer may be able to access billing information or change services received by the first customer. In some implementations, first customer may be required to be authenticated before requesting customer support or the customer may provide authentication information after starting the customer support request.

At step 510, first customer device transmits the authentication token to third-party company 110. First customer may or may not be aware that the authentication token is being sent to third-party company and may not be aware that that he is interacting with third-party company at all (from the perspective of the first customer, he may appear to be interacting with first company).

At step 512, first customer transmits a message to third-party company 110 relating to a support request. In some implementations, the message may include speech of the first customer or text typed by the first customer. In some implementations, the first customer may select a user interface control corresponding to the subject matter of the first customer's request (e.g., "click here for help with your Internet connection"). As above, the customer may not be aware that he is interacting with third-party company.

At step 511, third-party company 110 receives the authentication token and at step 513, third-party company receives the message. The transmission of the authentication token and the message may occur in any order or they may be sent in the same transmission. Third-party company also determines an identity of the first company via a transmission from first customer. For example, first customer may transmit a company identifier in a transmission to third-party company.

At step 514, third-party company 110 requests information about the first customer and/or the first company from a server of the first company, and this information may be referred to as company data. Third-party company may request any appropriate information, such as a location of the first customer, a customer profile of the first customer, services received by the first customer, or the state of services provided by first company (e.g., service outages). Third-party company may request the information using any appropriate techniques, such as transmitting a REST API call to a server of first company. Third-party company may include the authentication token of the first customer and/or its own authentication token in the request.

At step 515, first company may authenticate the request (e.g., by comparing an authentication token received from third-party company 110 with a stored authentication token), at step 516, first company may transmit the requested information to third-party company, and at step 517, third-party company may receive the requested information. The authentication performed by first company may authenticate one or both of the first customer and third-party company.

At step 518, third-party company 110 selects an intent of the message received from the customer. Any appropriate techniques may be used for selecting an intent of the message. For example, text of the message from the first customer may be processed with a neural network, and the intent may be selected from a plurality of possible intents where the intent is selected by traversing a graph of possible intents. Information about the first customer and/or the first company may be used to determine the intent. For example, where the customer does not subscribe to phone services, intents relating to phone services may not be considered in selecting an intent.

At step 519, third-party company 110 selects the first CSR from a data store of CSRs. Third-party company may select the first CSR using any appropriate techniques. For example, third-party company may randomly select a CSR who provides services to customers of first company, may select a CSR using the intent (e.g., selecting a CSR who specializes in billing where the intent relates to billing), or may select a CSR using information about the first customer (e.g., providing a higher-skilled CSR for more valuable customers).

At step 520, third-party company 110 selects a template from available templates using the selected intent. In some implementations, any of the data described above may be used to select the template. Each of the available templates may be associated with one or more intents, and a template may be selected using the selected intent and optionally other information described above. For example, there may be a one-to-one correspondence between templates and intents, a template may be associated with multiple intents, or an intent may be associated with multiple templates. Any appropriate template formats or template selection techniques may be used (e.g., rules based or using a decision tree).

At step 521, third-party company generates update data by rendering the template. Third-party company 110 may process the template, for example, by replacing variables in the template with data corresponding to the variables. The update data may be in any appropriate format, such as structured data (e.g., JSON or XML) and may include information for updating a portion of a UI presented to a CSR.

Steps 511 through 521 may occur in a variety of orders depending on the implementation. For example, the first message may be received and the intent selected before receiving the authentication token of the customer. Additionally, third-party company may make more than one request to first company for information about the first customer and/or the first company where the different requests relate to different information. In some implementations, a first request may obtain data that is used to determine an intent of the message from customer. After the intent and a template are selected, additional information may be requested to obtain the data needed to render the template.

In some implementations, third-party company may be able to identify the first customer or determine information about first customer before receiving authentication information. For example, third-party company may receive an IP address of a device of first customer and use the IP address to determine information about a location of the first customer. This location information may be presented to the first CSR. Where first company has information about IP addresses of its customers (e.g., where first company is an Internet service provider), third-party company may obtain information about first customer by submitting a request to first company including the IP address of the first customer.

At step 522, third-party company 110 transmits the update data to the first CSR. At step 523, the first CSR receives the update data and updates a portion of the UI presented to the first CSR using executable software already running on the CSR device. In some implementations, where the CSR UI is presented using a web browser, JavaScript running in the web browser may process the update data and modify the DOM to cause a portion of the UI presented to the first CSR to be updated. For example, the JavaScript may add HTML elements, remove HTML elements, or modify existing HTML elements to cause a portion of the UI to be updated. In some implementations where the CSR UI is presented using a special-purpose application, the special-purpose application may similarly process the update data to add, remove, or modify UI elements presented to the first CSR.

At step 524, input is received from the first CSR at the CSR device. Any appropriate input may be received and the input may be based on the updated UI just presented to the first CSR. For example, the update data may cause a button to be added to the CSR UI and the first CSR may select the button that was just added and/or the first CSR may type a text response to be presented to the first customer.

At step 525, event data relating to the input of the first CSR is transmitted to third-party company 110. The event data may include any relevant data that may be used to process the input of the CSR and perform an action corresponding to the input. For example, the event data may include text of a response to be sent to the first customer or information indicative of a user interface control (e.g., a button) selected by the first CSR. The event data may be transmitted using any appropriate techniques. In some implementations where the CSR UI is presented using a web browser, JavaScript running in the web browser may transmit an HTTP POST to transmit the event data. In some implementations where the CSR UI is presented using a special-purpose application, any appropriate API may be used to allow the special-purpose application to communicate with servers of third-party company.

At step 526, a server of third-party company 110 receives the event data. Third-party company may process the event data to cause an action to be performed, such as sending a message to the first customer, providing a refund to the first customer, or changing the services provided to the first customer. Actions may be referred to as message actions, where a message is sent to first customer, and service actions, where computers of first company perform an action on behalf of first customer. Subsequent processing of the event data may depend on whether the information transmitted in the event data relates to a message action and/or a service action.

Where the event data includes information about a service action, at step 527, a server of third-party company 110 may cause first company to implement the service action, and at step 528, first company may perform the service action. Any appropriate techniques may be used for third-party company to cause first company to perform the service action and for first company to perform the service action. For example, third-party company may transmit a request to a server of first company using a REST API provided by first company, and software implemented by first company may cause the service action to be performed.

Where the event data includes information about a message to transmit to the first customer, at step 529, a server of third-party company 110 transmits the message to the device of the first customer, and at step 530 the device of first customer presents the message to the first customer. Any appropriate techniques may be used to transmit and present the message to the first customer. For example, third-party company may generate update data by rendering a template.

After steps 528 and/or 530 aspects of the above processing may be repeated. For example, first customer may transmit another message, either relating to the same customer support issue or relating to a different customer support issue. Based on processing the message, the message may be sent to the same CSR or a different CSR, an intent of the message may be determined, a template may be selected, and a UI of a CSR may be updated based on the intent of the message.

Figure 6:
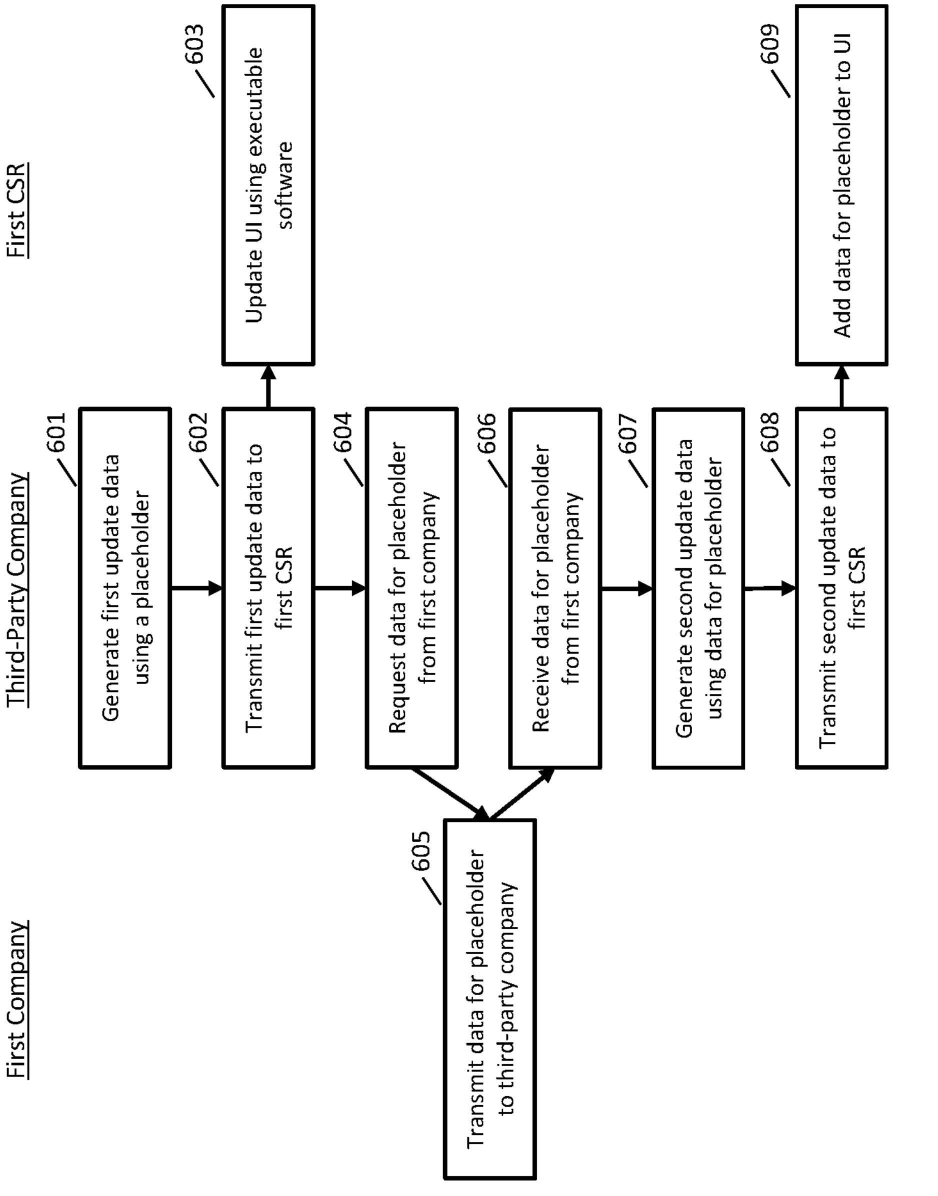
FIG. 6 is a flowchart of an example implementation sending update data with a placeholder and later transmitting update data with data for the placeholder.

FIG. 6 is a flowchart illustrating an example implementation of sending update data with a placeholder to represent data that is not yet available and later sending update data after the data has been received. FIG. 6 shows an example implementation for using placeholders with a CSR UI, and similar techniques may be applied to use placeholders with a customer UI.

At step 601, third-party company 110 generates first update data using a placeholder for data that is not yet available. The data that is not yet available is referred to as delayed data. Third-party company may also create an identifier for the placeholder that is included in the first update data and also stored by third-party company. For example, the first update data may indicate the placeholder by including the identifier of the placeholder in square brackets as follows:

{“action”: “newCustomer”, “customerID”: 12345, “customerName”: [[86735]]}

Third-party company may later use the identifier to send the delayed data corresponding to the placeholder after the delayed data has been received. Any of the techniques described above may be used to generate the first update data, and any appropriate techniques may be used to indicate the placeholder in the first update data.

At step 602, the first update data is transmitted to the first CSR device, and at step 603, executable software running on the first CSR device causes a portion of the CSR UI to be updated using the first update data, such as by using any of the techniques described above. In updating the CSR UI, the first CSR device may indicate that the delayed data corresponding to the placeholder is not yet available, such as by presenting a blank in the portion of the CSR UI corresponding to the placeholder, presenting an animation (e.g., a spinning wheel), or presenting text or an icon to indicate that the delayed data corresponding to the placeholder will be arriving soon.

The first CSR device may store information to indicate that the placeholder is present and to allow the placeholder to be replaced with the delayed data when it is received. In some implementations, the first CSR device may add metadata to the CSR UI to indicate the identifier of the placeholder. For example, the HTML element “<span id='86735'></span>” may be inserted into the CSR UI to indicate the placeholder.

At step 604, a server of third-party company 110 may request the delayed data corresponding to the placeholder from first company. In some implementations, step 604 may be performed at other times, such as before step 601. At step 605, a server of first company receives the request and transmits the delayed data to a server of third-party company. At step 606, a server of third-party company receives the delayed data. Any appropriate techniques may be used to request and transmit the delayed data.

At step 607, third-party company 110 generates second update data that includes the identifier of the placeholder and the delayed data. For example, the second update data may have the following form:

{“action”: “placeholder”, “id”: 86735, “data”: “John Smith”}

Any appropriate format may be used for the second update data.

At step 608, third-party company transmits the second update data to the first CSR device. At step 609, the first CSR device receives the second update data and inserts the delayed data for the placeholder into the CSR UI. First CSR device may use the identifier of the placeholder in the second update data to determine the location in the CSR UI where the delayed data for the placeholder is to be inserted. For example, JavaScript running on the first CSR device may modify the HTML element “<span id='86735'></span>” to include the data for the placeholder as “<span id='86735'>John Smith</span>”.

Predictive User Interfaces

In presenting a customer UI to a customer, third-party company 110 may also predict the needs of the customer (e.g., predict a request that the customer is about make). The customer UI may then present information to the customer that answers the customer's request before the customer has made it or provides a UI that makes it easier for the customer to make a request.

Customer interface component 420 may receive an identifier of the customer (e.g., an authentication token) from the customer device, as described above. Customer interface component 420 and/or customer support component 430 may interact with request predictor component 450 to predict requests that may be made by the customer. To predict requests, request predictor component 450 may obtain any of the data described above, such as information about the customer or information about the state of the company's services. Data that may be used to predict a customer request is referred to as prediction data.

Request predictor component may use any appropriate techniques to predict a request of the customer. In some implementations, request predictor component 450 may use a set of rules or a decision tree to predict a customer request using the prediction data. In some implementations, request predictor component 450 may use a neural network to predict a customer request. Request predictor component 450 may use a set of customer intents (such as the set of customer intents used by semantic response component 455) in predicting a customer request.

After predicting one or more possible requests, customer support component 430 may generate data or information to be transmitted to the customer device. In some implementations, customer support component 430 may generate a response using the same techniques that used to provide automatic responses to actual customer requests. For example, the predicted request may relate to a service outage affecting the customer, and customer support component 430 may generate a message to present to the customer to inform the customer of the service outage and an expected time for restoration of services. In some implementations, customer support component 430 may generate information about UI elements to present to the customer, such as buttons. For example, the predicted request may relate to billing and customer support component 430 may generate data to present to the customer a button to see the most recent bill and a button to pay the bill online.

Customer interface component 420 may then transmit data to the customer device to present information to the customer about the predicted request before the customer has made (or finished making) a request. In some implementations, customer interface component 420 may generate update data to transmit to the customer device to cause the customer device to update a portion of a UI presented to the customer. For example, customer interface component 420 may select a template, obtain template data, render the template to generate update data, and transmit the update data to the customer device. The following are some examples of predictions that may be made to assist a customer.

In one example, requests about service outages may be predicted. Using an identifier of the company, information about current service outages may be obtained. Using an identifier of the customer, the address of the customer may be obtained. Where the customer's address matches a location of a known service outage, request predictor component 450 may predict that the customer will request information about a service not working. Customer support component 430 may generate information to transmit to the customer, such as an explanation that there is a service outage and an expected time for resolving the service outage. Customer interface component 420 may then send update data to the customer device to present the customer with information about the service outage.

In another example, requests about billing issues may be predicted. Using an identifier of the customer, request predictor component 450 may determine the due date of a bill and whether the customer has paid the bill. If the bill is overdue or due within a period of time (e.g., due in 3 days or less), request predictor component 450 may predict that the customer will request information about paying the bill. Customer support component 430 may generate data or information to transmit to the customer, such as the amount of the bill, the due date of the bill, or and/a button the customer can use to pay the bill. Customer interface component 420 may then send update data to the customer device to present the customer with information about the bill and/or a button to pay the bill.

Figure 7:
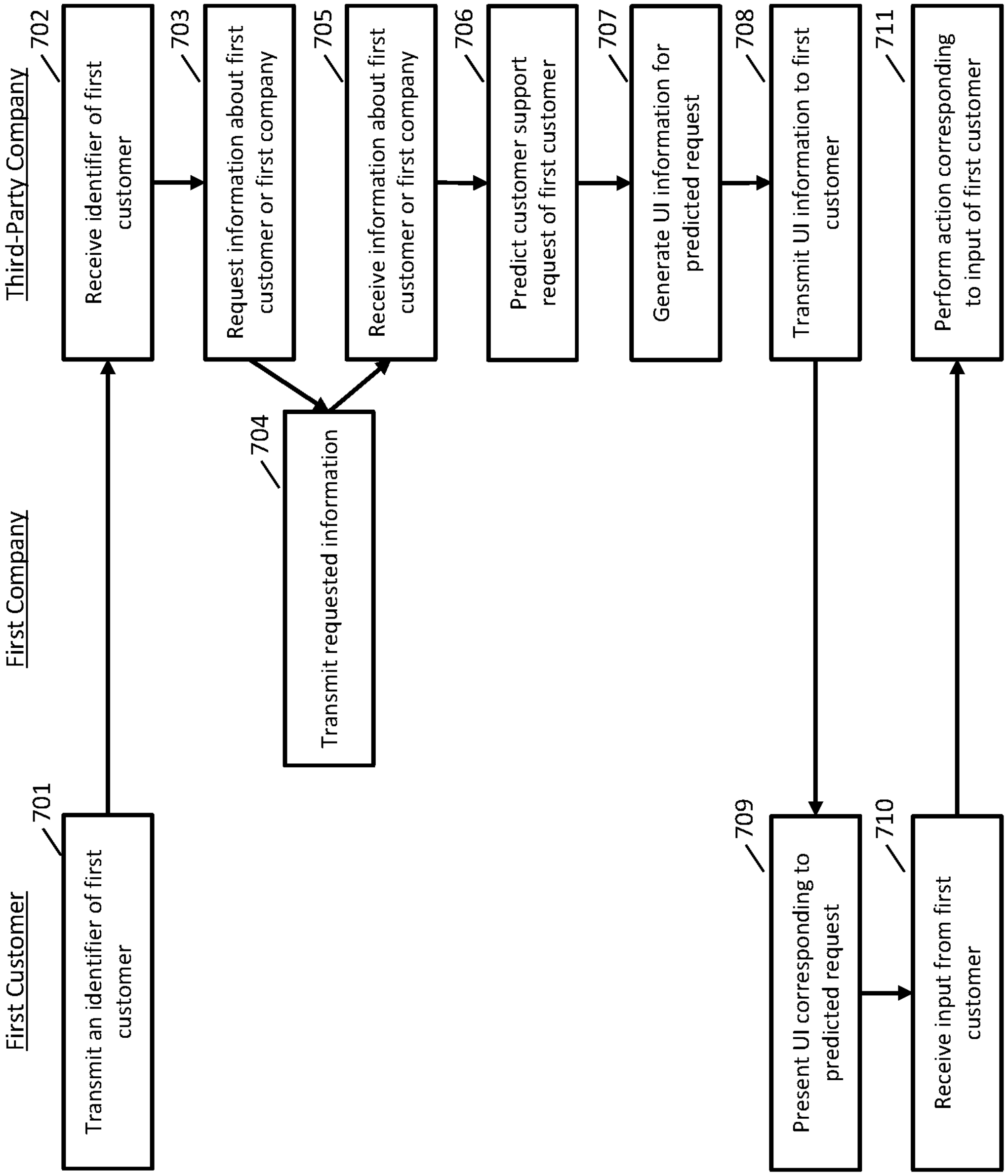
FIG. 7 is a flowchart of an example implementation of providing customer support by predicting a customer support request.

FIG. 7 is a flowchart illustrating an example implementation of predicting a customer request and presenting a UI to the customer corresponding to the predicted request.

At step 701, a device of the first customer transmits an identifier of the first customer to third-party company 110. The identifier may identify the customer or the customer device and may be in any appropriate format. For example, the identifier may include one or more of a user name, password, an authentication token, or an IP address. At step 702, third-party company receives the identifier of the first customer.

At step 703, third-party company 110 requests information about the first customer and/or the first company from a server of the first company. Third-party company may request any of the information described above. At step 704, first company receives the request and transmits the requested information to third-party company. At step 705, third-party company receives the requested information.

At step 706, third-party company 110 predicts a customer support request that may be made by the first customer, for example, by using any of the techniques described above. At step 707, third-party company generates UI information corresponding to the predicted request. For example, the UI information may include a message to respond to the predicted request of the first customer or may include information about UI elements (e.g., buttons) to present to the first customer to make it easier for the first customer to obtain information relevant to the predicted request.

At step 708, the UI information is transmitted to the first customer device. Any appropriate techniques may be used to the send the UI information, such as sending update data generated by rendering a template as described above.

At step 709, the first customer device presents a UI corresponding to the received UI information. In some implementations, executable software running on the first customer device may cause a portion of the UI to be updated using the UI information.

Where the UI presented to the first customer includes UI elements that may be used by the first customer, at step 710, the first customer may provide an input, such as selecting a button or typing a message. Event data relating to the input of the first customer may be transmitted to third-party company. At step 711, third-party company may perform an action corresponding to the event data. For example, where the first customer clicks a button to see his most recent bill, third-party company may transmit information about the bill to the first customer device.

Example Implementations

FIGS. 8A-Q illustrate example user interfaces that may be used by a CSR and a customer and that may incorporate the techniques described above. The UI of FIGS. 8A-8Q may be presented by a web browser, by a special-purpose application, or any other appropriate techniques.

FIG. 8A illustrates an example user interface that may be used by a CSR to communicate with one or more customers. The UI of FIG. 8A includes different portions that contain different types of information. For example, FIG. 8A includes a customer list portion 810 that includes a list of customers who the CSR is currently communicating with. Each customer may have been added to the customer list portion 810 by receiving and processing update data. In this example, the CSR is communicating with five different customers, and the customer named Cathy Washington is a selected or active customer. Because Cathy Washington is the selected or active customer, other portions of the UI may show other information relevant to Cathy Washington, such as sequence of messages between Cathy Washington and the CSR.

FIG. 8A also includes a conversation portion 820 that shows messages between the customer and the CSR. In the example of FIG. 8A, a first message to the customer reads "How can we help you?" This message may be automatically generated for each new customer support session or may be typed by the CSR. The customer responds "I need to pay the bill to my account and cancel the Avengers movie that was billed to me." Each message may have been added to conversation portion 810 by receiving and processing update data.

FIG. 8A also includes an information portion 830 that may present other information relevant to the customer. In this example, information portion 830 has three tabs along the bottom that allows a CSR to select between three different types of information. The three tabs are "knowledge base," "customer history," and "customer profile." In FIG. 8A, the customer history tab is selected and information portion 830 shows a history of events for the selected customer.

Figure 8B:
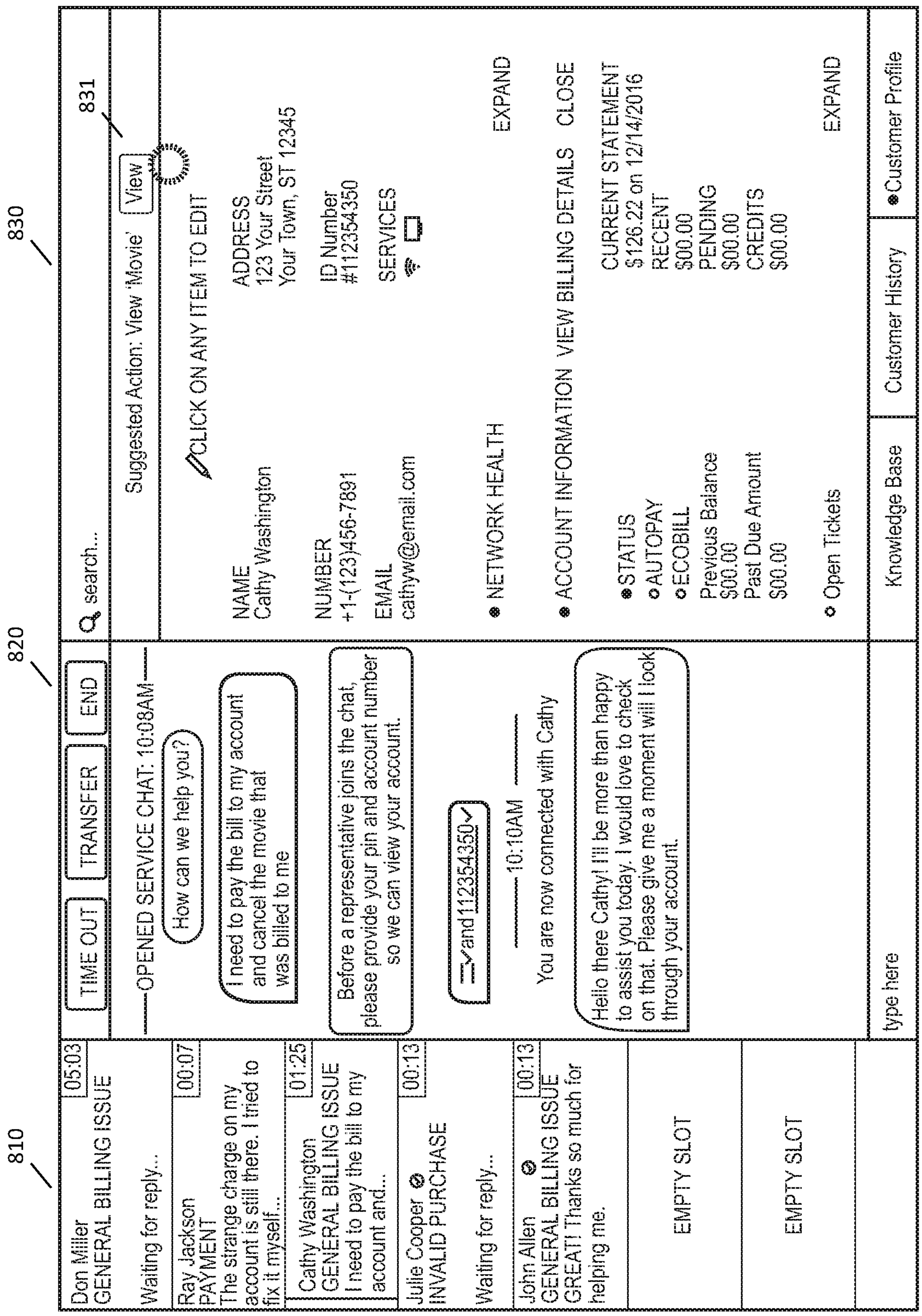

FIG. 8B illustrates a possible subsequent UI for the CSR. In FIG. 8B, the CSR has typed a message to the customer, and this message may be seen in conversation portion 820. Additionally, information portion 830 now shows the tab for "customer profile" and a suggested action 831 for "View Movie" is shown near the top.

The suggested action 831 may be presented as a result of third-party company sending update data to the CSR device after processing messages received from Cathy. Third-party company may process the messages received from Cathy, determine that the intent of the messages relates to a movie she recently purchased, select a template using the selected intent, render the selected template to generate update data that indicates how to present suggested action 831, and transmit the update data to the CSR device. Upon receiving the update data, CSR device may process the update data to present suggested action 831 as indicated in FIG. 8B.

FIG. 8C illustrates a possible subsequent UI for the CSR, after the CSR has clicked the "View" button corresponding the suggested action to view information about the purchased movie. In FIG. 8C, information portion 830 now shows a list of transactions of the customer including the purchase of the movie.

Figure 8D:
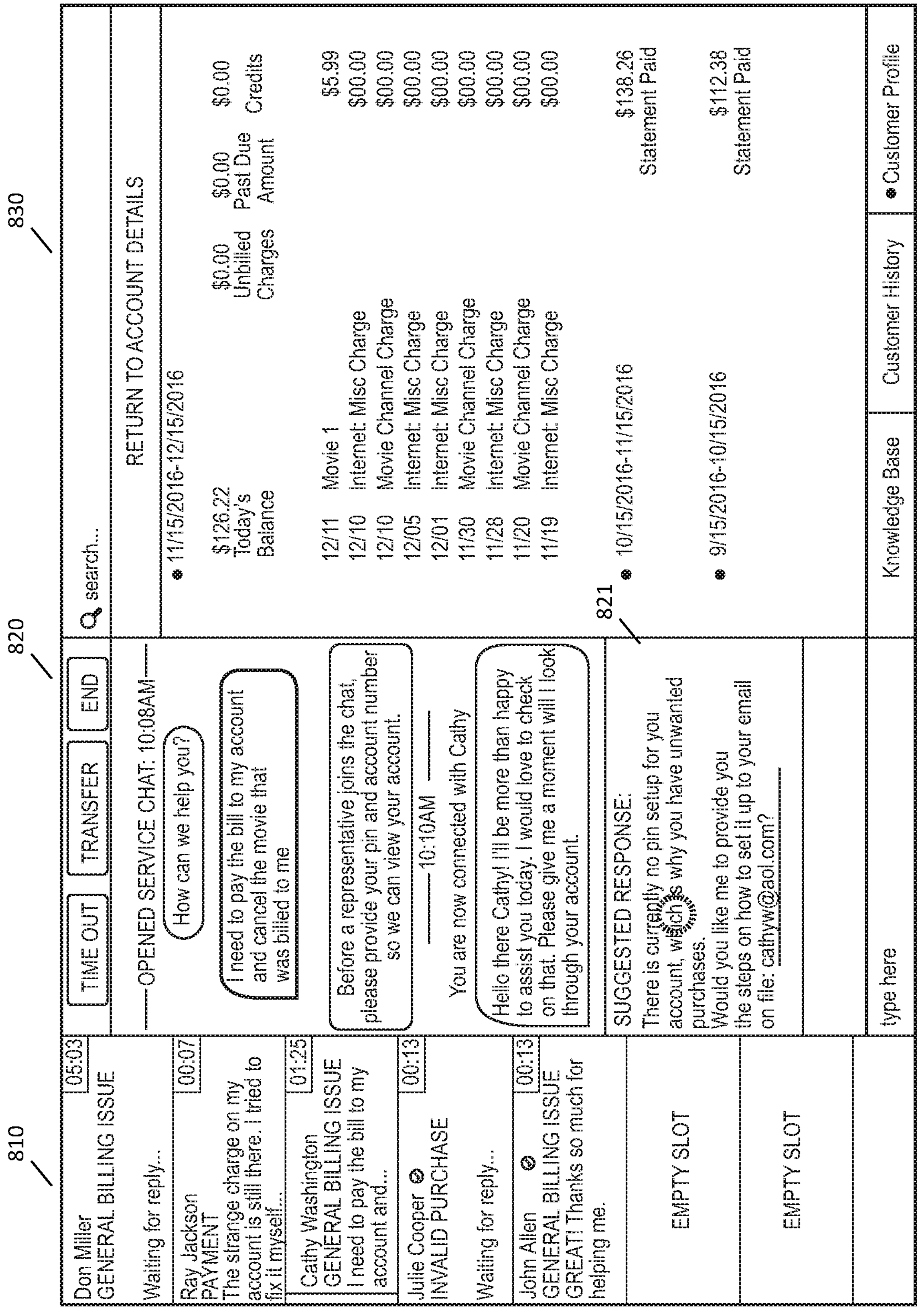

FIG. 8D illustrates a possible subsequent UI for the CSR. The bottom of conversation portion 820 of FIG. 8D shows a suggested response 821 for the CSR to use in responding to Cathy. The suggested response here states that the customer has not set up a PIN for purchases and offers to assist the customer in setting up the PIN. Third-party company may process the conversation (e.g., to determine an intent) and other information to determine to suggest a response to the CSR and send update data to cause the CSR device to present the suggested response to the CSR.

FIG. 8E illustrates a possible subsequent UI for the CSR, after the CSR selected the suggested response from FIG. 8D. As a result of the selection of the suggested response, the message is sent to the customer, and accordingly the message appears in conversation portion 820 of FIG. 8E.

Information portion 830 of FIG. 8E also includes several resources that a CSR may use. In some implementations, these suggested resources are automatically presented based on processing the text of the conversation (e.g., to determine an intent) between the customer and the CSR. In some implementations, the CSR may search for resources by typing in search bar 832 at the top of information portion 830. In this example, the CSR has typed "pin". The text typed be the CSR may be used to search resources database 1610 and present resources that match the search terms. Third-party company may send update data to the CSR device to cause the CSR device to present the resources, either as a result of processing the text of the conversation or in response to a search by the CSR.

FIG. 8F illustrates a possible subsequent UI for the CSR, after the CSR selected "Instructions for PIN setup" from FIG. 8E. In information portion 830 of FIG. 8F, the CSR has the option of sending the instructions to the customer in three different ways.

FIG. 8G illustrates a possible subsequent UI for a CSR, where the CSR has returned to the Customer Profile tab. In FIG. 8G, a suggested action 833 is presented at the top of information portion 830 for the CSR to request payment from Cathy. As above, third-party company may process the conversation between Cathy and the CSR, determine an intent of the conversation, select a template using the selected intent, render the selected template to generate update data relating to presenting suggested action 833, and transmit the update data to the CSR device to cause the CSR device to present suggested action 833.

Figure 8H:
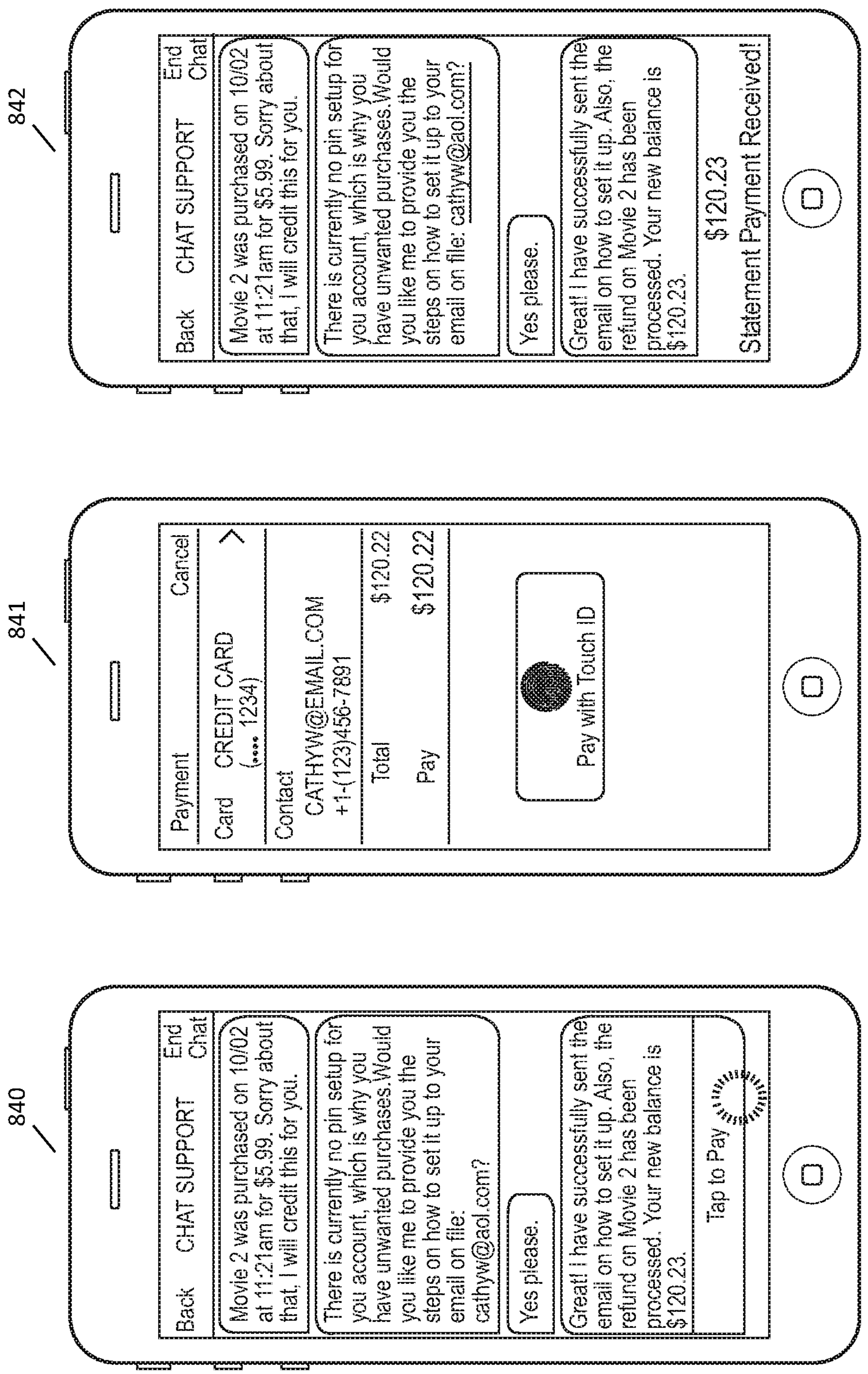

FIG. 8H illustrates an example UI that may be used by the customer in communicating with the CSR. UI 840 shows the UI with the most recent messages between Cathy and the CSR. UI 840 also shows a pay button that was sent to the customer in response to the CSR selecting the request payment button from suggested resource 833. In FIG. 8H, the customer may activate the pay button in UI 840 (e.g., by touching it), authorize payment in UI 841 (e.g., using a fingerprint sensor to authorize payment), and see confirmation that payment was received in UI 842. UI 840, UI 841, and UI 842 may be presented to the customer using any of the techniques presented above. For example, third-party company may transmit update data to the customer device to cause the customer device to present the pay button, to present a UI for receiving a fingerprint, and to present the outcome of the payment transaction.

FIG. 8I illustrates a possible subsequent UI for the CSR after processing the customer's payment. In FIG. 8I, information portion 830 indicates that payment from the customer has been processed. Also in FIG. 8I, a message has been sent to the customer to thank the customer for making the payment. This message may be automatically sent in response to receiving the payment and need not be typed by the CSR.

At the bottom of conversation portion 820 in FIG. 8I is a text entry box 822 where the CSR may type messages to be sent to the customer. FIG. 8I illustrates an example of providing a suggested automatic completion to the text typed by the CSR. In this example, the CSR has typed "You're very welcome! It's". The suggested completion, "been my pleasure to help," is presented afterwards. The CSR may select the completion to use it and send the completed message to the customer. Third-party company transmit update data to the CSR device to cause the CSR device to present suggested completions of text typed by the CSR.

Figure 8J:
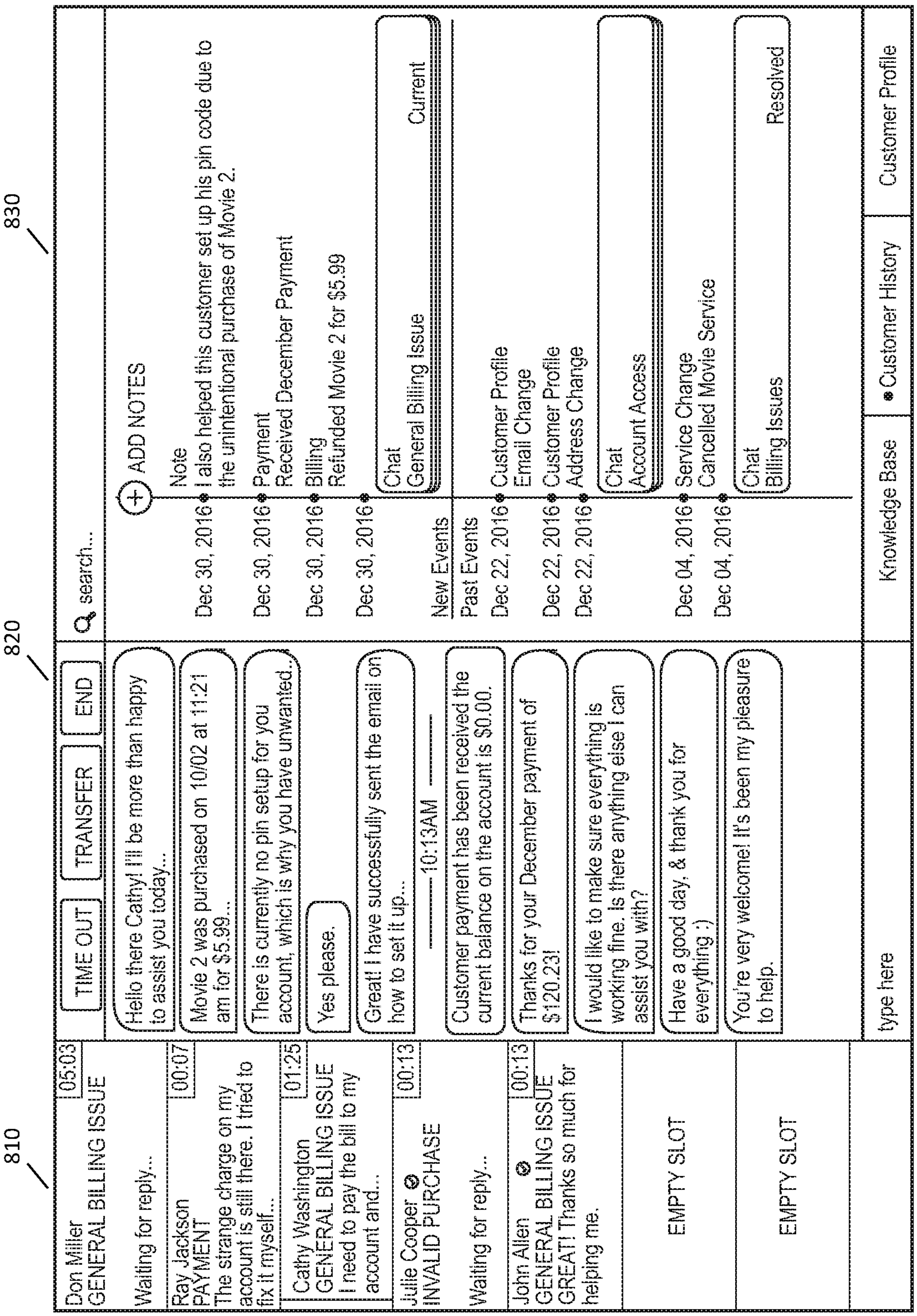

FIG. 8J illustrates a possible subsequent UI for the CSR after the CSR has sent a message using the suggested completion. The completed message has been sent to the customer as can be seen in conversation portion 820 of FIG. 8J.

The CSR may now be finished assisting this customer and may assist another customer. The CSR may select another customer from customer list portion 810, and FIG. 8K illustrates a possible subsequent UI for the CSR after selecting the customer Ray Jackson.

In FIG. 8K, the customer has sent the message "Starting from 2 weeks ago, my internet started being really slow for no reason." After processing the text of the conversation, a suggested action 834 is presented in information portion 830. Since the customer is having problems with an Internet connection, the suggested resource allows the CSR to start a trouble shooting tree to assist the customer in fixing the problem. As above, third-party company may process the conversation to determine an intent, select a template using the intent, generate update data by rendering the template, and send the update data to cause the CSR device to present suggested action 834.

FIG. 8L illustrates a possible subsequent UI for the CSR after the CSR has selected the Start button from FIG. 8K to start using the trouble shooting tree. In FIG. 8L, the first step of the trouble shooting tree is to ask the customer if the problem is with the in-home network or a Wi-Fi hotspot. The CSR may select the Send Question button from information portion 830 to send this question to the customer.

In some implementations, third-party company may send update data to present the question to the customer as text, and the customer may respond by typing a response. In some implementations, third-party company may send update data to cause buttons (or some other user interface elements) to appear in the UI of the customer's device. Accordingly, the customer may be able answer the question by selecting the appropriate button. In FIG. 8L, the conversation portion indicates that the customer has responded by indicating that the problem is with the in-home network.

Figure 8M:
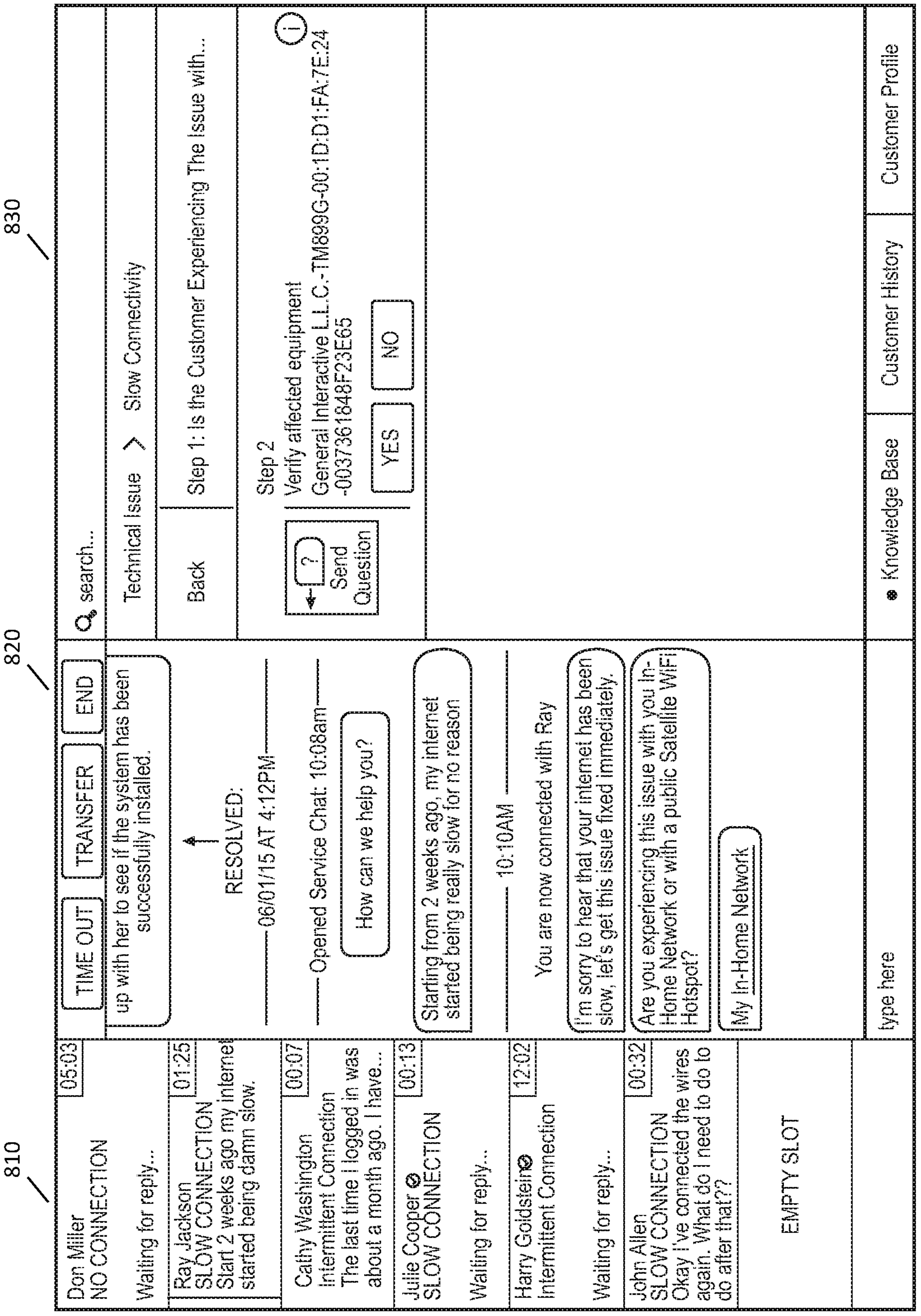

FIG. 8M illustrates a possible subsequent UI for the next step of the troubleshooting tree. This UI may be displayed in response to the CSR selecting the In-Home Network button from information portion 830 of FIG. 8L. In FIG. 8M, the step of the troubleshooting tree relates to confirming the customer's equipment, and the CSR may again send the question to the customer by clicking the Send Question button. Conversation portion 820 of FIG. 8M shows that the question has been sent to the customer and that the customer has responded with a serial number of her equipment.

Figure 8N:
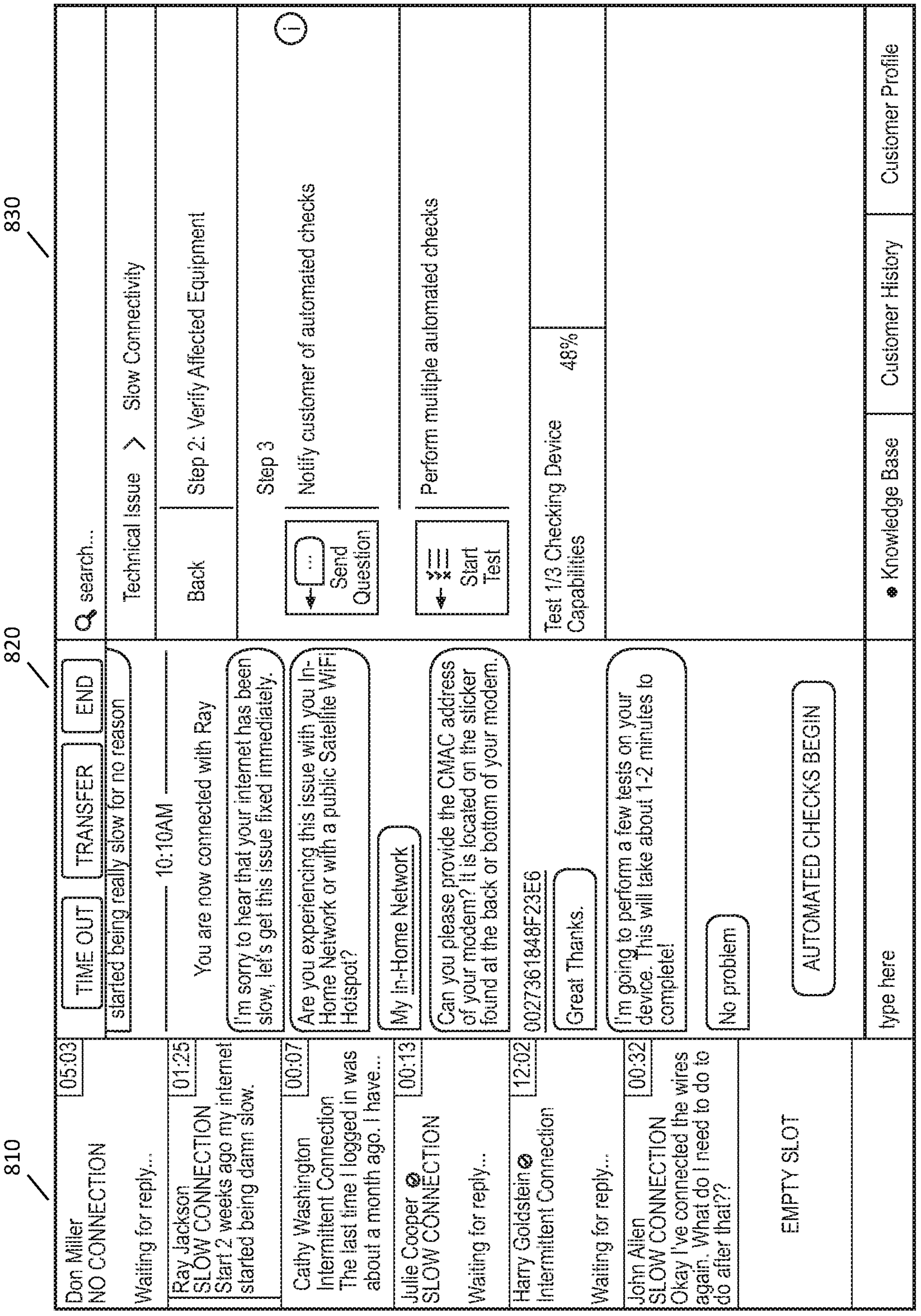

FIG. 8N illustrates a possible subsequent UI for the next step of the troubleshooting tree. This UI may be displayed in response to the CSR selecting the Yes button from information portion 830 of FIG. 8M. The next step of the troubleshooting relates to performing automated checks. Information portion 830 of FIG. 8N includes a button to allow the CSR to send a message to the customer to inform her that the CSR will be initiating automated checks and another button to start the automated checks. In FIG. 8N, the CSR has selected both buttons, and a corresponding message is sent to the customer as shown in conversation portion 820 and the automated checks are in progress as shown by the progress bar in information portion 830.

FIG. 8O illustrates a possible subsequent UI for the CSR after the automated checks have been performed. For this example, the result of the automated checks is that a technician needs to be sent to the customer's house. Messages informing the customer of the results of the checks and that a technician is needed may be automatically sent to the customer and examples of such messages are shown in conversation portion 820 of FIG. 8O.

Information portion 830 of FIG. 8O also includes a button to allow the CSR to schedule an appointment for the technician with the customer. In some implementations, pressing this button will send a message to the customer with information about open slots for appointments, and the customer may respond by typing to indicate a desired appointment. In some implementations, a UI may be presented to the customer to facilitate the selection of appointment.

Figure 8P:
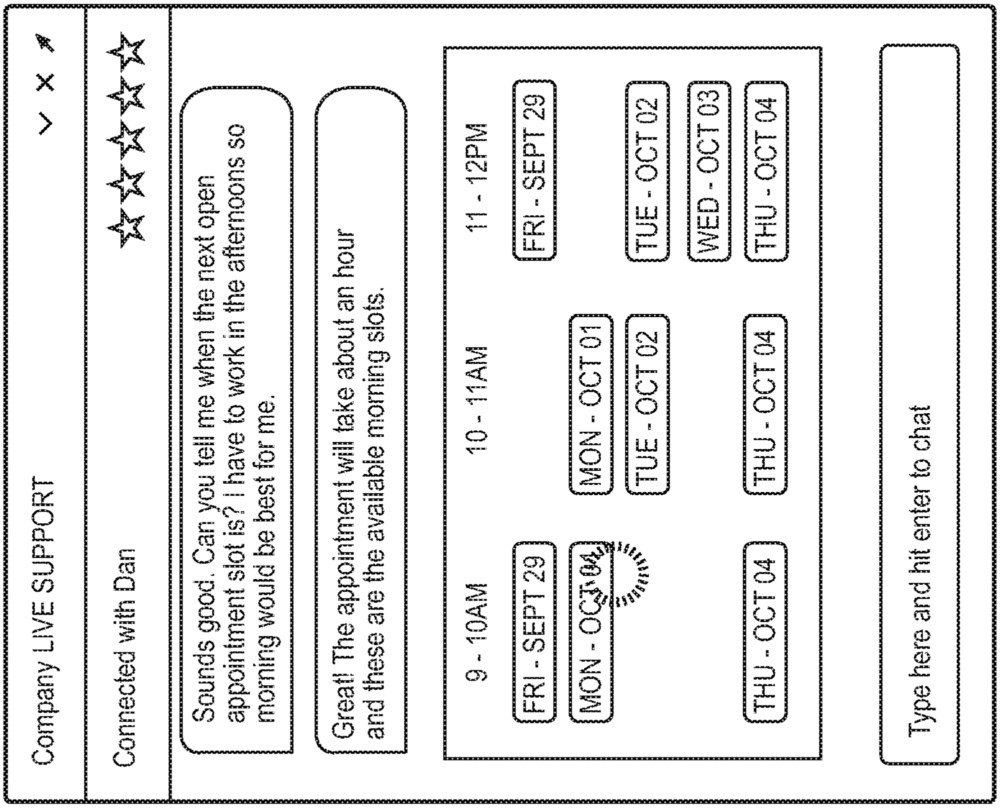

FIG. 8P illustrates an example UI that may be presented to a customer to allow the customer to select an appointment time for a technician. Third-party company may transmit update data to the customer device to cause the device to present this UI. In this example, available dates and times for appointments are shown and the customer may select an available appointment. After the customer has made a selection, the selected appointment may appear in the CSR UI as shown in the conversation portion 820 of FIG. 8O.

FIG. 8Q illustrates a possible subsequent UI for the CSR after additional messages have been sent between the customer and the CSR. Here, the customer would like additional assistance with his online account. In some implementations, a company may have CSRs with different specialties, and thus a CSR who assists with technical support may be different from a CSR who assists with online accounts. In this example, the CSR may use the transfer button 823 to transfer the customer to another CSR who can assist the customer with her online account.

Figure 9:
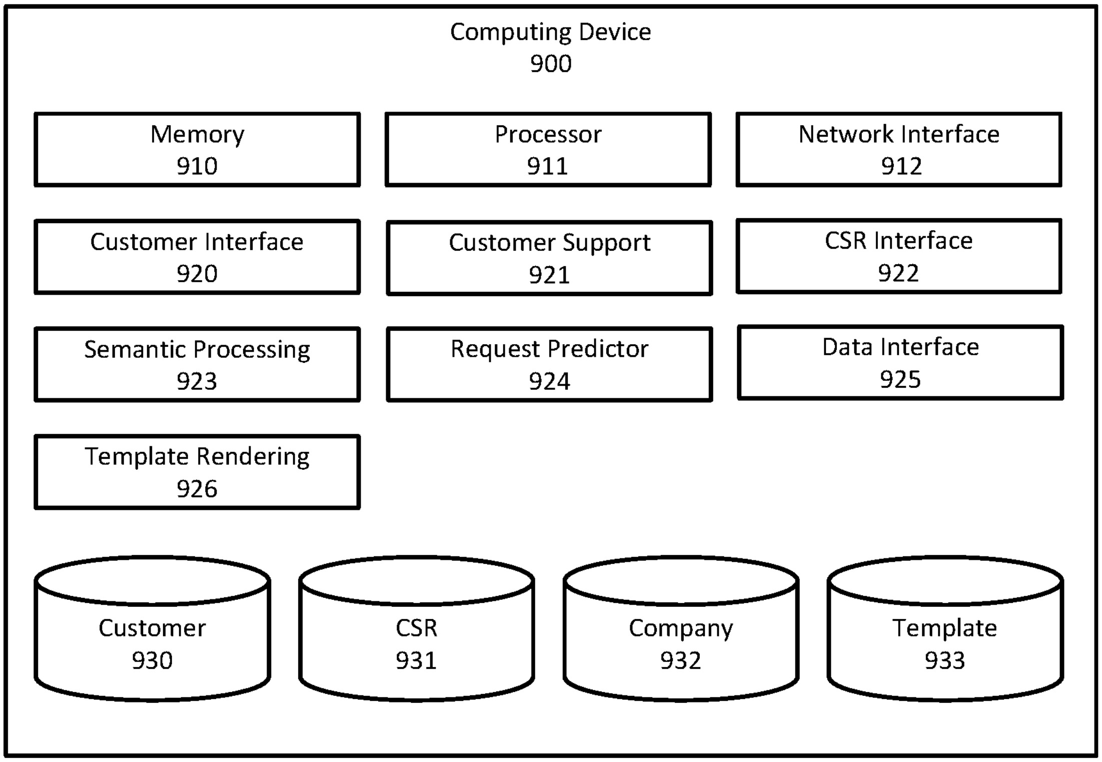
FIG. 9 is an exemplary computing device that may be used to provide customer support services.

FIG. 9 illustrates components of one implementation of a computing device 900 for implementing any of the techniques described above. In FIG. 9, the components are shown as being on a single computing device 900, but the components may be distributed among multiple computing devices, such as a system of computing devices, including, for example, an end-user computing device (e.g., a smart phone or a tablet) and/or a server computing device (e.g., cloud computing).

Computing device 900 may include any components typical of a computing device, such as volatile or nonvolatile memory 910, one or more processors 911, and one or more network interfaces 912. Computing device 900 may also include any input and output components, such as displays, keyboards, and touch screens. Computing device 900 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 900 may have a customer interface component 920 that may receive data from a customer device, transmit data to a customer device, and perform other actions described above. Computing device 900 may have a customer support component 921 that may facilitate customer support sessions between a customer and a CSR or provide automated customer support to a customer. Computing device 900 may have a CSR interface component 922 that may receive data from a CSR device, transmit data to a CSR device, and perform other actions described above. Computing device 900 may have a semantic processing component 923 that may perform any of the semantic processing tasks described above (e.g., selecting an intent) or in any of the patent applications incorporated herein by reference. Computing device 900 may have a request predictor component 924 that may predict a customer support request of a customer as described above. Computing device 900 may have a data interface component 925 that obtains data from a third-party company data store, a server of a company to which third-party company is providing services, or a server of a fourth party. Computing device 900 may have a template rendering component 926 that renders a template using template data as described above.

Computing device 900 may include or have access to various data stores, such as data stores 930, 931, 932, and 933. Data stores may use any known storage technology such as files or relational or non-relational databases. For example, computing device 900 may have customer data store 930 to store any relevant information about customers. Computing device 900 may have a CSR data store 931 that may store any relevant information about CSRs. Computing device 900 may have company data store 932 that may store any relevant information about companies to which third-party company is providing services. Computing device 900 may have a template data store 933 that may store any templates for generating update data.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for predicting a request of a user, comprising:

providing, by a third company, a first user interface to a first device of a first customer to allow the first customer to submit a customer support request regarding a first company;

receiving a first customer identifier from the first device at a server computer of the third company;

requesting, by the third company, first prediction data from a server of the first company using the first customer identifier;

receiving the first prediction data from the server of the first company, wherein the first prediction data comprises information about the first customer or the first company;

processing, at a server of the third company, the first prediction data to predict a first customer support request of the first customer;

generating first user interface data corresponding to the predicted first customer support request of the first customer; and transmitting the first user interface data to the first device for presentation on the first user interface, wherein transmitting the first user interface data is performed before receiving the customer support request from the first customer.

2. The computer-implemented method of claim 1, wherein:

the predicted first customer support request corresponds to a request for information about a service outage; and the first user interface data comprises information about the service outage.

3. The computer-implemented method of claim 1, comprising:

providing, by the third company, a second user interface to a second device to allow a second customer to submit a request customer support regarding a second company, wherein the second company is a different company than the first company;

receiving a second customer identifier from the second device at a server computer of the third company;

requesting, by the third company, second prediction data from a server of the second company, wherein the second prediction data comprises information about the second customer or the second company;

receiving the second prediction data from the server of the second company;

processing the second prediction data to predict a second customer support request of the second customer;

generating second user interface data corresponding to the predicted second request of the second customer; and transmitting the second user interface data to the second device for presentation on the second user interface.

4. The computer-implemented method of claim 1, wherein processing the first prediction data comprises processing the first prediction data with a set of rules or a decision tree.

5. The computer-implemented method of claim 1, wherein processing the first prediction data comprises processing the first prediction data with a neural network.

6. The computer-implemented method of claim 1, wherein processing the first prediction data comprises using a set of customer intents.

7. The computer-implemented method of claim 1 wherein generating the first user interface data comprises:

selecting a first template from a plurality of templates; and generating the first user interface data by rendering the first template.

8. The computer-implemented method of claim 1, wherein transmitting the first user interface data is performed after receiving the first customer identifier.

9. A system for predicting a request of a user, comprising:

at least one server computer comprising at least one processor and at least one memory, the at least one server computer configured to:

provide, by a third company, a first user interface to a first device of a first customer to allow the first customer to submit a customer support request regarding a first company;

receive a first customer identifier from the first device at a server computer of the third company;

request, by the third company, first prediction data from a server of the first company using the first customer identifier;

receiving the first prediction data from the server of the first company, wherein the first prediction data comprises information about the first customer or the first company;

processing, at a server of the third company, the first prediction data to predict a first customer support request of the first customer;

generating first user interface data corresponding to the predicted first customer support request of the first customer; and transmitting the first user interface data to the first device for presentation on the first user interface, wherein transmitting the first user interface data is performed before receiving the customer support request from the first customer.

10. The system of claim 9, wherein the at least one server computer is configured to process the first prediction data by processing the first prediction data with a set of rules or a decision tree.

11. The system of claim 9, wherein the at least one server computer is configured to process the first prediction data by processing the first prediction data with a neural network.

12. The system of claim 9, wherein the at least one server computer is configured to process the first prediction data using a set of customer intents.

13. The system of claim 9, wherein the at least one server computer is configured to generate the first user interface data by:

selecting a first template from a plurality of templates; and generating the first user interface data by rendering the first template.

14. The system of claim 9, wherein the at least one server computer is configured to transmit the first user interface data after receiving the first customer identifier.

15. The system of claim 9, wherein the first user interface data includes an update to a portion of the first interface.

16. The system of claim 15, wherein the update to the portion of the first user interface includes a button selectable by the first customer.

17. The system of claim 16, wherein the predicted first customer support request corresponds to a request about a billing issue, and wherein the server computer is further configured to implement a payment of the bill in response to the first customer selecting the button.

18. One or more non-transitory, computer-readable media comprising computer executable instructions that, when executed, cause at least one processor to perform actions comprising:

providing, by a third company, a first user interface to a first device of a first customer to allow the first customer to submit a customer support request regarding a first company;

receiving a first customer identifier from the first device at a server computer of the third company;

requesting, by the third company, first prediction data from a server of the first company using the first customer identifier;

receiving the first prediction data from the server of the first company, wherein the first prediction data comprises information about the first customer or the first company;

processing, at a server of the third company, the first prediction data to predict a first customer support request of the first customer;

generating first user interface data corresponding to the predicted first request of the first customer; and transmitting the first user interface data to the first device for presentation on the first user interface, wherein transmitting the first user interface data is performed before receiving the customer support request from the first customer.

19. The one or more non-transitory, computer-readable media of claim 18, wherein processing the first prediction data comprises processing the first prediction data with a set of rules or a decision tree.

20. The one or more non-transitory, computer-readable media of claim 18, wherein processing the first prediction data comprises processing the first prediction data with a neural network.

21. The one or more non-transitory, computer-readable media of claim 18, wherein transmitting the first user interface data is performed after receiving the first customer identifier.

22. The one or more non-transitory, computer-readable media of claim 18, wherein the first customer is a customer of the first company.

23. The one or more non-transitory, computer-readable media of claim 18, wherein the first user interface data comprises structured data.

24. The one or more non-transitory, computer-readable media of claim 18, wherein the first user interface data includes information about the predicted first request.

25. The one or more non-transitory, computer-readable media of claim 24, wherein the predicted first customer support request corresponds to a request about a billing issue, and wherein the information about the predicted first request comprises information selected from among information about paying the bill, a due date of the bill, or an amount of the bill.

26. The computer-implemented method of claim 1, further comprising:

receiving a status of services provided by the first company; and processing the first prediction data to predict the first customer support request based on the status of the services.

27. The computer-implemented method of claim 1, further comprising:

receiving location information of the first customer and a status of services provided by the first company; and processing the first prediction data to predict the first customer support request based on the status of the services and the location information.

* * * * *

UNITED STATES PATENT AND TRADEMARK OFFICE
CERTIFICATE OF CORRECTION

PATENT NO. : 11,790,376 B2
APPLICATION NO. : 16/706141
DATED : October 17, 2023
INVENTOR(S) : Sehrawat et al.

It is certified that error appears in the above-identified patent and that said Letters Patent is hereby corrected as shown below:

In the Claims

In Column 35, Line 7, in Claim 15, after "first", insert --user--.

Signed and Sealed this
Eighteenth Day of June, 2024

Katherine Kelly Vidal
*Director of the United States Patent and Trademark Office*